United States Patent
Omran et al.

(10) Patent No.: US 12,281,396 B1
(45) Date of Patent: Apr. 22, 2025

(54) ELECTROCATALYTIC WATER SPLITTING USING α-Ag$_2$WO$_4$@Mn$_3$O$_4$ NANOCOMPOSITES

(71) Applicant: IMAM MOHAMMAD IBN SAUD ISLAMIC UNIVERSITY, Riyadh (SA)

(72) Inventors: Mohamed Khairy Abdel Fattah Omran, Riyadh (SA); Mohamed Mokhtar Mohamed, Benha (EG); Samar Mohamed Syam, Benha (EG); Babiker yagoub Elhadi Abdulkhair, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 18/959,790

(22) Filed: Nov. 26, 2024

(51) Int. Cl.
 *C25B 1/04* (2021.01)
 *C25B 11/037* (2021.01)
 *C25B 11/067* (2021.01)
 *C25B 11/091* (2021.01)

(52) U.S. Cl.
 CPC .............. *C25B 1/04* (2013.01); *C25B 11/037* (2021.01); *C25B 11/067* (2021.01); *C25B 11/091* (2021.01)

(58) Field of Classification Search
 None
 See application file for complete search history.

(56) References Cited

U.S. PATENT DOCUMENTS 10,987,659 B1 * 4/2021 Kadi .................... B01J 37/0221

FOREIGN PATENT DOCUMENTS

| CN | 108855143 | A | | 11/2018 | |
|---|---|---|---|---|---|
| CN | 110560101 | A | | 12/2019 | |
| CN | 116575067 | A | * | 8/2023 | .............. C25B 1/04 |
| CN | 117535708 | A | | 2/2024 | |
| JP | 2007-145680 | A | | 6/2007 | |
| KR | 20230068686 | A | * | 5/2023 | .............. C25B 1/04 |

OTHER PUBLICATIONS

Machine translation of KR-20230068686-A (Year: 2023).*
Machine translation of CN-116575067-A (Year: 2023).*

(Continued)

*Primary Examiner* — Harry D Wilkins, III
(74) *Attorney, Agent, or Firm* — Oblon, McClelland, Maier & Neustadt, L.L.P.

(57) ABSTRACT

An electrocatalyst, a method of producing hydrogen gas by a hydrogen evolution reaction, and a method of producing oxygen gas by an oxygen evolution reaction. The electrocatalyst includes manganese oxide nanoparticles, and silver containing nanoparticles disposed on the manganese oxide nanoparticles, the silver-containing nanoparticles include a shell of silver tungstate disposed on a core of Ag. The electrocatalyst has an electrical resistivity of 0.50×10$^7$ ohm (Ω) to 6.0×10$^7$Ω, a charge transfer resistance of 325Ω to 450Ω, a Tafel slope of 55 mV/dec to 125 mV/dec, and an overpotential at 10 mA/cm$^2$ of 0.05 mV to 200 mV.

20 Claims, 39 Drawing Sheets

(56) References Cited

OTHER PUBLICATIONS

Farsi et al, Nanostructured MnWO4 as a Bifunctional Electrocatalyst for Water Splitting, ECS Journal of Solid State Science and Technology, vol. 12, No. 8, Aug. 2023, Article 083007 (Year: 2023).*

Mohamed et al, Evaluating the water splitting promotion effects of birnessite Mn3+/4+ platelets of α-Mn3O4 coated with Ag@ Ag2WO4 nanosphericals, International Journal of Hydrogen Energy, vol. 61, Apr. 2024, pp. 1028-1042 (Year: 2024).*

Mohamed et al, Extremely efficient methanol oxidation reaction performance: A highly active catalyst derived from different Mn2-xOy phases-supported Ag@Ag2WO4, Electrochimica Acta, vol. 437, Nov. 2022, 141528, pp. 1-14 (Year: 2022).*

Nubla et al, Ag nanoparticles anchored Ag2WO4 nanorods: An efficient methanol tolerant and durable Pt free electro-catalyst toward oxygen reduction reaction, Electrochimica Acta, vol. 340, Mar. 2020, article 135942 (Year: 2020).*

Rani et al, Electrochemically active XWO4 (X=Co, Cu, Mn, Zn) nanostructure for water splitting applications, Applied Nanoscience, vol. 8, No. 5, Apr. 2018, pp. 1241-1258 (Year: 2018).*

Shawky et al, One-pot synthesis of Mn3O4-coupled Ag2WO4 nanocomposite photocatalyst for enhanced photooxidative desulfurization of thiophene under visible light irradiation, Applied Nanoscience, vol. 10, No. 5, Nov. 2019, pp. 1545-1554 (Year: 2019).*

Tian et al, Advances in manganese-based oxides for oxygen evolution reaction, Journal of Materials Chemistry A, vol. 8, No. 29, Jul. 2020, pp. 14400-14414 (Year: 2020).*

Elfatih Mustafa, et al., "Solar-Driven Photoelectrochemical Performance of Novel ZnO/AgZWO4/AgBr Nanorods-Based Photoelectrodes", Nanoscale Research Letters, vol. 16. No. 133, Aug. 21, 2021, 11 pages.

Manman Jing, et al., "The enhancement of photocatalytic hydrogen production over Ag2WO4 modified g-C3N4 with Pt as cocatalyst", Energy Sources, Part A: Recovery, Utilization, and Environmental Effects, vol. 48, No. 1, May 2, 2024, pp. 6404-6414, 2 pages.

* cited by examiner

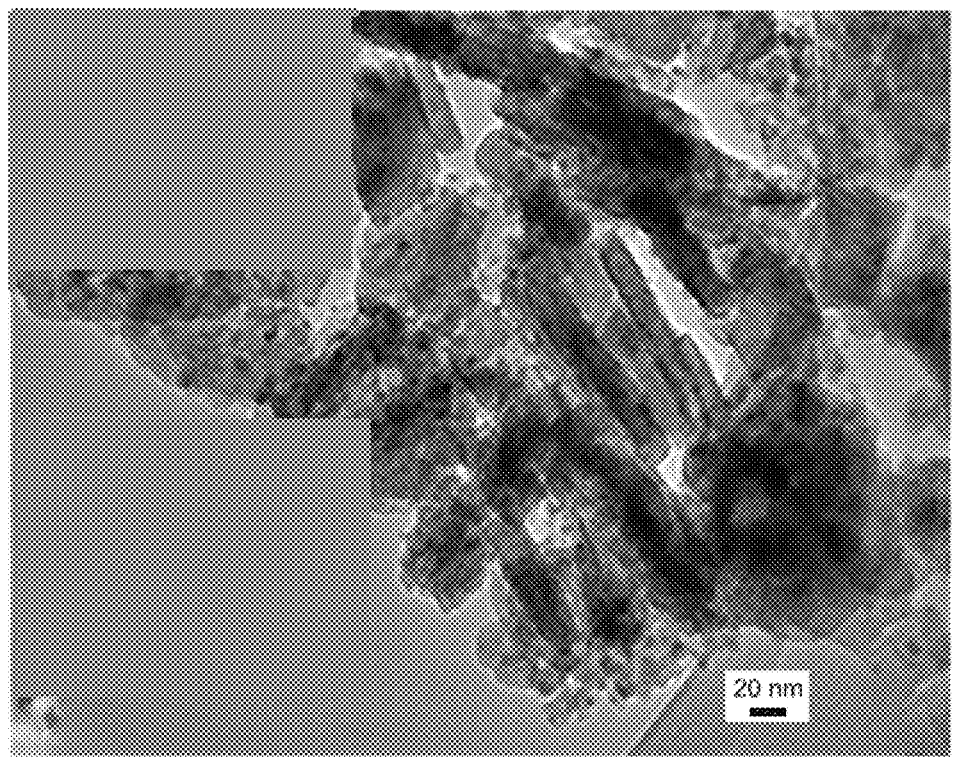
FIG. 3D
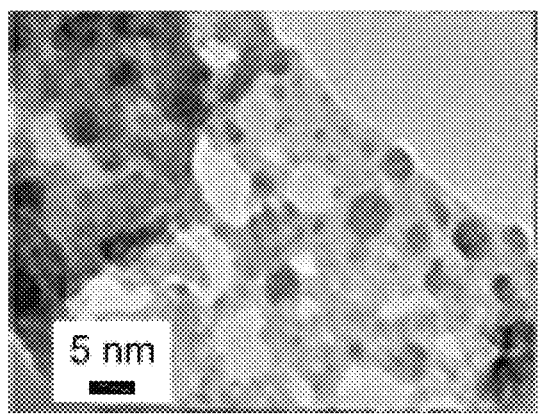 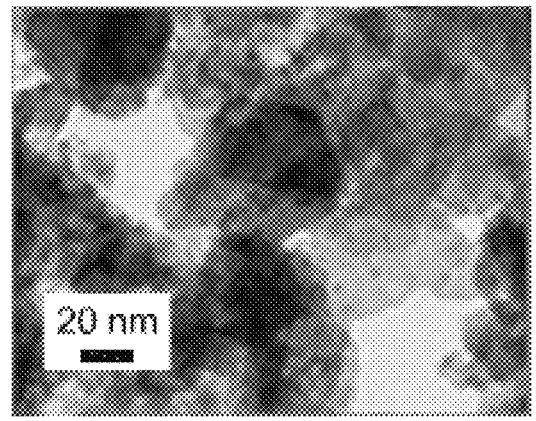
FIG. 3E          FIG. 3F

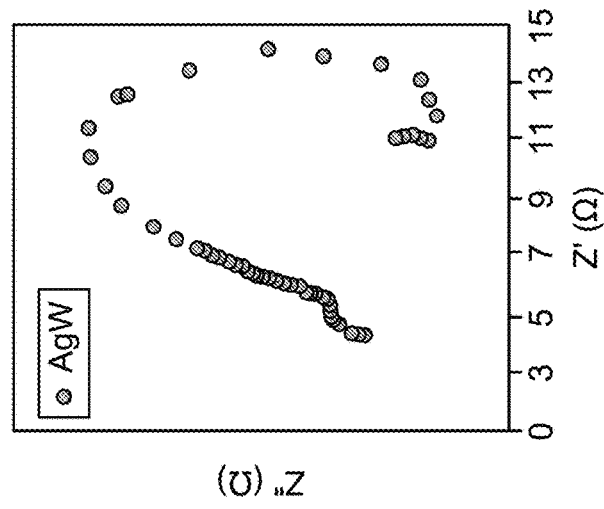
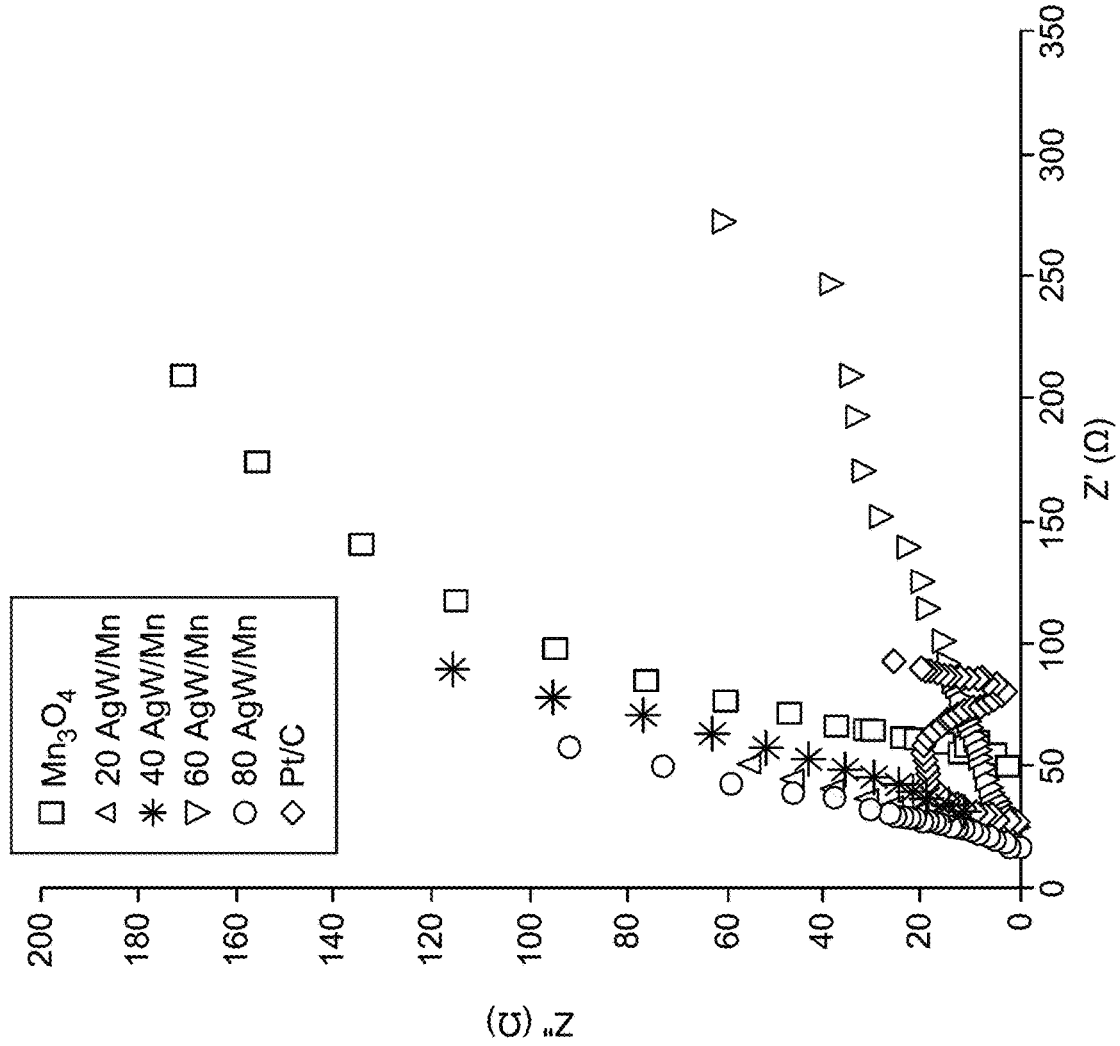
FIG. 12F
FIG. 12E

ELECTROCATALYTIC WATER SPLITTING USING α-Ag$_2$WO$_4$@Mn$_3$O$_4$ NANOCOMPOSITES

STATEMENT OF PRIOR DISCLOSURE BY AN INVENTOR

Aspects of the present disclosure are described in Mohamed Mokhtar Mohamed, S. M. Syam, & M. Khairy; "Evaluating the water splitting promotion effects of birnessite Mn$^{3+/4+}$ platelets of α-Mn$_3$O$_4$ coated with Ag@Ag$_2$WO$_4$ nanosphericals"; International Journal of Hydrogen Energy, 2024, 61, 1028-1042, which is incorporated herein by reference in its entirety.

BACKGROUND

Technical Field

The present disclosure is directed towards α-Ag$_2$WO$_4$@Mn$_3$O$_4$ nanocomposites useful for water splitting to produce hydrogen and oxygen gas.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Due to the scarcity, instability, and high price, noble metal-containing electrocatalysts (such as Pt, RuO$_2$, and IrO$_2$) have not seen wide commercial use in energy driven water splitting. Recently, efforts have been made to utilize steady, abundant, and cheap electrocatalysts such as transition metal oxides. P-type hausmannite Mn$_3$O$_4$ has been studied in electrochemical applications [Song, Y., et. al., Int. J. Hydrogen Energy, 2020, 45, 4501-10; Najam, T., et. al., Int. J. Hydrogen Energy, 2020, 45, 12903-10; and Yang, X., et. al., Int. J. Hydrogen Energy, 2012, 37, 1167-75]. This is mainly because it attains high water reduction activity based on its downward band bending when it makes contact with water [Tan, H. L., et. al., Chem Soc Rev, 2019, 48, 1255-71]. Because of the large number of unsaturated boundary sites on the surface, polymorphism, and the presence of mixed combination valences, MnOx, which may contain MnO$_2$, MnO, and/or Mn$_3$O$_4$, has been recognized as an attractive candidate for many electrochemical redox processes [Michael, H., et. al., J. Am. Chem. Soc., 2015, 137, 14887-904; Hirotaka, K., et. al., Adv. Funct. Mater., 2018, 28, 1706319; and Arindam, I., et. al., J. Photochem. Photobiol. B Biol., 2015, 152, 156-61]. Although Mn$_3$O$_4$ is by far the most stable phase, it has poor conductivity and surface area, restricting its effectiveness in efficient water oxidation processes.

In this context, cubic nanostructures of Mn$_3$O$_4$ showed notable catalytic performance towards OER in an alkaline medium with a density of 5 mA/cm$^2$ at 1.60 mV and a Tafel value of 85.6 mV dec$^{-1}$. 4 nm Mn$_3$O$_4$ nanoparticles placed on Ni foam with increased surface area demonstrated an improved electrocatalytic OER with an overpotential of 395 mV (at 10 mA cm$^{-2}$) at neutral pH [Cho, K. H., et. al., Adv. Funct. Mater., 2020, 30, 1910424].

The OER performance of MnNiO$_3$/Mn$_3$O$_4$ nanocomposites was found to exhibit a large current density of 274 mA g$^{-1}$ (10 mV/s) as well as a modest Tafel value of 50 mV/dec [Rani, B. J., et. al., J. Sol. Gel. Sci. Technol., 2019, 92, 1-11]. Barreca et al. demonstrated that simple Mn$_3$O$_4$ may produce hydrogen continuously for 20 h, albeit at approximately 10 mmol h$^{-1}$ m$^{-2}$. [Barreca, D., et. al., Langmuir, 2018, 34, 4568-74]. A Mn$_3$O$_4$/O-CNT electrode as a bifunctional electrocatalyst was found to have an OER and ORR performance of 86.6 mW cm$^{-2}$ [Li, L., et. al., ACS Appl. Energy Mater., 2018, 1, 963-9]. Due to the improved reactivity of water and the synergistic chemical coupling effects, an Mn$_3$O$_4$/CoSe$_2$ hybrid exhibited higher OER catalytic activity [Gao, M., et. al., J. Am. Chem. Soc., 2012, 134, 2930-3]. Maruthapandian et al. used a co-precipitation approach to produce pure Mn$_3$O$_4$ and Ni-doped Mn$_3$O$_4$ and investigated their electrocatalytic activity for OER in an alkaline solution. [Maruthapandian, V., et. al., RSC Adv., 2016, 6, 48995-9002]. In comparison to pristine Mn$_3$O$_4$, the results reveal that 10 wt % Ni/Mn$_3$O$_4$ has enhanced the catalytic activity. The Pd—Mn$_3$O$_4$/C electrocatalyst synthesized using a microwave irradiation technique had greater OER activity and constancy compared to Pd/C and Pd—Mn$_3$O$_4$ nanocatalysts [Li, Z. Y., et. al., J. Mater. Chem. 2014, 2, 18236-40]. Based on the underlying substrate, Mn$_3$O$_4$ nanocatalysts performed differently in terms of oxygen evolution, and this behavior was connected with the substrate's work function. Because of the first-rank interaction affinity of the *OH, *O and *OOH intermediates generated on the Mn$_3$O$_4$ exterior surface, their unique redox characteristics in alkaline solutions for the OER process are excellent, but they have poor HER activity [Rani, B. J., et. al., Mater. Chem. Phys. 2020, 247, 122864]. To achieve effective total water splitting, it is critical to develop greatly energetic transition metal-oxide catalysts for HER. In this issue, Mn and Fe-built minerals are found prospective capable catalysts for total water splitting [Cheng, B., et. al., Chem. Eng. J. 2022, 441, 136122; and Xu, X., et. al., J. Alloys Compd., 2021, 875, 159970]. Li and colleagues on the other hand created Ni—Mn$_3$O$_4$ nanocomposites grown on Ni foam with a room temperature overpotential of 91 mV [Li, X., et. al., Chem. Commun., 2016, 52, 10566-9].

Therefore, there remains a critical need to develop cost-effective, high-performance structurally stable, non-noble electrocatalysts that can perform both OER and HER reactions that can make water electrolysis more scalable and sustainable for enabling large-scale, efficient water splitting.

Accordingly, it is one object of the present disclosure to provide a HER-OER electrocatalyst which may circumvent the drawbacks and limitations of the methods already known in the art.

SUMMARY

According to a first aspect, the present disclosure relates to a method of producing hydrogen gas by a hydrogen evolution reaction. In some embodiments, the method includes contacting an electrocatalyst with an aqueous electrolyte solution including a hydroxide base, applying a potential of −300 millivolt (mV) to 0 mV vs reversible hydrogen electrode (RHE) to the electrocatalyst and a counter electrode immersed in the aqueous electrolyte solution. In some embodiments, the electrocatalyst includes manganese oxide nanoparticles, and silver (Ag) containing nanoparticles disposed on the manganese oxide nanoparticles, the silver-containing nanoparticles include a shell of silver tungstate (Ag$_2$WO$_4$) disposed on a core of Ag. In some embodiments, the electrocatalyst has an electrical resistivity of 0.50×10$^7$ ohm (Ω) to 6.0×10$^7$Ω, a charge transfer resistance of 325Ω to 450Ω, a Tafel slope of 55 millivolts per decade (mV/dec) to 125 mV/dec, and an overpotential at 10 milliamperes per square centimeter (mA/cm$^2$) of 0.05 mV to 200 mV.

In some embodiments, the electrocatalyst includes 50 percent by weight (wt. %) to 70 wt. % silver-containing nanoparticles; and 30 wt. % to 50 wt. % manganese oxide nanoparticles, based on a total weight of the electrocatalyst.

In some embodiments, the manganese oxide nanoparticles comprise $Mn_3O_4$ and $MnO_2$ by powder X-Ray Diffraction (PXRD).

In some embodiments, the electrocatalyst includes 39 atomic percent (at. %) to 57.0 at. % $Mn^{2+}$, 38.0 at. % to 49.0 at. % $Mn^{3+}$, and 5.0 at. % to 12.0 at. % $Mn^{4+}$, each based on a total amount of manganese present in the electrocatalyst.

In some embodiments, the electrocatalyst has a molar ratio of Ag to Mn of about 0.1:1 to 1:1.

In some embodiments, the electrocatalyst includes 25 at. % to 75 at. % $Ag^0$ based on a total number of atoms of Ag present in the electrocatalyst.

In some embodiments, the $Ag_2WO_4$ is crystalline α-$Ag_2WO_4$ by PXRD.

In some embodiments, the electrocatalyst has a surface area of 32.5 square meters per gram (m$^2$/g) to 50 m$^2$/g a pore volume of 2.10 gram per cubic centimeter (cm$^3$/g) to 4.00 cm$^3$/g, and a mean pore radius of 200 Angstrom (Å) to 400 Å.

In some embodiments, the electrocatalyst has a surface area of 32.5 m$^2$/g to 50 m$^2$/g, a pore volume of 2.10 cm$^3$/g to 4.00 cm$^3$/g; and a mean pore radius of 200 Å to 400 Å. In some embodiments, the electrocatalyst has a mass activity of 1335 milliamperes per gram (mA/g) to 1390 mA/g.

In some embodiments, the method has a turnover frequency at an overpotential of 1.0 V vs RHE of 0.600 per second (s$^{-1}$) to 2.250 s$^{-1}$.

The present disclosure also relates to a method of producing oxygen gas by an oxygen evolution reaction. In some embodiments, the method includes contacting an electrocatalyst with an aqueous electrolyte solution including a hydroxide base and applying a potential of 1000 mV to 2200 mV vs RHE to the electrocatalyst and a counter electrode immersed in the aqueous electrolyte solution. In some embodiments, the electrocatalyst includes manganese oxide nanoparticles, and silver-containing nanoparticles disposed on the manganese oxide nanoparticles. In some embodiments, the silver-containing nanoparticles include a shell of $Ag_2WO_4$ disposed on a core of Ag, and the electrocatalyst has an electrical resistivity of 0.50×10$^7$Ω to 6.0×10$^7$Ω, a charge transfer resistance of 325Ω to 450Ω, a Tafel slope of 45 mV/dec to 125 mV/dec, and an overpotential at 10 mA/cm$^2$ of 0.05 mV to 200 mV.

In some embodiments, the electrocatalyst includes 50 wt. % to 70 wt. % silver-containing nanoparticles, and 30 wt. % to 50 wt. % manganese oxide nanoparticles, based on a total weight of the electrocatalyst.

In some embodiments, the manganese oxide nanoparticles includes $Mn_3O_4$ and $MnO_2$ by PXRD.

In some embodiments, the electrocatalyst includes 39 at. % to 57.0 at. % $Mn^{2+}$, 38.0 at. % to 49.0 at. % $Mn^{3+}$, and 5.0 at. % to 12.0 at. % $Mn^{4+}$, each based on a total amount of manganese present in the electrocatalyst.

In some embodiments, the electrocatalyst has a ratio of Ag to Mn of 0.1:1 to 1:1.

In some embodiments, the electrocatalyst includes 25 at. % to 75 at. % $Ag^0$ based on a total number of atoms of Ag present in the electrocatalyst.

In some embodiments, the $Ag_2WO_4$ is crystalline α-$Ag_2WO$ by PXRD.

In some embodiments, the electrocatalyst has a surface area of 32.5 m$^2$/g to 50 m$^2$/g, a pore volume of 2.10 cm$^3$/g to 4.00 cm$^3$/g, and a mean pore radius of 200 Å to 400 Å.

In some embodiments, the method as described above has a Faradic efficiency of at least 85 wt. %.

In some embodiments, the method has a turnover frequency at an overpotential of 1.0 V vs RHE of 0.300 s$^{-1}$ to 1.250 s$^{-1}$.

The foregoing general description of the illustrative embodiments and the following detailed description thereof are merely exemplary aspects of the teachings of this disclosure and are not restrictive.

BRIEF DESCRIPTION OF DRAWINGS

A more complete appreciation of this disclosure and many of the attendant advantages thereof will be readily obtained as the same becomes better understood by reference to the following detailed description when considered in connection with the accompanying drawings, wherein:

FIGS. 12E-12F depict Nyquist plots for electrocatalysts Pt/C, $Mn_3O_4$, AgW, 20 AgW/Mn, 40 AgW/Mn, 60 AgW/Mn, 80 AgW/Mn, according to certain embodiments.

DETAILED DESCRIPTION

Figure 1:
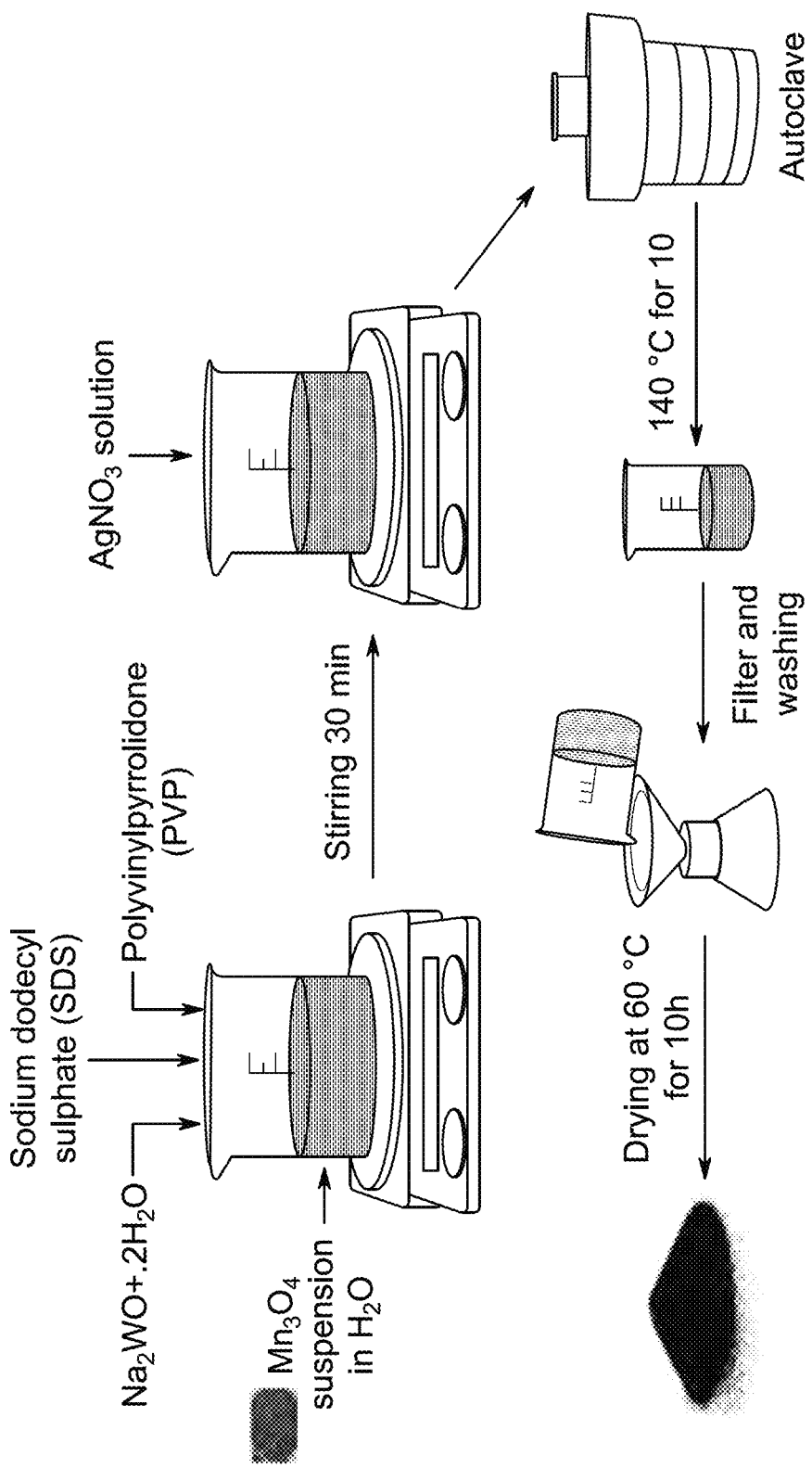
FIG. 1 is graphical scheme for the synthesis of an α-$Ag_2WO_4$@$Mn_3O_4$ nanocomposite, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

As used herein, the term "hydrogen evolution reaction" (HER) refers to a process in which hydrogen gas ($H_2$) is generated through the electrolysis of water, typically at the cathode of an electrochemical cell. This reaction involves the reduction of protons ($H^+$) to form molecular hydrogen ($H_2$), and it plays a key role in renewable energy technologies such as water splitting for hydrogen production.

As used herein, the term "electrical resistivity" refers to a material property that quantifies how strongly a given material opposes the flow of electric current. It is defined as the ratio of the electric field to the current density in a material, and is typically expressed in ohm-meters ($\Omega \cdot m$). A higher resistivity indicates that the material is a poor conductor of electricity, while a lower resistivity indicates that the material is a better conductor. Electrical resistivity is an intrinsic property of the material and is independent of its shape and size.

As used herein, the term "charge transfer resistance" refers to the resistance encountered by the flow of charge (electrons or ions) at the interface between an electrode and the electrolyte during an electrochemical reaction. It reflects the ease or difficulty of electron transfer between the electrode surface and the reacting species. A lower charge transfer resistance indicates faster electron transfer and more efficient electrochemical reactions, which is crucial for the performance of devices such as batteries, fuel cells, and electrocatalysts. It is commonly measured using electrochemical impedance spectroscopy (EIS).

As used herein, the term "Tafel slope" refers to the rate at which the current density changes with respect to the overpotential during an electrochemical reaction. It is a key parameter used to evaluate the kinetics of electrochemical processes, such as the hydrogen evolution reaction (HER) or oxygen reduction reaction (ORR). The Tafel slope is typically obtained from the Tafel plot, which is a logarithmic plot of current density versus overpotential. A lower Tafel slope indicates more efficient electron transfer and faster reaction kinetics, which is desirable for high-performance electrocatalysts.

As used herein, the term "mass activity" refers to the electrochemical activity of a catalyst per unit mass, typically expressed in terms of current density ($mA/cm^2$) or turnover frequency (TOF) per gram of catalyst. It is a key metric used to evaluate the efficiency of catalysts in reactions like hydrogen evolution or oxygen reduction. A higher mass activity indicates that the catalyst can produce more product (e.g., hydrogen gas) per unit mass of material, making it more efficient for practical applications in energy conversion and storage technologies.

As used herein, the term "turnover frequency" (TOF) refers to the number of catalytic reactions a single active site on a catalyst can complete per unit of time, typically expressed in $s^{-1}$. It is a key metric for evaluating the efficiency of a catalyst, indicating how quickly it can convert reactants to products. A higher TOF signifies a more efficient catalyst, capable of faster reactions at the active sites, which is particularly important for applications such as fuel cells, batteries, and other electrochemical processes.

As used herein, the term "oxygen evolution reaction" (OER) refers to the electrochemical process in which water ($H_2O$) is oxidized to produce oxygen gas ($O_2$), protons ($H^+$), and electrons ($e^-$) at the anode of an electrochemical cell
Electrocatalyst According to a first aspect, the present disclosure relates to a method for producing hydrogen gas through the hydrogen evolution reaction (HER). The present disclosure also relates to a method for producing oxygen gases through the oxygen evolution reaction (OER). In some embodiments, these methods involve the use of an electrocatalyst including $\alpha$-$Ag_2WO_4$ supported on $\alpha$-$Mn_3O_4$ (referred to as "AgW/Mn").

In some embodiments, the electrocatalyst includes manganese oxide nanoparticles. In general, the manganese oxide nanoparticles can comprise any suitable manganese oxide or combination of manganese oxides. Various manganese oxides are known, examples of which include but are not limited to MnO, $Mn_3O_4$, $Mn_2O_3$, $MnO_2$, $MnO_3$, $Mn_2O_7$, $Mn_5O8$, $Mn_7O_{12}$ and $Mn_7O_{13}$. The manganese oxide nanoparticles may contain a single type of manganese oxide or may contain more than one type of manganese oxide. In some embodiments, the manganese oxide nanoparticles comprise $Mn_3O_4$. In some embodiments, the manganese oxide nanoparticles comprise $MnO_2$. In some embodiments, the manganese oxide nanoparticles comprise $Mn_3O_4$ and $MnO_2$. In general, the $MnO_2$ can be any suitable phase of $MnO_2$. Examples of phases of $MnO_2$ include, but are not limited to, $\alpha$-$MnO_2$, $\beta$-$MnO_2$, $\gamma$-$MnO_2$, $\epsilon$-$MnO_2$, $\delta$-$MnO_2$, and $\lambda$-$MnO_2$. In some embodiments, the $MnO_2$ is $\alpha$-$MnO_2$. In general, the $Mn_3O_4$ can be any suitable phase of $Mn_3O_4$. Examples of phases of $Mn_3O_4$ include, but are not limited to, tetragonal $Mn_3O_4$ and orthorhombic $Mn_3O_4$. In some embodiments, the $Mn_3O_4$ is tetragonal $Mn_3O_4$.

In general, the manganese oxide nanoparticles can be any shape known to one of ordinary skill in the art. Examples of suitable shapes the manganese oxide nanoparticles may take include spheres, spheroids, lentoids, ovoids, solid polyhedra such as tetrahedra, cubes, octahedra, icosahedra, dodecahedra, hollow polyhedra (also known as nanocages), stellated polyhedra (both regular and irregular, also known as nanostars), triangular prisms (also known as nanotriangles), hollow spherical shells (also known as nanoshells), tubes (also known as nanotubes), nanosheets, nanoplatelets, nanodisks, rods (also known as nanorods), and mixtures thereof. In the case of nanorods, the rod shape may be defined by a ratio of a rod length to a rod width, the ratio being known as the aspect ratio. For manganese oxide nanoparticles of the current invention, nanorods should have an aspect ratio less than 1000, preferably less than 750, preferably less than 500, preferably less than 250, preferably less than 100, preferably less than 75, preferably less than 50, preferably less than 25.

In some embodiments, the manganese oxide nanoparticles have uniform shape. Alternatively, the shape may be non-uniform. As used herein, the term "uniform shape" refers to an average consistent shape that differs by no more than 10%, by no more than 5%, by no more than 4%, by no more than 3%, by no more than 2%, by no more than 1% of the distribution of manganese oxide nanoparticles having a different shape. As used herein, the term "non-uniform shape" refers to an average consistent shape that differs by more than 10% of the distribution of manganese oxide nanoparticles having a different shape. In one embodiment, the shape is uniform and at least 90% of the manganese oxide nanoparticles are spherical or substantially circular, and less than 10% are polygonal. In another embodiment, the shape is non-uniform and less than 90% of the manganese oxide nanoparticles are spherical or substantially circular, and greater than 10% are polygonal.

In some embodiments, the manganese oxide nanoparticles have a mean particle size of 5 to 150 nm, preferably 10 to 125 nm, preferably 15 to 110 nm, preferably 25 to 100 nm, preferably 30 to 95 nm, preferably 40 to 85 nm, preferably about 45 to 75 nm. In embodiments where the manganese oxide nanoparticles are spherical, the particle size may refer to a particle diameter. In embodiments where the manganese oxide nanoparticles are polyhedral or some other non-spherical shape, the particle size may refer to the diameter of a circumsphere. In some embodiments, the particle size refers to a mean distance from a particle surface to particle centroid or center of mass. In alternative embodiments, the particle size refers to a maximum distance from a particle surface to a particle centroid or center of mass. In some embodiments where the manganese oxide nanoparticles have an anisotropic shape such as nanorods, the particle size may refer to a length of the nanorod, a width of the nanorod, or an average of the length and width of the nanorod. In some embodiments in which the manganese oxide nanoparticles have non-spherical shapes, the particle size refers to the diameter of a sphere having an equivalent volume as the particle. In some embodiments in which the manganese oxide nanoparticles have non-spherical shapes, the particle size refers to the diameter of a sphere having an equivalent diffusion coefficient as the particle.

In some embodiments, the manganese oxide nanoparticles of the present disclosure are monodisperse, having a coefficient of variation or relative standard deviation, expressed as a percentage and defined as the ratio of the particle size standard deviation ($\sigma$) to the particle size mean ($\mu$) multiplied by 100 of less than 25%, preferably less than 10%, preferably less than 8%, preferably less than 6%, preferably less than 5%, preferably less than 4%, preferably less than 3%, preferably less than 2%. In some embodiments, the manganese oxide nanoparticles of the present disclosure are monodisperse having a particle size distribution ranging from 80% of the average particle size to 120% of the average particle size, preferably 90-110%, preferably 95-105% of the average particle size. In some embodiments, the manganese oxide nanoparticles are not monodisperse.

In general, the particle size may be determined by any suitable method known to one of ordinary skill in the art. In some embodiments, the particle size is determined by powder X-ray diffraction (PXRD). Using PXRD, the particle size may be determined using the Scherrer equation, which relates the full-width at half-maximum (FWHM) of diffraction peaks to the size of regions comprised of a single crystalline domain (known as crystallites) in the sample. In some embodiments, the crystallite size is the same as the particle size. For accurate particle size measurement by PXRD, the particles should be crystalline, comprise only a single crystal, and lack non-crystalline portions. Typically, the crystallite size underestimates particle size compared to other measures due to factors such as amorphous regions of particles, the inclusion of non-crystalline material on the surface of particles such as bulky surface ligands, and particles which may be composed of multiple crystalline domains. In some embodiments, the particle size is determined by dynamic light scattering (DLS). DLS is a technique which uses the time-dependent fluctuations in light scattered by particles in suspension or solution in a solvent, typically water to measure a size distribution of the particles. Due to the details of the DLS setup, the technique measures a hydrodynamic diameter of the particles, which is the diameter of a sphere with an equivalent diffusion coefficient as the particles. The hydrodynamic diameter may include factors not accounted for by other methods such as non-crystalline material on the surface of particles such as bulky surface ligands, amorphous regions of particles, and surface ligand-solvent interactions. Further, the hydrodynamic diameter may not accurately account for non-spherical particle shapes. DLS does have an advantage of being able to account for or more accurately model solution or suspension behavior of the particles compared to other techniques. In some embodiments, the particle size is determined by electron microscopy techniques such as scanning electron microscopy (SEM) or transmission electron microscopy (TEM).

In some embodiments, the electrocatalyst includes 30 to 50 wt. % manganese oxide nanoparticles based on the total weight of the electrocatalyst. For example, the electrocatalyst can include 30 wt. %, 32.5 wt. %, 35 wt. %, 37.5 wt. %, 40 wt. %, 42.5 wt. %, 45 wt. %, 47.5 wt. %, or 50 wt. % manganese oxide nanoparticles based on the total weight of the electrocatalyst.

In some embodiments, the electrocatalyst includes silver-containing nanoparticles disposed on the manganese oxide nanoparticles. In some embodiments, the silver-containing nanoparticles include $Ag_2WO_4$. In some embodiments, the $Ag_2WO_4$ is orthorhombic $\alpha$-$Ag_2WO_4$. In some embodiments, the silver-containing nanoparticles include Ag. In some embodiments, the silver-containing nanoparticles include a shell of $Ag_2WO_4$ disposed on a core of Ag.

In general, the silver-containing nanoparticles can be any shape known to one of ordinary skill in the art. Examples of suitable shapes the silver-containing nanoparticles may take include spheres, spheroids, lentoids, ovoids, solid polyhedra such as tetrahedra, cubes, octahedra, icosahedra, dodecahedra, hollow polyhedra (also known as nanocages), stellated polyhedra (both regular and irregular, also known as nanostars), triangular prisms (also known as nanotriangles), hollow spherical shells (also known as nanoshells), tubes (also known as nanotubes), nanosheets, nanoplatelets, nanodisks, rods (also known as nanorods), and mixtures thereof. In the case of nanorods, the rod shape may be defined by a ratio of a rod length to a rod width, the ratio being known as the aspect ratio. For silver-containing nanoparticles of the current invention, nanorods should have an aspect ratio less than 1000, preferably less than 750, preferably less than 500, preferably less than 250, preferably less than 100, preferably less than 75, preferably less than 50, preferably less than 25.

In some embodiments, the silver-containing nanoparticles have uniform shape. Alternatively, the shape may be non-uniform. As used herein, the term "uniform shape" refers to an average consistent shape that differs by no more than 10%, by no more than 5%, by no more than 4%, by no more than 3%, by no more than 2%, by no more than 1% of the distribution of silver-containing nanoparticles having a different shape. As used herein, the term "non-uniform shape" refers to an average consistent shape that differs by more than 10% of the distribution of silver-containing nanoparticles having a different shape. In one embodiment, the shape is uniform and at least 90% of the silver-containing nanoparticles are spherical or substantially circular, and less than 10% are polygonal. In another embodiment, the shape is non-uniform and less than 90% of the silver-containing nanoparticles are spherical or substantially circular, and greater than 10% are polygonal.

In some embodiments, the silver-containing nanoparticles have a mean particle size of 1 to 100 nm, preferably 2.5 to 90 nm, preferably 5 to 80 nm, preferably 7.5 to 75 nm, preferably 10 to 70 nm, preferably 12.5 to 65 nm, preferably about 15 to 60 nm. In embodiments where the silver-containing nanoparticles are spherical, the particle size may refer to a particle diameter. In embodiments where the silver-containing nanoparticles are polyhedral or some other non-spherical shape, the particle size may refer to the diameter of a circumsphere. In some embodiments, the particle size refers to a mean distance from a particle surface to particle centroid or center of mass. In alternative embodiments, the particle size refers to a maximum distance from a particle surface to a particle centroid or center of mass. In some embodiments where the silver-containing nanoparticles have an anisotropic shape such as nanorods, the particle size may refer to a length of the nanorod, a width of the nanorod, or an average of the length and width of the nanorod. In some embodiments in which the silver-containing nanoparticles have non-spherical shapes, the particle size refers to the diameter of a sphere having an equivalent volume as the particle. In some embodiments in which the silver-containing nanoparticles have non-spherical shapes, the particle size refers to the diameter of a sphere having an equivalent diffusion coefficient as the particle.

In some embodiments, the silver-containing nanoparticles of the present disclosure are monodisperse, having a coefficient of variation or relative standard deviation, expressed as a percentage and defined as the ratio of the particle size standard deviation ($\sigma$) to the particle size mean ($\mu$) multiplied by 100 of less than 25%, preferably less than 10%, preferably less than 8%, preferably less than 6%, preferably less than 5%, preferably less than 4%, preferably less than 3%, preferably less than 2%. In some embodiments, the silver-containing nanoparticles of the present disclosure are monodisperse having a particle size distribution ranging from 80% of the average particle size to 120% of the average particle size, preferably 90-110%, preferably 95-105% of the average particle size. In some embodiments, the silver-containing nanoparticles are not monodisperse.

In some embodiments, the electrocatalyst includes 50 to 70 wt. %, silver-containing nanoparticles based on the total weight of the electrocatalyst. For example, the electrocatalyst may include 50 wt. %, 52.5 wt. %, 55 wt. %, 57.5 wt. %, 60 wt. %, 62.5 wt. %, 65 wt. %, 67.5 wt. %, or 70 wt. % silver-containing nanoparticles, based on the total weight of the electrocatalyst.

In some embodiments, the electrocatalyst includes $Mn^{2+}$ in the range of 39 to 57.0 atom %, based on the total amount of manganese present in the electrocatalyst. For example, the electrocatalyst may include 39.0 atom %, 39.5 atom %, 40.0 atom %, 40.5 atom %, 41.0 atom %, 41.5 atom %, 42.0 atom %, 42.5 atom %, 43.0 atom %, 43.5 atom %, 44.0 atom %, 44.5 atom %, 45.0 atom %, 45.5 atom %, 46.0 atom %, 46.5 atom %, 47.0 atom %, 47.5 atom %, 48.0 atom %, 48.5 atom %, 49.0 atom %, 49.5 atom %, 50.0 atom %, 50.5 atom %, 51.0 atom %, 51.5 atom %, 52.0 atom %, 52.5 atom %, 53.0 atom %, 53.5 atom %, 54.0 atom %, 54.5 atom %, 55.0 atom %, 55.5 atom %, 56.0 atom %, 56.5 atom %, or 57.0 atom % $Mn^{2+}$, based on the total amount of manganese present in the electrocatalyst.

In some embodiments, the electrocatalyst includes $Mn^{3+}$ in the range of 38.0 to 49.0 atom %, based on the total amount of manganese present in the electrocatalyst. For example, the electrocatalyst can include 38.0 atom %, 38.5 atom %, 39.0 atom %, 39.5 atom %, 40.0 atom %, 40.5 atom %, 41.0 atom %, 41.5 atom %, 42.0 atom %, 42.5 atom %, 43.0 atom %, 43.5 atom %, 44.0 atom %, 44.5 atom %, 45.0 atom %, 45.5 atom %, 46.0 atom %, 46.5 atom %, 47.0 atom %, 47.5 atom %, 48.0 atom %, 48.5 atom %, or 49.0 atom % $Mn^{3+}$, based on the total amount of manganese present in the electrocatalyst.

In some embodiments, the electrocatalyst includes $Mn^{4+}$ in the range of 5.0 to 12.0 atom %, based on the total amount of manganese present in the electrocatalyst. For example, the electrocatalyst can include 5.25 atom %, 5.5 atom %, 5.75 atom %, 6.0 atom %, 6.25 atom %, 6.5 atom %, 6.75 atom %, 7.0 atom %, 7.25 atom %, 7.5 atom %, 7.75 atom %, 8.0 atom %, 8.25 atom %, 8.5 atom %, 8.75 atom %, 9.0 atom %, 9.25 atom %, 9.5 atom %, 9.75 atom %, 10.0 atom %, 10.25 atom %, 10.5 atom % 10.75 atom %, 11.0 atom %, 11.25 atom %, 11.5 atom %, 11.75 atom %, or 12.0 atom % $Mn^{4+}$, based on the total amount of manganese present in the electrocatalyst.

In some embodiment, the electrocatalyst has a molar ratio of Ag to Mn ranging from 0.1:1 to 1:1. For example, the electrocatalyst can have a molar ratio of Ag to Mn of 0.1:1, 0.2:1, 0.3:1, 0.4:1, 0.5:1, 0.6:1, 0.7:1, 0.8:1, 0.9:1, or 1.0:1.

In some embodiments, the electrocatalyst includes 25 to 75 atom % $Ag^0$, based on a total number of Ag atoms present in the electrocatalyst. For example, the electrocatalyst can include 25.0 atom %, 25.5 atom %, 26.0 atom %, 26.5 atom %, 27.0 atom %, 27.5 atom %, 28.0 atom %, 28.5 atom %, 29.0 atom %, 29.5 atom %, 30.0 atom %, 30.5 atom %, 31.0 atom %, 31.5 atom %, 32.0 atom %, 32.5 atom %, 33.0 atom %, 33.5 atom %, 34.0 atom %, 34.5 atom %, 35.0 atom %, 35.5 atom %, 36.0 atom %, 36.5 atom %, 37.0 atom %, 37.5 atom %, 38.0 atom %, 38.5 atom %, 39.0 atom %, 39.5 atom %, 40.0 atom %, 40.5 atom %, 41.0 atom %, 41.5 atom %, 42.0 atom %, 42.5 atom %, 43.0 atom %, 43.5 atom %, 44.0 atom %, 44.5 atom %, 45.0 atom %, 45.5 atom %, 46.0 atom %, 46.5 atom %, 47.0 atom %, 47.5 atom %, 48.0 atom %, 48.5 atom %, 49.0 atom %, 49.5 atom %, 50.0 atom %, 50.5 atom %, 51.0 atom %, 51.5 atom %, 52.0 atom %, 52.5 atom %, 53.0 atom %, 53.5 atom %, 54.0 atom %, 54.5 atom %, 55.0 atom %, 55.5 atom %, 56.0 atom %, 56.5 atom %, 57.0 atom %, 57.5 atom %, 58.0 atom %, 58.5 atom %, 59.0 atom %, 59.5 atom %, 60.0 atom %, 60.5 atom %, 61.0 atom %, 61.5 atom %, 62.0 atom %, 62.5 atom %, 63.0 atom %, 63.5 atom %, 64.0 atom %, 64.5 atom %, 65.0 atom %, 65.5 atom %, 66.0 atom %, 66.5 atom %, 67.0 atom %, 67.5 atom %, 68.0 atom %, 68.5 atom %, 69.0 atom %, 69.5 atom %, 70.0 atom %, 70.5 atom %, 71.0 atom %, 71.5 atom %, 72.0 atom %, 72.5 atom %, 73.0 atom %, 73.5 atom %, 74.0 atom %, 74.5 atom %, or 75.0 atom %, based on the total number of Ag atoms present in the electrocatalyst.

In some embodiment, the electrocatalyst has a surface area ranging from 32.5 to 50 $m^2/g$. For example, the electrocatalyst can have a surface area of 32.5 $m^2/g$, 33.0 $m^2/g$, 33.5 $m^2/g$, 34.0 $m^2/g$, 34.5 $m^2/g$, 35.0 $m^2/g$, 35.5 $m^2/g$, 36.0 $m^2/g$, 36.5 $m^2/g$, 37.0 $m^2/g$, 37.5 $m^2/g$, 38.0 $m^2/g$, 38.5 $m^2/g$, 39.0 $m^2/g$, 39.5 $m^2/g$, 40.0 $m^2/g$, 40.5 $m^2/g$, 41.0 $m^2/g$, 41.5 $m^2/g$, 42.0 $m^2/g$, 42.5 $m^2/g$, 43.0 $m^2/g$, 43.5 $m^2/g$, 44.0 $m^2/g$, 44.5 $m^2/g$, 45.0 $m^2/g$, 45.5 $m^2/g$, 46.0 $m^2/g$, 46.5 $m^2/g$, 47.0 $m^2/g$, 47.5 $m^2/g$, 48.0 $m^2/g$, 48.5 $m^2/g$, 49.0 $m^2/g$, 49.5 $m^2/g$, or 50.0 $m^2/g$. In some embodiments, the electrocatalyst has a surface area of 34.98 $m^2/g$. In some embodiments, the electrocatalyst has a surface area of 39.54 $m^2/g$. In some embodiments, the electrocatalyst has a surface area of 44.06 $m^2/g$.

In some embodiments, the electrocatalyst has a pore volume ranging from 2.10 to 4.00 $cm^3/g$. For example, the electrocatalyst can have a pore volume of 2.10 $cm^3/g$, 2.20 $cm^3/g$, 2.30 $cm^3/g$, 2.40 $cm^3/g$, 2.50 $cm^3/g$, 2.60 $cm^3/g$, 2.70 $cm^3/g$, 2.80 $cm^3/g$, 2.90 $cm^3/g$, 3.00 $cm^3/g$, 3.10 $cm^3/g$, 3.20 $cm^3/g$, 3.30 $cm^3/g$, 3.40 $cm^3/g$, 3.50 $cm^3/g$, 3.60 $cm^3/g$, 3.70 $cm^3/g$, 3.80 $cm^3/g$, 3.90 $cm^3/g$, or 4.00 $cm^3/g$. In some embodiments, the electrocatalyst has a pore volume of 0.224 $cm^3/g$. In some embodiments, the electrocatalyst has a pore volume of 0.234 $cm^3/g$. In some embodiments, the electrocatalyst has a pore volume of 0.261 $cm^3/g$.

In some embodiments, the electrocatalyst has a mean pore radius ranging from 200 to 400 Å. For example, the electrocatalyst can have a mean pore radius of 200 Å, 205 Å, 210 Å, 215 Å, 220 Å, 225 Å, 230 Å, 235 Å, 240 Å, 245 Å, 250 Å, 255 Å, 260 Å, 265 Å, 270 Å, 275 Å, 280 Å, 285 Å, 290 Å, 295 Å, 300 Å, 305 Å, 310 Å, 315 Å, 320 Å, 325 Å, 330 Å, 335 Å, 340 Å, 345 Å, 350 Å, 355 Å, 360 Å, 365 Å, 370 Å, 375 Å, 380 Å, 385 Å, 390 Å, 395 Å, or 400 Å. In some embodiments, the electrocatalyst has a mean pore radius of 249.3 Å. In some embodiments, the electrocatalyst has a mean pore radius of 229.2 Å. In some embodiments, the electrocatalyst has a mean pore radius of 241.9 Å.

Method of Forming Hydrogen Via HER

The electrocatalyst of the present disclosure can be used in a method of producing hydrogen gas by a hydrogen evolution reaction. In some embodiments, method includes contacting the electrocatalyst with an aqueous electrolyte solution comprising a hydroxide base. Examples of suitable hydroxide bases include, but are not limited, to NaOH, LiOH, $Ca(OH)_2$, $Ba(OH)_2$, $Sr(OH)_2$, $Mg(OH)_2$, $NH_4OH$, $Al(OH)_3$, $Zn(OH)_2$, $Fe(OH)_3$, $Cu(OH)_2$, AgOH, $NH_3$, RbOH, CsOH, LiOH, NaOH, KOH, $Ca(OH)_2$, $Mg(OH)_2$, $Mn(OH)_2$, $Pb(OH)_2$, $Co(OH)_2$, $Ni(OH)_2$, $Cu(OH)_2$, AgOH, TiOH, $Ga(OH)_3$, $In(OH)_3$, $Fe(OH)_2$, and $Cr(OH)_3$. In some embodiments, the hydroxide base is KOH. In some embodiments, the concentration of the hydroxide base may range from 0.5-5 M based on the concentration of hydroxide anion. For example, the electrolyte solution can have a hydroxide anion concentration of 0.5 M, 0.75 M, 1.0 M, 1.25 M, 1.5 M, 1.75 M, 2.0 M, 2.25 M, 2.5 M, 2.75 M, 3.0 M, 3.25 M, 3.5 M, 3.75 M, 4.0 M, 4.25 M, 4.5 M, 4.75 M, or 5.0 M. In some embodiments, the electrolyte solution has a KOH concentration of 1.0 M.

The method further includes applying a potential of −300 to −1 mV vs. RHE to the electrocatalyst and a counter electrode immersed in the aqueous electrolyte solution. In general, the counter electrode can be any suitable type of electrode. Examples of electrodes which may be used as the counter electrode include, but are not limited to, platinum, gold, graphite, carbon, nickel, copper, titanium, aluminum, stainless steel, iridium, tungsten, rhodium, palladium, iridium oxide, ruthenium oxide, conductive polymer, carbon nanotubes, carbon black, conductive glass, ITO (indium tin oxide), FTO (fluorine-doped tin oxide), glassy carbon, doped silicon, lead, bismuth, cobalt, zinc, copper oxide, iron, tin, zirconium, molybdenum, manganese, tungsten carbide, graphite oxide, copper sulfate, nickel oxide, carbon fiber, titanium oxide, and diamond-like carbon. In some embodiments, the counter electrode is silver/silver chloride.

In some embodiments, the applied potential may range from −300 to −1 mV vs. RHE. For example, the applied voltage can be 300 mV, −295 mV, −290 mV, −285 mV, −280 mV, −275 mV, −270 mV, −265 mV, −260 mV, −255 mV, −250 mV, −245 mV, −240 mV, −235 mV, −230 mV, −225 mV, −220 mV, −215 mV, −210 mV, −205 mV, −200 mV, −195 mV, −190 mV, −185 mV, −180 mV, −175 mV, −170 mV, −165 mV, −160 mV, −155-mV, 150 mV, −145 mV, −140 mV, −135 mV, −130 mV, −125 mV, −120 mV, −115 mV, −110 mV, −105 mV, −100 mV, −95 mV, −90 mV, −85 mV, −80 mV, −75 mV, −70 mV, −65 mV, −60 mV, −55 mV, −50 mV, −45 mV, −40 mV, −35 mV, −30 mV, −25 mV, −20 mV, −15 mV, −10 mV, −5 mV, or −1 mV, vs. RHE.

In some embodiments, the electrocatalyst has an electrical resistivity ranging from $0.50 \times 10^7 \Omega$ to $6.0 \times 10^7 \Omega$. For example, the electrocatalyst may have an electrical resistivity of $0.50 \times 10^7 \Omega$, $0.75 \times 10^7 \Omega$, $1.00 \times 10^7 \Omega$, $1.25 \times 10^7 \Omega$, $1.50 \times 10^7 \Omega$, $1.75 \times 10^7 \Omega$, $2.00 \times 10^7 \Omega$, $2.25 \times 10^7 \Omega$, $2.50 \times 10^7 \Omega$, $2.75 \times 10^7 \Omega$, $3.00 \times 10^7 \Omega$, $3.25 \times 10^7 \Omega$, $3.50 \times 10^7 \Omega$, $3.75 \times 10^7 \Omega$, $4.00 \times 10^7 \Omega$, $4.25 \times 10^7 \Omega$, $4.50 \times 10^7 \Omega$, $4.75 \times 10^7 \Omega$, $5.00 \times 10^7 \Omega$, $5.25 \times 10^7 \Omega$, $5.50 \times 10^7 \Omega$, $5.75 \times 10^7 \Omega$, or $6.00 \times 10^7 \Omega$. In some embodiments, the electrocatalyst exhibits an electrical resistivity value of $5.9 \times 10^7 \Omega$. In some embodiments, the electrocatalyst exhibits an electrical resistivity value of $4.0 \times 10^7 \Omega$. In some embodiments, the electrocatalyst exhibits an electrical resistivity value of $0.61 \times 10^7 \Omega$. In some embodiments, the electrocatalyst exhibits an electrical resistivity value of $0.95 \times 10^7 \Omega$.

In some embodiments, the electrocatalyst has a charge transfer resistance ranging from 325 to 450Ω. For example, the electrocatalyst may have a charge transfer resistance of 325Ω, 330Ω, 335Ω, 340Ω, 345Ω, 350Ω, 355Ω, 360Ω, 365Ω, 370Ω, 375Ω, 380Ω, 385Ω, 390Ω, 395Ω, 400Ω, 405Ω, 410Ω, 415Ω, 420Ω, 425Ω, 430Ω, 435Ω, 440Ω, 445Ω, or 450Ω. In some embodiments, the electrocatalyst has a charge transfer resistance of 340Ω. In some embodiments, the electrocatalyst has a charge transfer resistance of 430Ω.

In some embodiments, the electrocatalyst has a Tafel slope ranging from 55 to 125 mV/dec. For example, the electrocatalyst may have a Tafel slope of 55 mV/dec, 57.5 mV/dec, 60 mV/dec, 62.5 mV/dec, 65 mV/dec, 67.5 mV/dec, 70 mV/dec, 72.5 mV/dec, 75 mV/dec, 77.5 mV/dec, 80 mV/dec, 82.5 mV/dec, 85 mV/dec, 87.5 mV/dec, 90 mV/dec, 92.5 mV/dec, 95 mV/dec, 97.5 mV/dec, 100 mV/dec, 102.5 mV/dec, 105 mV/dec, 107.5 mV/dec, 110 mV/dec, 112.5 mV/dec, 115 mV/dec, 117.5 mV/dec, 120 mV/dec, 122.5 mV/dec, or 125 mV/dec. In some embodiments, the Tafel slope of the electrocatalyst is 61.6 mV/dec.

In some embodiments, the electrocatalyst has an overpotential at 10 $mA/cm^2$ of 0.05 to 200 mV. For example, the electrocatalyst may have an overpotential at 10 $mA/cm^2$ of 0.05 mV, 0.5 mV, 1 mV, 2.5 mV, 5 mV, 7.5 mV, 10 mV, 12.5 mV, 15 mV, 17.5 mV, 20 mV, 22.5 mV, 25 mV, 27.5 mV, 30 mV, 32.5 mV, 35 mV, 37.5 mV, 40 mV, 42.5 mV, 45 mV, 47.5 mV, 50 mV, 52.5 mV, 55 mV, 57.5 mV, 60 mV, 62.5 mV, 65 mV, 67.5 mV, 70 mV, 72.5 mV, 75 mV, 77.5 mV, 80 mV, 82.5 mV, 85 mV, 87.5 mV, 90 mV, 92.5 mV, 95 mV, 97.5 mV, 100 mV, 102.5 mV, 105 mV, 107.5 mV, 110 mV, 112.5 mV, 115 mV, 117.5 mV, 120 mV, 122.5 mV, 125 mV, 127.5 mV, 130 mV, 132.5 mV, 135 mV, 137.5 mV, 140 mV, 142.5 mV, 145 mV, 147.5 mV, 150 mV, 152.5 mV, 155 mV, 157.5 mV, 160 mV, 162.5 mV, 165 mV, 167.5 mV, 170 mV, 172.5 mV, 175 mV, 177.5 mV, 180 mV, 182.5 mV, 185 mV, 187.5 mV, 190 mV, 192.5 mV, 195 mV, 197.5 mV, or 200 mV. In some embodiments, the electrocatalyst has an overpotential at 10 $mA/cm^2$ of 89 mV.

In some embodiments, the electrocatalyst has a mass activity ranging from 1335 to 1390 mA/g. For example, the electrocatalyst may have a mass activity of 1335 mA/g, 1337.5 mA/g, 1340 mA/g, 1342.5 mA/g, 1345 mA/g, 1347.5 mA/g, 1350 mA/g, 1352.5 mA/g, 1355 mA/g, 1357.5 mA/g, 1360 mA/g, 1362.5 mA/g, 1365 mA/g, 1367.5 mA/g, 1370 mA/g, 1372.5 mA/g, 1375 mA/g, 1377.5 mA/g, 1380 mA/g, 1382.5 mA/g, 1385 mA/g, 1387.5 mA/g, or 1390 mA/g. In some embodiments, the electrocatalyst has a mass activity of 1364.4 to 1390 mA/g.

In some embodiment, the method has a turnover frequency at an overpotential of 1.0 V vs. RHE ranging from 0.600 to 2.250 $s^{-1}$. For example, the method may have a turnover frequency of 0.625 $s^{-1}$, 0.65 $s^{-1}$, 0.675 $s^{-1}$, 0.700 $s^{-1}$, 0.725 $s^{-1}$, 0.750 $s^{-1}$, 0.775 $s^{-1}$, 0.800 $s^{-1}$, 0.825 $s^{-1}$, 0.850 $s^{-1}$, 0.875 $s^{-1}$, 0.900 $s^{-1}$, 0.925 $s^{-1}$, 0.950 $s^{-1}$, 0.975 $s^{-1}$, 1.000 $s^{-1}$, 1.025 $s^{-1}$, 1.050 $s^{-1}$, 1.075 $s^{-1}$, 1.100 $s^{-1}$, 1.125 $s^{-1}$, 1.150 $s^{-1}$, 1.175 $s^{-1}$, 1.200 $s^{-1}$, 1.225 $s^{-1}$, 1.250 $s^{-1}$, 1.275 $s^{-1}$, 1.300 $s^{-1}$, 1.325 $s^{-1}$, 1.350 $s^{-1}$, 1.375 $s^{-1}$, 1.400 $s^{-1}$, 1.425 $s^{-1}$, 1.450 $s^{-1}$, 1.475 $s^{-1}$, 1.500 $s^{-1}$, 1.525 $s^{-1}$, 1.550 $s^{-1}$, 1.575 $s^{-1}$, 1.600 $s^{-1}$, 1.625 $s^{-1}$, 1.650 $s^{-1}$, 1.675 $s^{-1}$, 1.700 $s^{-1}$, 1.725 $s^{-1}$, 1.750 $s^{-1}$, 1.775 $s^{-1}$, 1.800 $s^{-1}$, 1.825 $s^{-1}$, 1.850 $s^{-1}$, 1.875 $s^{-1}$, 1.900 $s^{-1}$, 1.925 $s^{-1}$, 1.950 $s^{-1}$, 1.975 $s^{-1}$, 2.000 $s^{-1}$, 2.025 $s^{-1}$, 2.050 $s^{-1}$, 2.075 $s^{-1}$, 2.100 $s^{-1}$, 2.125 $s^{-1}$, 2.150 $s^{-1}$, 2.175 $s^{-1}$, 2.200 $s^{-1}$, 2.225 $s^{-1}$, or 2.250 $s^{-1}$. In some embodiments, the method has a turnover frequency at an overpotential of 1.0 V vs. RHE of 1.59 $s^{-1}$.

Method of Forming Oxygen Via OER

The present disclosure also relates to a method of forming oxygen gas via the oxygen evolution reaction using the electrocatalyst. In some embodiments, method includes contacting the electrocatalyst with an aqueous electrolyte solution comprising a hydroxide base. Examples of suitable hydroxide bases include, but are not limited, to NaOH, LiOH, Ca(OH)$_2$, Ba(OH)$_2$, Sr(OH)$_2$, Mg(OH)$_2$, NH$_4$OH, Al(OH)$_3$, Zn(OH)$_2$, Fe(OH)$_3$, Cu(OH)$_2$, AgOH, NH$_3$, RbOH, CsOH, LiOH, NaOH, KOH, Ca(OH)$_2$, Mg(OH)$_2$, Mn(OH)$_2$, Pb(OH)$_2$, Co(OH)$_2$, Ni(OH)$_2$, Cu(OH)$_2$, AgOH, TiOH, Ga(OH)$_3$, In(OH)$_3$, Fe(OH)$_2$, and Cr(OH)$_3$. In some embodiments, the hydroxide base is KOH. In some embodiments, the concentration of the hydroxide base may range from 0.5-5 M based on the concentration of hydroxide anion. For example, the electrolyte solution can have a hydroxide anion concentration of 0.5 M, 0.75 M, 1.0 M, 1.25 M, 1.5 M, 1.75 M, 2.0 M, 2.25 M, 2.5 M, 2.75 M, 3.0 M, 3.25 M, 3.5 M, 3.75 M, 4.0 M, 4.25 M, 4.5 M, 4.75 M, or 5.0 M. In some embodiments, the electrolyte solution has a KOH concentration of 1.0 M.

The method further includes applying a potential of 1000 to 2200 mV vs. RHE to the electrocatalyst and a counter electrode immersed in the aqueous electrolyte solution. In general, the counter electrode can be any suitable type of electrode. Examples of electrodes which may be used as the counter electrode include, but are not limited to, platinum, gold, graphite, carbon, nickel, copper, titanium, aluminum, stainless steel, iridium, tungsten, rhodium, palladium, iridium oxide, ruthenium oxide, conductive polymer, carbon nanotubes, carbon black, conductive glass, ITO (indium tin oxide), FTO (fluorine-doped tin oxide), glassy carbon, doped silicon, lead, bismuth, cobalt, zinc, copper oxide, iron, tin, zirconium, molybdenum, manganese, tungsten carbide, graphite oxide, copper sulfate, nickel oxide, carbon fiber, titanium oxide, and diamond-like carbon. In some embodiments, the counter electrode is silver/silver chloride.

In some embodiment, potential may range from 1000 to 2200 mV vs. RHE. For example, the potential may be 1000 mV, 1025 mV, 1050 mV, 1075 mV, 1100 mV, 1125 mV, 1150 mV, 1175 mV, 1200 mV, 1225 mV, 1250 mV, 1275 mV, 1300 mV, 1325 mV, 1350 mV, 1375 mV, 1400 mV, 1425 mV, 1450 mV, 1475 mV, 1500 mV, 1525 mV, 1550 mV, 1575 mV, 1600 mV, 1625 mV, 1650 mV, 1675 mV, 1700 mV, 1725 mV, 1750 mV, 1775 mV, 1800 mV, 1825 mV, 1850 mV, 1875 mV, 1900 mV, 1925 mV, 1950 mV, 1975 mV, 2000 mV, 2025 mV, 2050 mV, 2075 mV, 2100 mV, 2125 mV, 2150 mV, 2175 mV, or 2200 mV vs. RHE.

In some embodiments, the electrocatalyst has an electrical resistivity ranging from $0.50 \times 10^7 \Omega$ to $6.0 \times 10^7 \Omega$. For example, the electrocatalyst may have an electrical resistivity of $0.50 \times 10^7 \Omega$, $0.75 \times 10^7 \Omega$, $1.00 \times 10^7 \Omega$, $1.25 \times 10^7 \Omega$, $1.50 \times 10^7 \Omega$, $1.75 \times 10^7 \Omega$, $2.00 \times 10^7 \Omega$, $2.25 \times 10^7 \Omega$, $2.50 \times 10^7 \Omega$, $2.75 \times 10^7 \Omega$, $3.00 \times 10^7 \Omega$, $3.25 \times 10^7 \Omega$, $3.50 \times 10^7 \Omega$, $3.75 \times 10^7 \Omega$, $4.00 \times 10^7 \Omega$, $4.25 \times 10^7 \Omega$, $4.50 \times 10^7 \Omega$, $4.75 \times 10^7 \Omega$, $5.00 \times 10^7 \Omega$, $5.25 \times 10^7 \Omega$, $5.50 \times 10^7 \Omega$, $5.75 \times 10^7 \Omega$, or $6.00 \times 10^7 \Omega$. In some embodiments, the electrocatalyst exhibits electrical resistivity of $5.9 \times 10^7 \Omega$. In some embodiments, the electrocatalyst exhibits electrical resistivity of $4.0 \times 10^7 \Omega$. In some embodiments, the electrocatalyst exhibits electrical resistivity of $0.61 \times 10^7 \Omega$. In some embodiments, the electrocatalyst exhibits electrical resistivity of $0.95 \times 10^7 \Omega$.

In some embodiments, the electrocatalyst has a charge transfer resistance ranging from 325 to 450$\Omega$. For example, the electrocatalyst may have a charge transfer resistance of 325$\Omega$, 330$\Omega$, 335$\Omega$, 340$\Omega$, 345$\Omega$, 350$\Omega$, 355$\Omega$, 360$\Omega$, 365$\Omega$, 370$\Omega$, 375$\Omega$, 380$\Omega$, 385$\Omega$, 390$\Omega$, 395$\Omega$, 400$\Omega$, 405$\Omega$, 410$\Omega$, 415$\Omega$, 420$\Omega$, 425$\Omega$, 430$\Omega$, 435$\Omega$, 440$\Omega$, 445$\Omega$, or 450$\Omega$. In some embodiments, the electrocatalyst has a charge transfer resistance of 340$\Omega$. In some embodiments, the electrocatalyst has a charge transfer resistance of 430$\Omega$.

In some embodiment, the electrocatalyst has a Tafel slope ranging from 45 to 125 mV/dec. For example, the electrocatalyst may have a Tafel slope of 45 mV/dec, 47.5 mV/dec, 50 mV/dec, 52.5 mV/dec, 55 mV/dec, 57.5 mV/dec, 60 mV/dec, 62.5 mV/dec, 65 mV/dec, 67.5 mV/dec, 70 mV/dec, 72.5 mV/dec, 75 mV/dec, 77.5 mV/dec, 80 mV/dec, 82.5 mV/dec, 85 mV/dec, 87.5 mV/dec, 90 mV/dec, 92.5 mV/dec, 95 mV/dec, 97.5 mV/dec, 100 mV/dec, 102.5 mV/dec, 105 mV/dec, 107.5 mV/dec, 110 mV/dec, 112.5 mV/dec, 115 mV/dec, 117.5 mV/dec, 120 mV/dec, 122.5 mV/dec, or 125 mV/dec. In some embodiments, the electrocatalyst has a Tafel slope of 50.7 mV/dec.

In some embodiments, the electrocatalyst has an overpotential at 10 mA/cm$^2$ of 0.05 to 200 mV For example, the electrocatalyst may have an overpotential at 10 mA/cm$^2$ of 0.05 mV, 0.5 mV, 1 mV, 2.5 mV, 5 mV, 7.5 mV, 10 mV, 12.5 mV, 15 mV, 17.5 mV, 20 mV, 22.5 mV, 25 mV, 27.5 mV, 30 mV, 32.5 mV, 35 mV, 37.5 mV, 40 mV, 42.5 mV, 45 mV, 47.5 mV, 50 mV, 52.5 mV, 55 mV, 57.5 mV, 60 mV, 62.5 mV, 65 mV, 67.5 mV, 70 mV, 72.5 mV, 75 mV, 77.5 mV, 80 mV, 82.5 mV, 85 mV, 87.5 mV, 90 mV, 92.5 mV, 95 mV, 97.5 mV, 100 mV, 102.5 mV, 105 mV, 107.5 mV, 110 mV, 112.5 mV, 115 mV, 117.5 mV, 120 mV, 122.5 mV, 125 mV, 127.5 mV, 130 mV, 132.5 mV, 135 mV, 137.5 mV, 140 mV, 142.5 mV, 145 mV, 147.5 mV, 150 mV, 152.5 mV, 155 mV, 157.5 mV, 160 mV, 162.5 mV, 165 mV, 167.5 mV, 170 mV, 172.5 mV, 175 mV, 177.5 mV, 180 mV, 182.5 mV, 185 mV, 187.5 mV, 190 mV, 192.5 mV, 195 mV, 197.5 mV, or 200 mV. In some embodiments, the electrocatalyst has an overpotential at 10 mA/cm$^2$ of 280 mV.

In some embodiments, the electrocatalyst has a Faradic efficiency of at least 85%. For example, the electrocatalyst may have a Faradic efficiency of 85%, 86%, 87%, 88%, 89%, 90% 91%, 92%, 93%, 94%, 95%, 96%, 97%, 98% or 99%.

In some embodiments, the electrocatalyst has a turnover frequency at an overpotential of 1.0 V vs. RHE ranging from 0.300 to 1.250 s$^{-1}$. For example, the electrocatalyst can have a turnover frequency at an overpotential of 1.0 V of 0.325 s$^{-1}$, 0.350 s$^{-1}$, 0.375 s$^{-1}$, 0.400 s$^{-1}$, 0.425 s$^{-1}$, 0.450 s$^{-1}$, 0.475 s$^{-1}$, 0.500 s$^{-1}$, 0.525 s$^{-1}$, 0.550 s$^{-1}$, 0.575 s$^{-1}$, 0.600 s$^{-1}$, 0.625 s$^{-1}$, 0.65 s$^{-1}$, 0.675 s$^{-1}$, 0.700 s$^{-1}$, 0.725 s$^{-1}$, 0.750 s$^{-1}$, 0.775 s$^{-1}$, 0.800 s$^{-1}$, 0.825 s$^{-1}$, 0.850 s$^{-1}$, 0.875 s$^{-1}$, 0.900 s$^{-1}$, 0.925 s$^{-1}$, 0.950 s$^{-1}$, 0.975 s$^{-1}$, 1.000 s$^{-1}$, 1.025 s$^{-1}$, 1.050 s$^{-1}$, 1.075 s$^{-1}$, 1.100 s$^{-1}$, 1.125 s$^{-1}$, 1.150 s$^{-1}$, 1.175 s$^{-1}$, 1.200 s$^{-1}$, 1.225 s$^{-1}$, or 1.250 s$^{-1}$. In some embodiments, the electrocatalyst has a turnover frequency at an overpotential of 1.0 V vs. RHE of 1.17 s$^{-1}$.

EXAMPLES

The following examples demonstrate a method of producing hydrogen gas by a hydrogen evolution reaction (HER) using electrocatalyst. The examples are provided solely for illustration and are not to be construed as limitations of the present disclosure, as many variations thereof are possible without departing from the spirit and scope of the present disclosure.

Example 1: Materials

Manganese (II) acetate tetrahydrate (Mn(CH$_3$COO)$_2$·4H$_2$O, 99%) from Acros Organics, Belgium, polyvinylpyrrolidone (PVP), sodium hydroxide (NaOH, 98.5%), and sodium tungstate dihydrate (Na$_2$WO$_4$·2H$_2$O) (99%) from Merck, Germany, silver nitrate (99%) was supplied by Sigma-Aldrich, USA, and potassium hydroxide (85%) (KOH) and sodium dodecyl sulphate (99%) (SDS) were provided by Panreac Quimica, Spain.

Example 2: Synthesis of Manganese Oxide (Mn$_3$O$_4$)

The synthesis of Mn$_3$O$_4$ was conducted by dissolving 13.1 millimole (mmol) of Mn(CH$_3$COO)$_2$·4H$_2$O in 100 milliliter (mL) of bi-distilled water in 2.4 H$_2$O with 3.0 grams (g) of PVP. Further, 44 mL of 2.0 moles per liter (M) NaOH was added to the above solution, and the solution began to reflux at a temperature of about 95° C. while being stirred, resulting in the formation of a light brown precipitate. The obtained precipitate was centrifuged and washed three times with an ethanol/water solution, and after the combination, it was cooled to room temperature.

Example 3: Synthesis of Alpha-Silver Tungstate (α-Ag$_2$WO$_4$)

The pure Ag$_2$WO$_4$ catalyst was synthesized by an aqueous solution of sodium tungstate. Na$_2$WO$_4$·2H$_2$O was prepared by dispersing 0.171 g within 40 mL of distilled water in the presence of 0.1 g PVP and 0.05 g SDS. It was then mixed with 0.001 mol of silver nitrate (AgNO$_3$) dissolved in distilled water under stirring for 1 h to generate a yellowish suspension. Further, the obtained suspension was transferred to a stainless-steel autoclave for 10 h at 140° C. Finally, the precipitate was filtered and subjected to two ethanol/water baths. After heating at 80° C. overnight, a bright brown powder was obtained.

Example 4: Preparation of α-Ag$_2$WO$_4$/Mn$_3$O$_4$ Nanocomposites

FIG. 1 shows a schematic illustration of an exemplary scheme used to synthesize α-Ag$_2$WO$_4$/Mn$_3$O$_4$ nanocomposites. 20% α-Ag$_2$WO$_4$/Mn$_3$O$_4$ nanocomposite was prepared by a surfactant mixture containing 0.043 g of Na$_2$WO$_4$·2H$_2$O, PVP, and SDS. The above-mentioned mixture was stirred into a 0.3 g suspension of Mn$_3$O$_4$. The resultant suspension was further added and agitated for 30 min with 0.044 g AgNO$_3$ dispersed in 10 mL of distilled water. Further, the obtained mixture was transferred to the stainless-steel autoclave at 140° C. for 10 h. The resulting precipitate was filtered to collect the solid, which was rinsed twice with an ethanol/water solution. Furthermore, the mixture was heated at 60° C. for 10 hours overnight. The obtained composite was designated as 20 AgW/Mn.

The other composites were prepared via a similar process, with Ag$_2$WO$_4$ having weight ratios of about 80 wt. %, 60 wt. %, and 40 wt. % in Mn$_3$O$_4$ using definite amounts of Na$_2$WO$_4$·2H$_2$O and AgNO$_3$. The samples were denoted as 80 AgW/Mn, 60 AgW/Mn, and 40 AgW/Mn, respectively.

Example 5: Characterization

X-ray diffraction (XRD) analysis was used to characterize the nanocomposites. The XRD was conducted using a high-resolution diffractometer, Bruker D8. The patterns were obtained with Cu-Kα radiation (λ=1.5418 Å). At 40 kV and 40 mA, the diffractograms were tested at 2 angles between 10° and 80°. Electron microscopy images were obtained using a Tecnai G20 transmission electron microscope (TEM) with a 200 kV accelerating voltage, further, high-resolution transmission electron microscopy-selected area electron diffraction (HRTEM-SAED) photos were captured and analyzed. Elemental analysis of the surfaces of samples was achieved via a thermo NORAN system for energy dispersive X-ray (EDX) spectroscopy. After being exposed to monochromatic Al—K irradiation, the binding energies of the developed catalysts were measured with a KRATOS-AXIS spectrometer and standardized using C 1s (284.6 eV). Nitrogen adsorption-desorption was carried out on materials that were previously vacuum-treated for a period of 2 h at 90° C. using a micrometrics ASAP 2020 apparatus at a temperature of 77 Kelvin (K) to calculate the pore diameter, volume of pore, and surface area (SBET). With assistance from a computerized LCR bridge, HIOKI: IM 3536, the electrical characteristics including the dielectric constant (ε') and resistance (R$_{DC}$), were evaluated at a constant voltage of 1 V, zero Hz, and at a temperature of about 25° C. The evaluates for ε' was computed using the following equation (1):

$$\varepsilon' = (C/\varepsilon^\circ) \times (t/A_S) \tag{1}$$

where 't' is the sample thickness, 'C' is the equivalent capacitance, 'ε°' is the permittivity of the vacuum, and 'A$_S$' is the area of the specimen.

Example 6: Water Splitting

The electrochemical measurements of oxygen evolution reaction (OER) and hydrogen evolution reaction (HER), as well as impedance data, were evaluated in a three-electrode cell using a computerized lab PGSTAT204 device with Nova software. Cyclic voltammograms (CV) and linear sweep voltammetry (LSV) were used to measure the polarization curves in 1.0 M KOH (LSV). Impedance spectra with an amplitude of 5 mV and a frequency range of 0.1 Hz to 106 Hz were examined using the Kramers-Kronig transformation. The counter and reference electrode was a platinum trip, with a regular area of 1.0 cm$^2$, and an Ag/AgCl (3 M KCl solution) electrode was used as the reference electrode in an alkaline solution, correspondingly. In a compartment holding KOH (1.0 M) solution, the former electrodes were linked to the working electrodes (built via PVDF). The equation which was used to refer to the reversible hydrogen electrode (RHE) is provided in equation (2):

$$E_{RHE} = E_{Ag/AgCl} + 0.059 \text{ pH} + 0.1976 \tag{2}$$

The linear LSV tests were conducted with a scan rate of 5 mV/s, and the electrochemical active surface area (ECSA) was assessed via the electrical double-layer capacitance. The CV tests were carried out at different scan rates of 10 mV/s, 20 mV/s, 50 mV/s, 70 mV/s, 100 mV/s, and 150 mV/s. Electrochemical impedance spectroscopy (EIS) measurements were conducted at a frequency margin of 100 kHz to 0.01 Hz. Chronoamperometry measurements of all electrocatalysts assessed their stability at 1.5 V vs. RHE in 1.0 M KOH solution for 5000 s. The Mott-Schottky plots of Mn$_3$O$_4$ and Ag$_2$WO$_4$ samples were carried out by measuring the electrochemical impedance at room temperature with the chosen frequency of 1000 Hz based on the capacitance against applied potential measurements. The DC potential was kept in the range from 0 to 1.8 V vs. RHE for Mn$_3$O$_4$ and Ag$_2$WO$_4$. Using a gas chromatograph (GC7900) with argon as the carrier gas, the produced H$_2$ and O$_2$ contents are determined throughout the reaction.

The turnover frequency (TOF), which is defined as the rate of production of oxygen or hydrogen molecules per active site, was measured using the following equation (3):

$$TOF = \frac{j \times A}{F \times n \times m} \quad (3)$$

Where 'j' is the measured current density at a fixed overpotential, 'F' is Faraday's constant at about 96,485 coulombs per mole (C/mol), 'n' is the number of electrons involved (n=2 for HER half-reaction, and n=4 for OER), 'm' is the number of moles of the active sites. The number of moles of active species is calculated from the required weight percentage of AgW/Mn species coated on the working electrode according to equation (4):

$$m = w/MW \quad (4)$$

where 'w' is the weight of AgW/Mn taken in the sample and 'MW' is the molecular weight of AgW/Mn.

Example 7: X-Ray Diffraction Results

Figure 2:
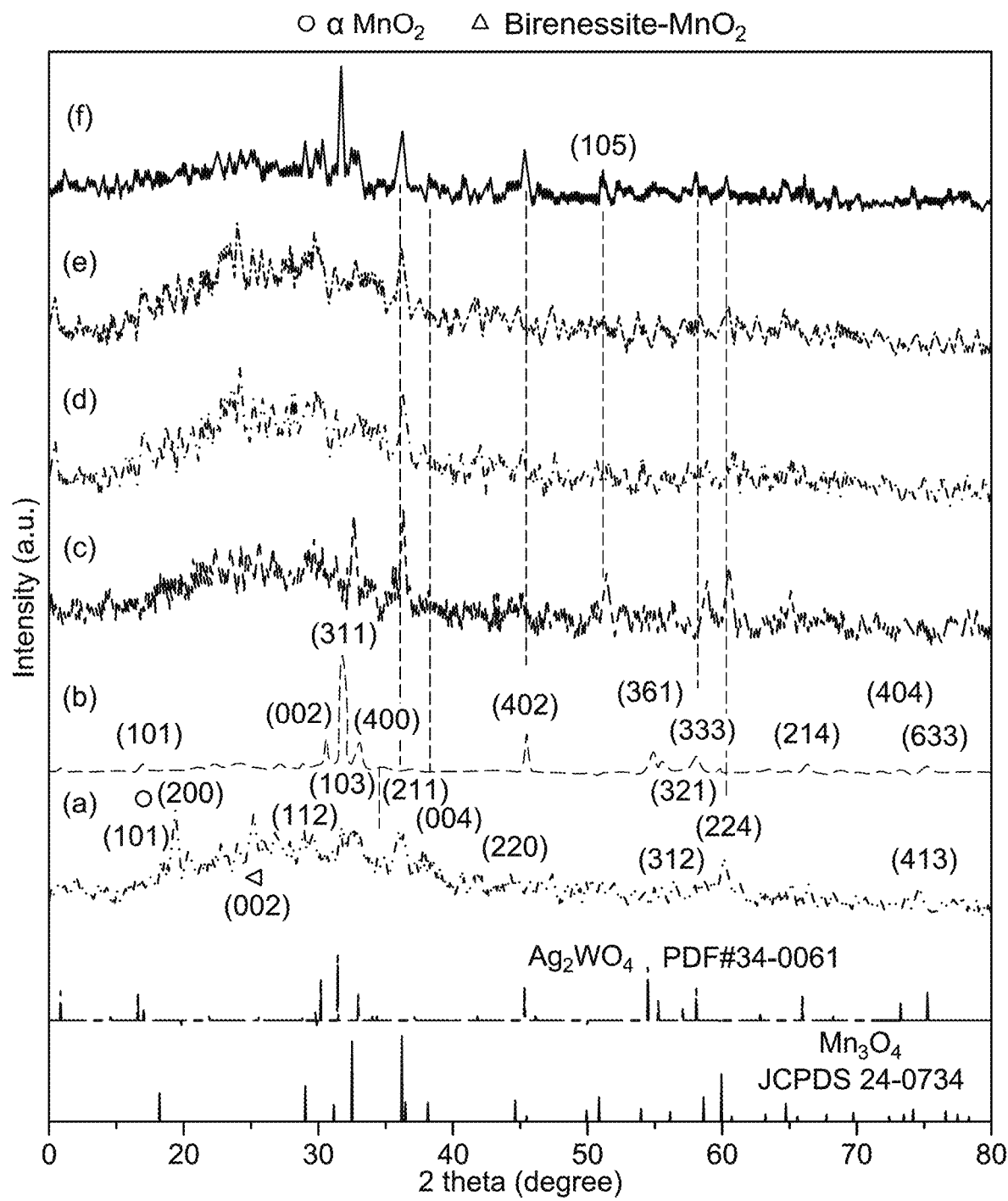
FIG. 2 shows X-ray diffraction (XRD) pattern of pure $Mn_3O_4$ phase, α-$Ag_2WO_4$ (AgW), 20% α-$Ag_2WO_4$ in $Mn_3O_4$ nanocomposite (20AgW/Mn), 40% α-$Ag_2WO_4$ in $Mn_3O_4$ nanocomposite (40AgW/Mn), 20% α-$Ag_2WO_4$ in $Mn_3O_4$ nanocomposite (20AgW/Mn) 60AgW/Mn, and 20% α-$Ag_2WO_4$ in $Mn_3O_4$ nanocomposite (20AgW/Mn) 80AgW/Mn, with reference standards, according to certain embodiments.

The phase and crystal structure of $Mn_3O_4$, AgW, and AgW/Mn nanocomposites were determined by XRD, and the resulting patterns are shown in FIG. 2. The $Mn_3O_4$ pattern exhibited diffraction peaks designating to the (101), (112), (103), (211), (004), (220), (312), (321), (224), and (413) planes, consistent with the tetragonal crystal structure as per JCPDS no. 89-4837. Further, several resolved peaks, constituting 18 wt. % of the $Mn_3O_4$ phase, were attributed to the (200) and (002) planes, characteristic of $MnO_2$. The diffraction pattern obtained for the characteristic peaks of orthorhombic $\alpha$-$Ag_2WO_4$ aligned well with (101), (002), (311), (400), (402), (361), (333), (214), (404) and (633) crystallographic planes and may be identified using JCPDS no. 034-0061. Furthermore, the presence of Ag nanoparticles may not be detectable, as the expected diffraction planes for Ag coincide with the peaks of $Mn_3O_4$, except for the plane denoted by (220), which may be observed at 2θ=64.5°.

As can be seen from FIG. 2, the XRD pattern of the 20 AgW/Mn sample displayed several notable differences compared to the distinct analogs. The appearance of peaks related to both $Ag_2WO_4$ and $Mn_3O_4$ indicated the formation of a hybrid structure. A broad band was observed, with peaks gradually disappearing at 2θ=30°. In addition, a new peak at 2θ=52° was observed, attributed to the $Mn_3O_4$ (105) plane. A shift into higher 2θ values was shown in the AgW/Mn composite peaks, indicating the participation of the components that make up the composites and, besides, a reduction in unit cells. A significant reduction in intensity was detected due to increasing the AgW percent from 40 wt. % to 80 wt. %. This indicated a decrease in particle size. For the 80 AgW/Mn sample, the properties of the $Mn_3O_4$ phase, which had previously predominated in the 60 AgW/Mn pattern with residual AgW phase, are inverted. The average size of the nanocomposites is calculated based on the Scherrer equation (5):

$$D = K(\lambda)/\beta(\cos\theta) \quad (5)$$

[Tang, J. & Ye, J., J. Mater. Chem., 2005, 15, 4246-51, incorporated herein by reference in its entirety]. The average size of 20 AgW/Mn, 40 AgW/Mn, 60 AgW/Mn, and 80 AgW/Mn were found to be 25.6 nm, 7.1 nm, 7.6 nm, and 40 nm, respectively.

Example 8: Electron Microscopy Results

Figure 3A:
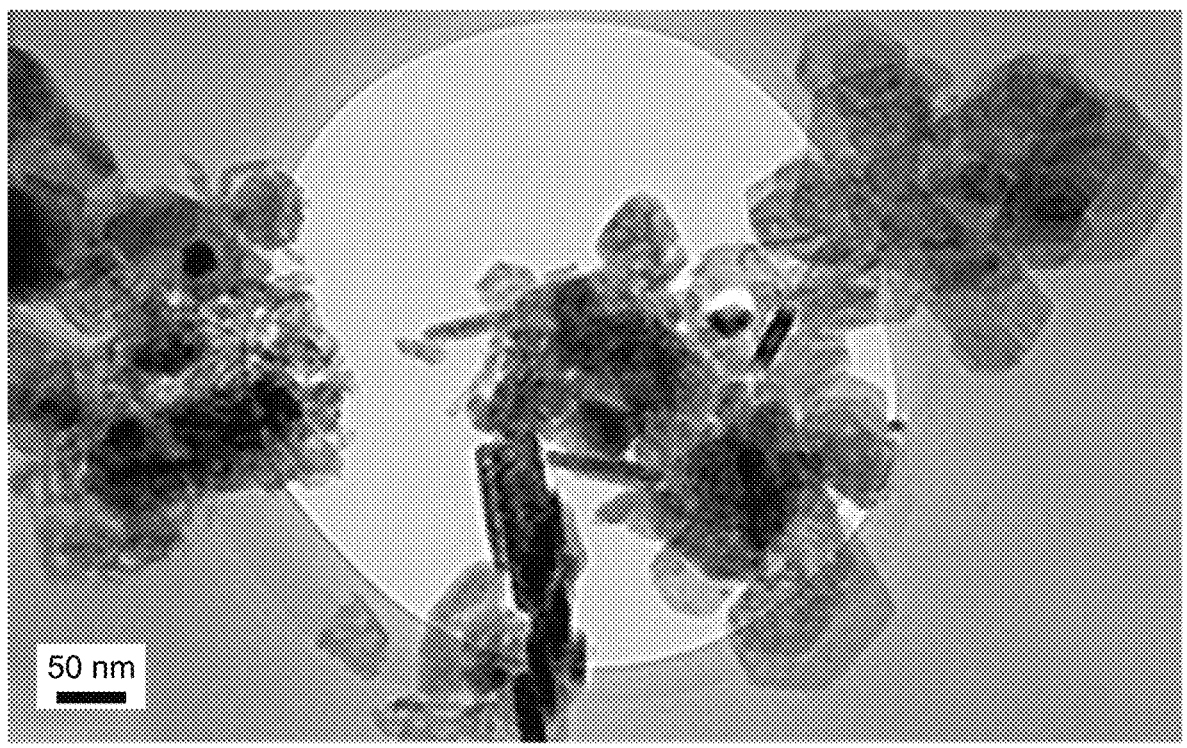
FIG. 3A shows a transmission electron microscopy (TEM) image of $Mn_3O_4$, according to certain embodiments.
Figure 3B:
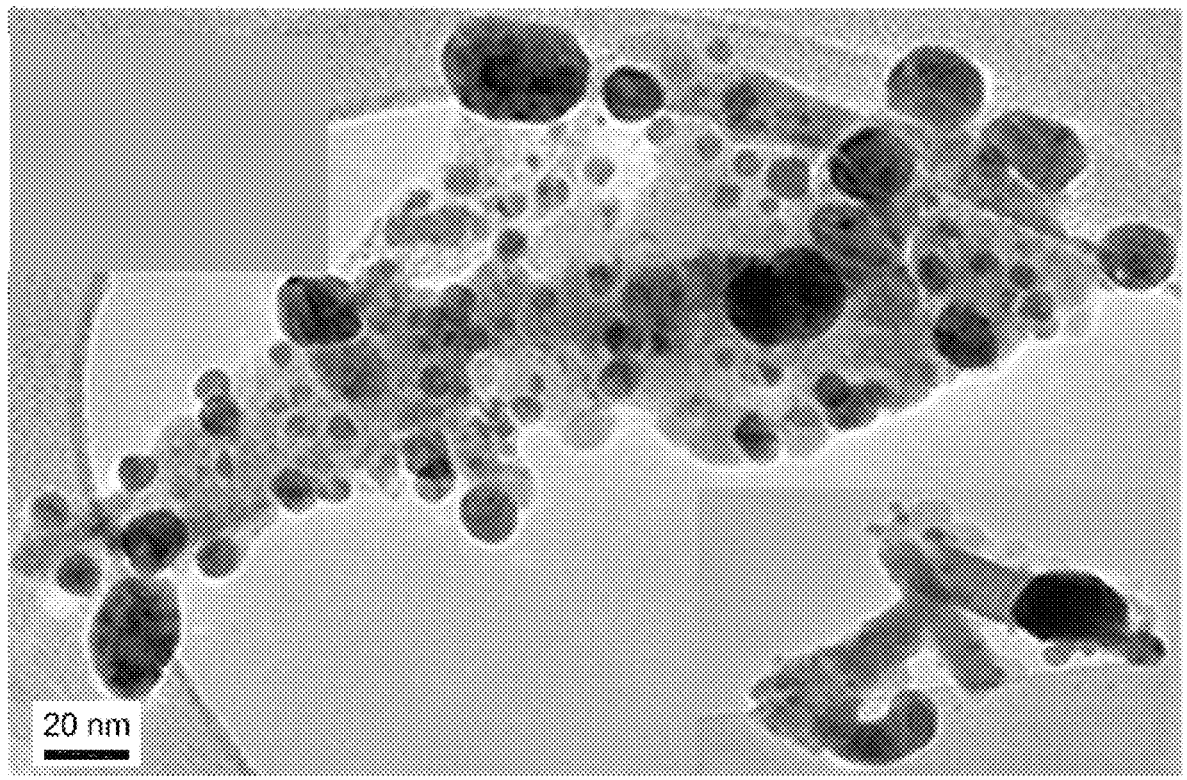
FIGS. 3B-3C show TEM images of AgW, according to certain embodiments.
Figure 3C:
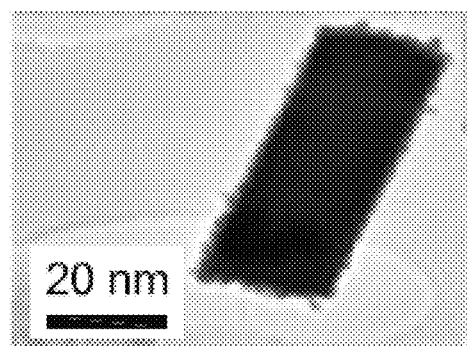
Figure 3G:
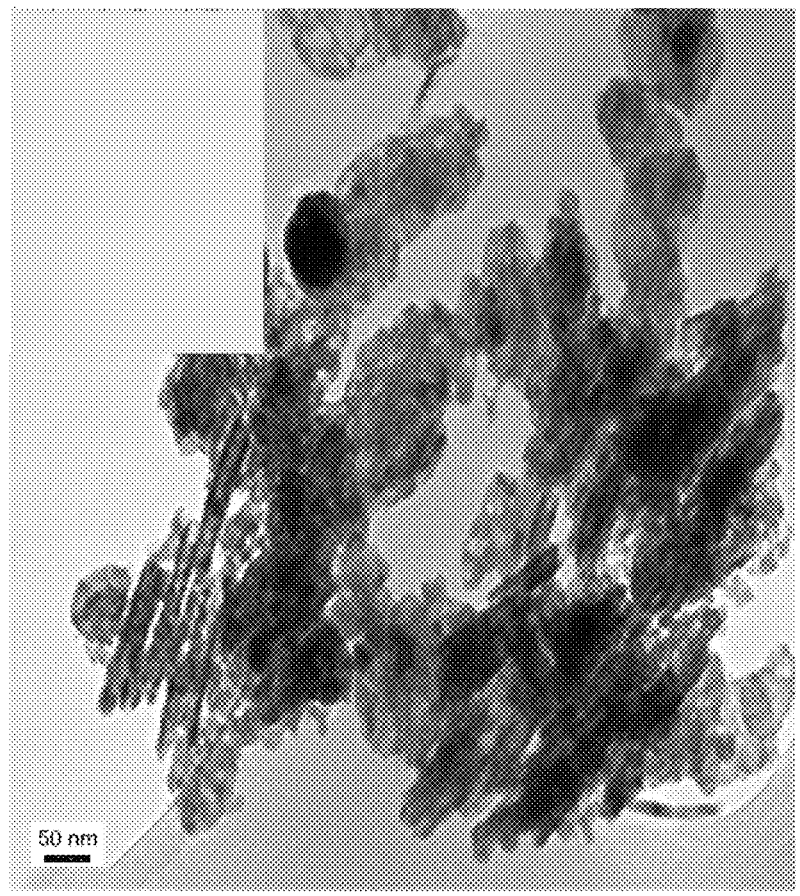
FIGS. 3G-3H show TEM images of 60 AgW/Mn, according to certain embodiments.
Figure 3H:
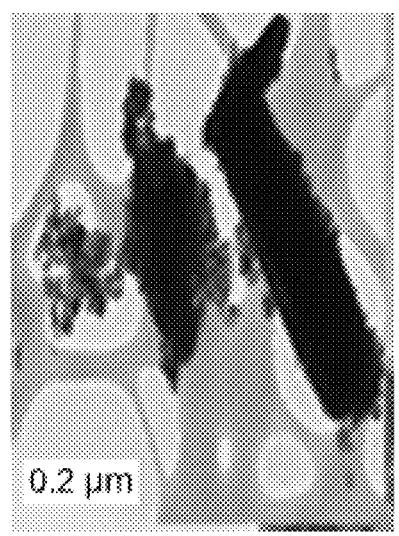
Figure 3:
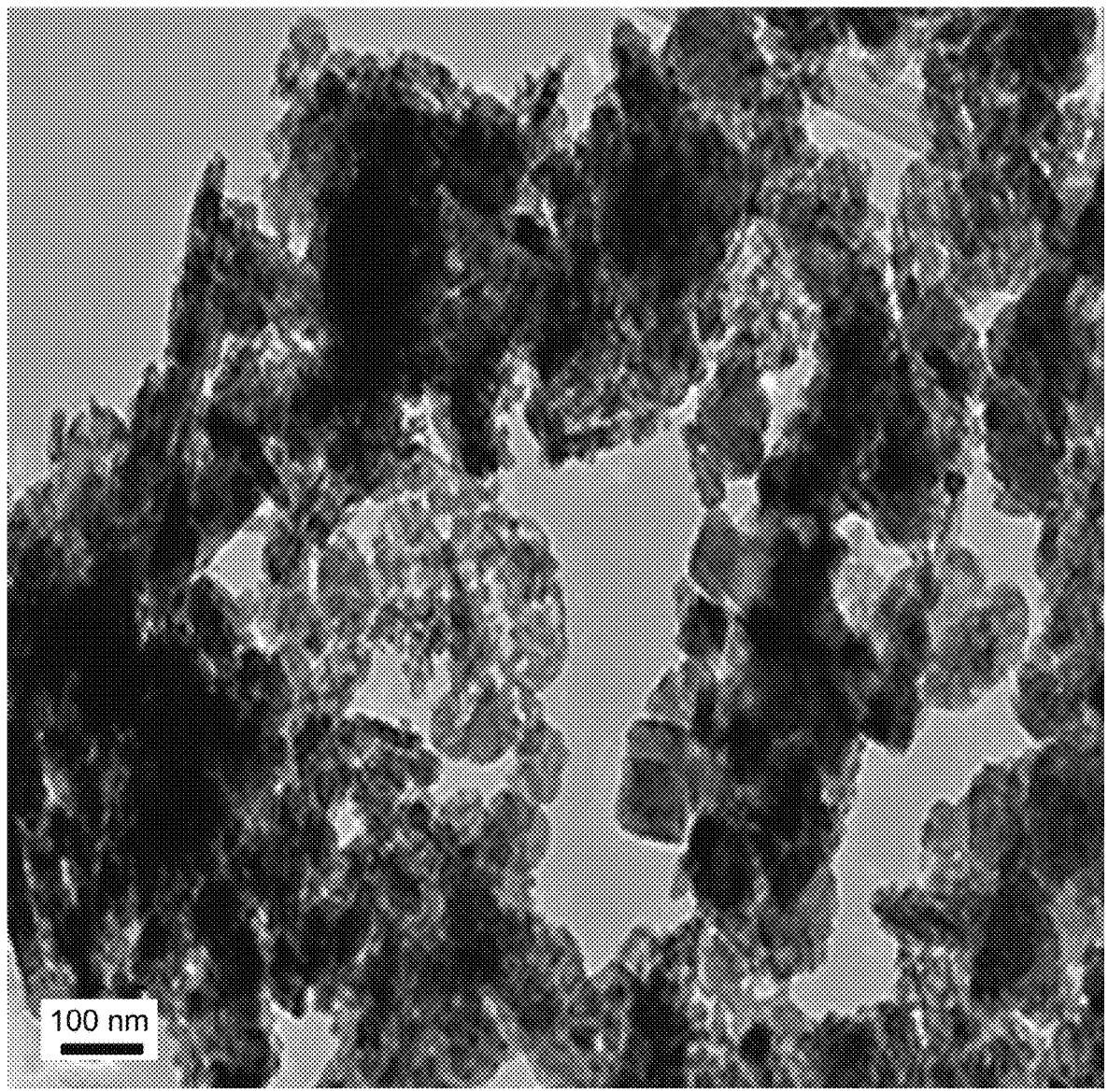
FIGS. 3D-3F show TEM images of 20 AgW/Mn, according to certain embodiments.
FIG. 3I shows a TEM image of 80 AgW/Mn, according to certain embodiments.
Figure 4A:
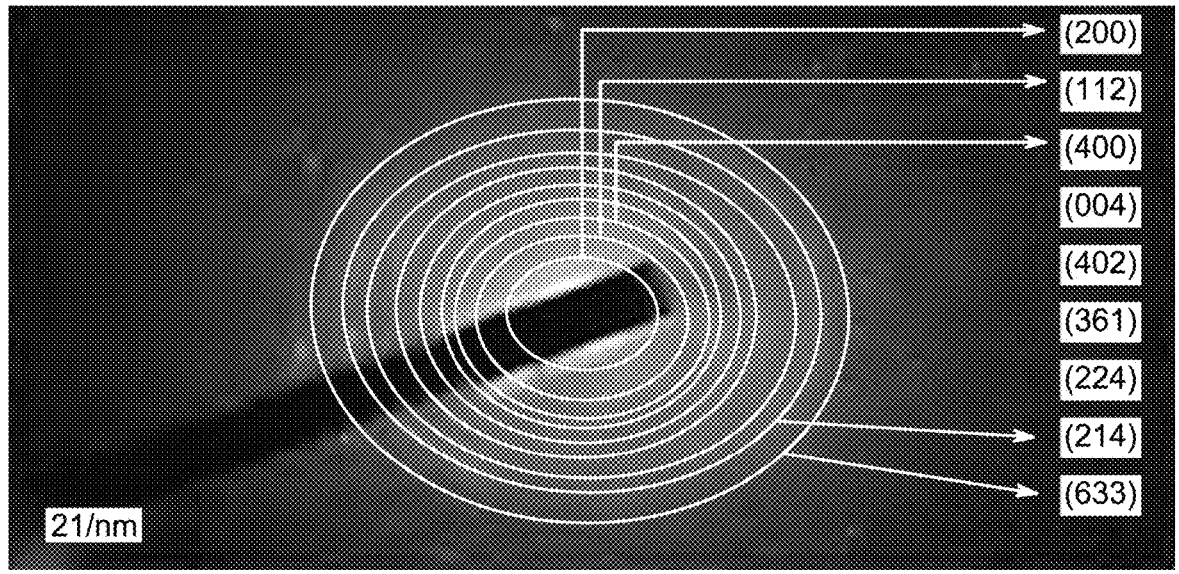
FIG. 4A shows a high-resolution transmission electron microscopy (HRTEM) image of pure $Mn_3O_4$, according to certain embodiments.
Figure 4B:
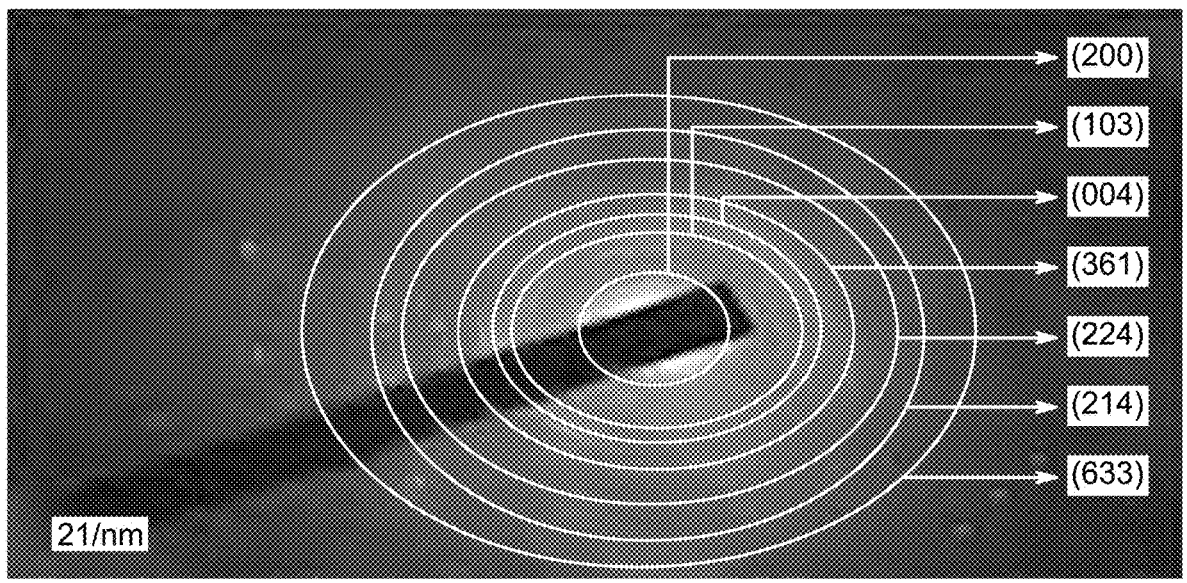
FIG. 4B shows a HRTEM image of AgW, according to certain embodiments.
Figure 4C:
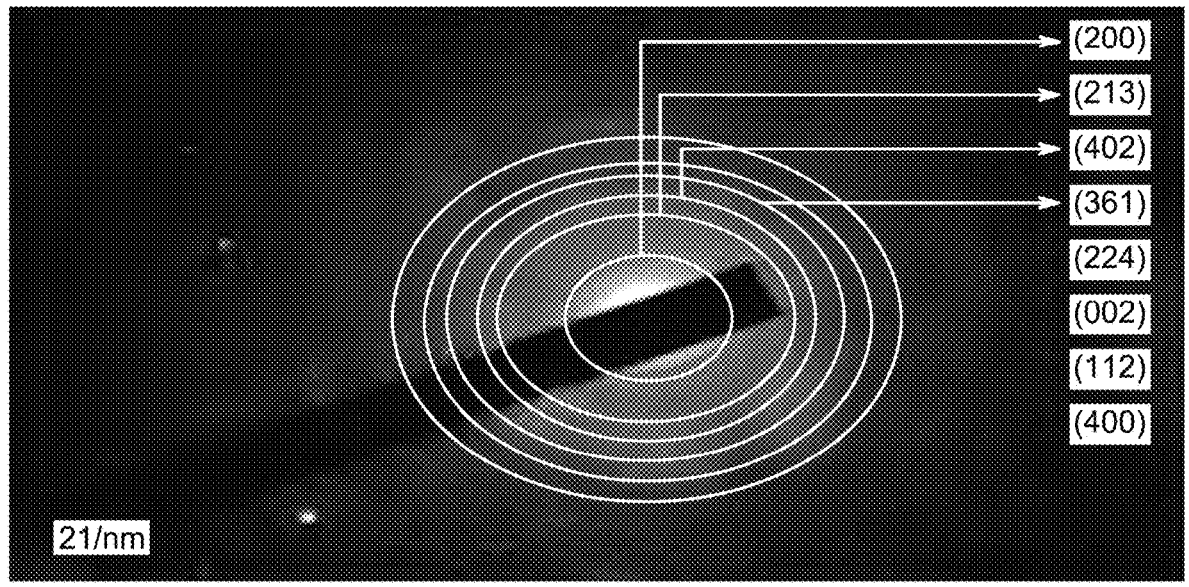
FIG. 4C shows a HR-TEM image of 20 AgW/Mn, according to certain embodiments.
Figure 4D:
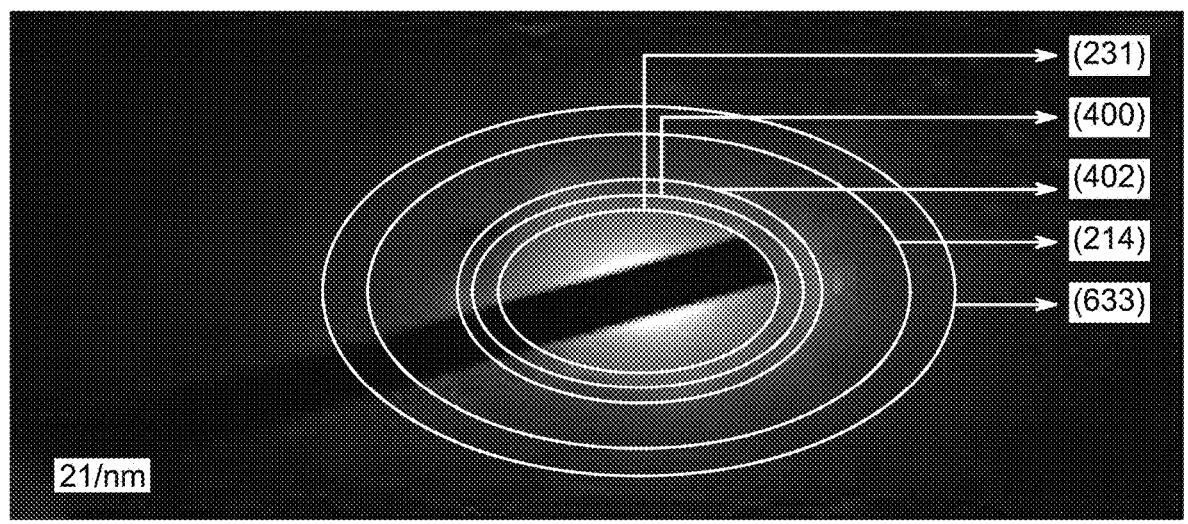
FIG. 4D shows a HR-TEM image of 40 AgW/Mn, according to certain embodiments.
Figure 4E:
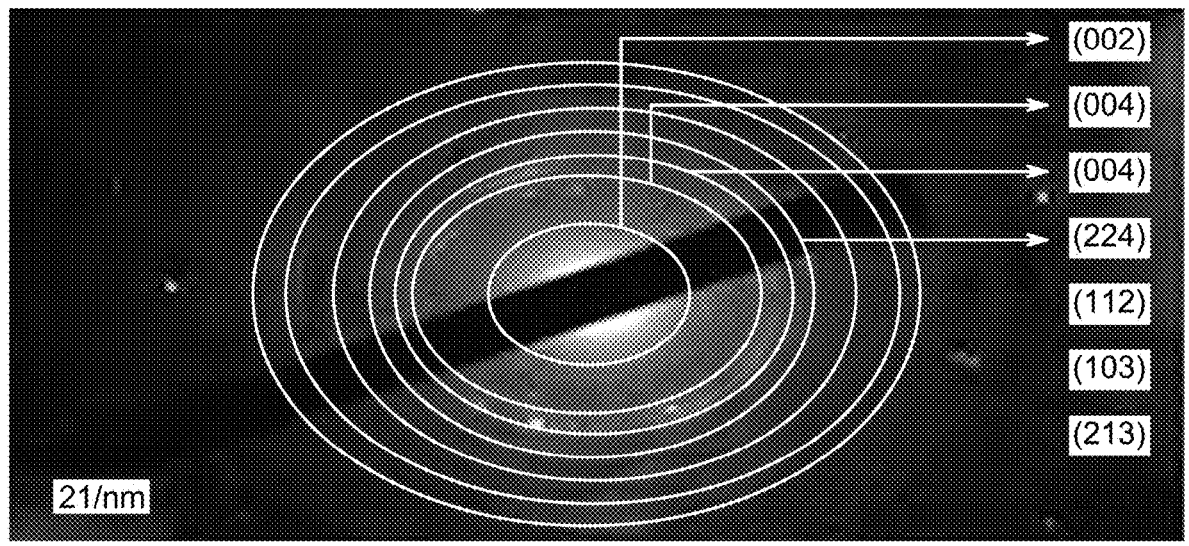
FIG. 4E shows a HR-TEM image of 80 AgW/Mn, according to certain embodiments.
Figure 5A:
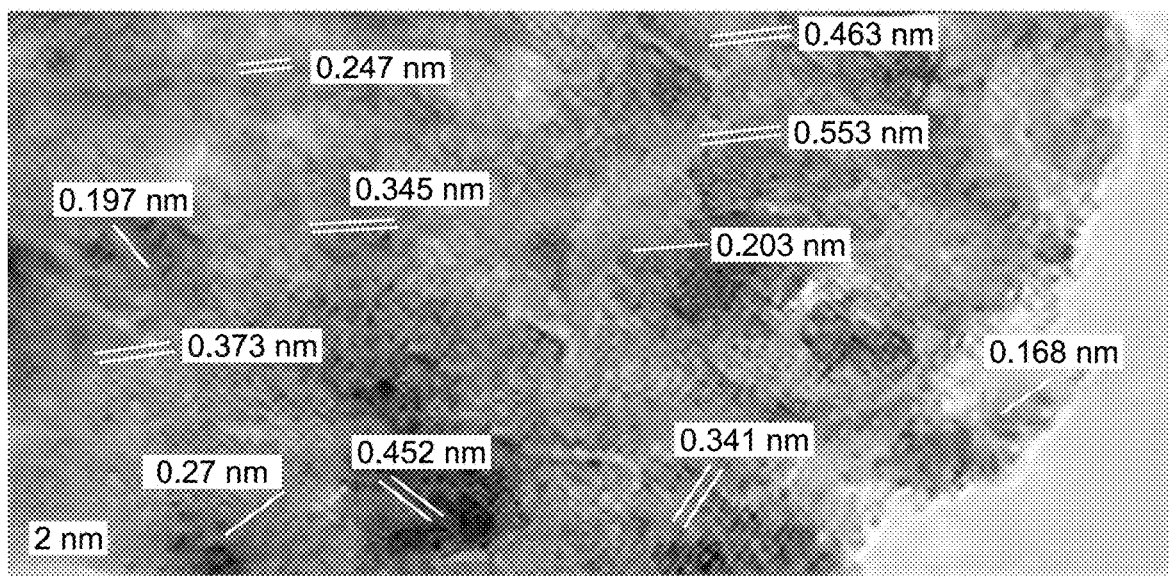
FIG. 5A shows a selected area electron diffraction (SAED) profile of pure $Mn_3O_4$, according to certain embodiments.
Figure 5B:
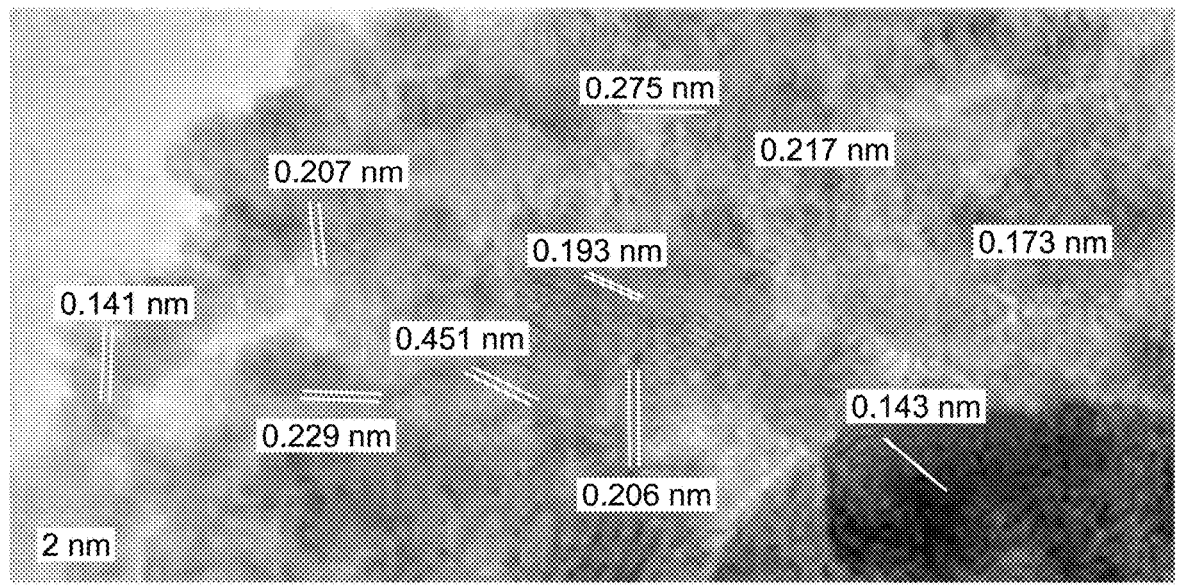
FIG. 5B shows a SAED profile of AgW, according to certain embodiments.
Figure 5C:
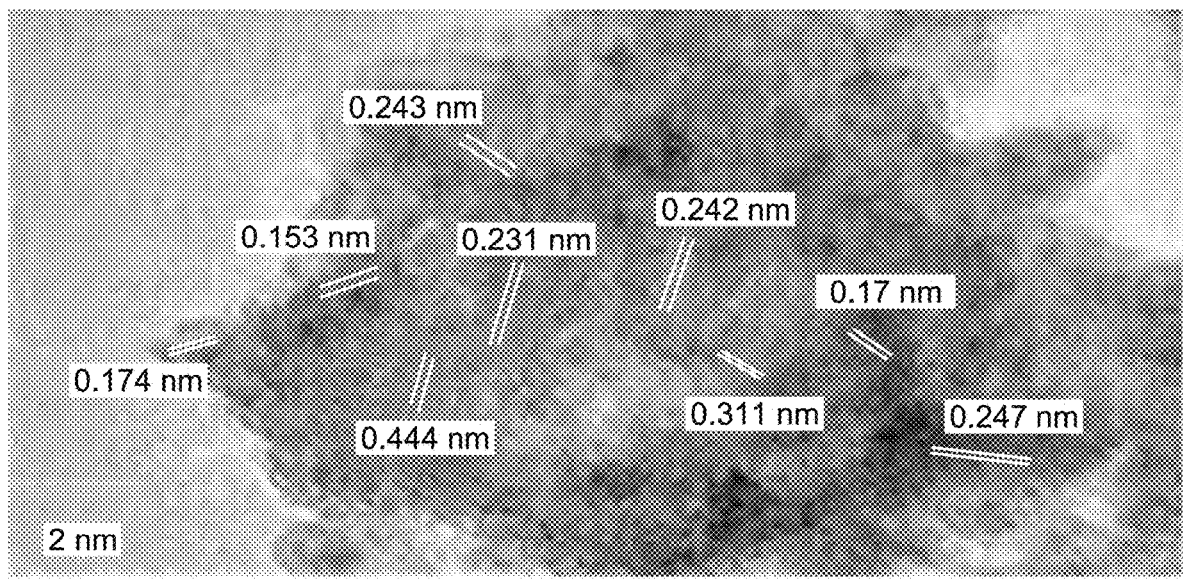
FIG. 5C shows a SAED profile of 20 AgW/Mn, according to certain embodiments.
Figure 5D:
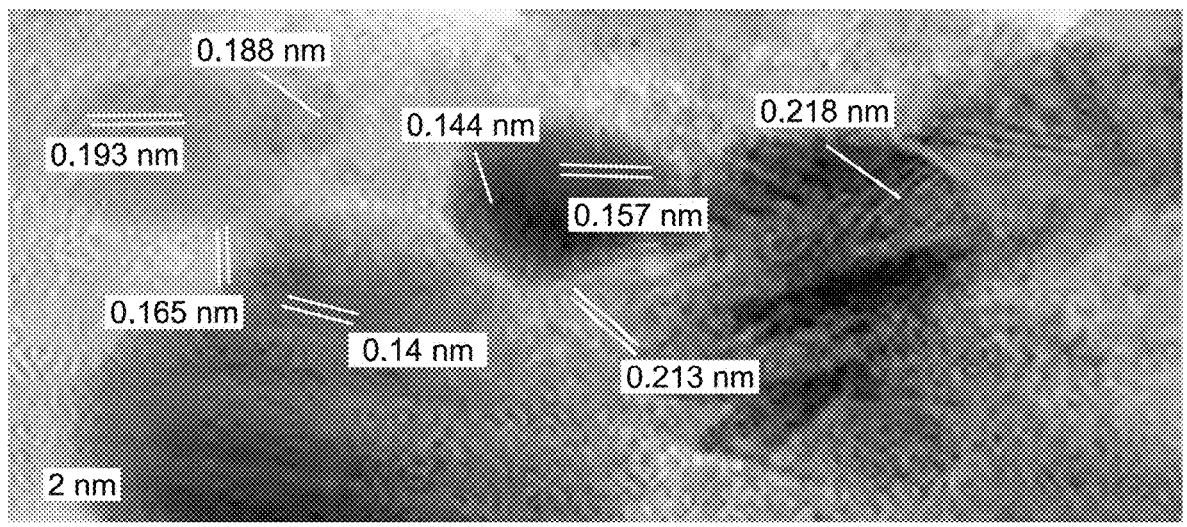
FIG. 5D shows a SAED profile of 60 AgW/Mn, according to certain embodiments.
Figure 5E:
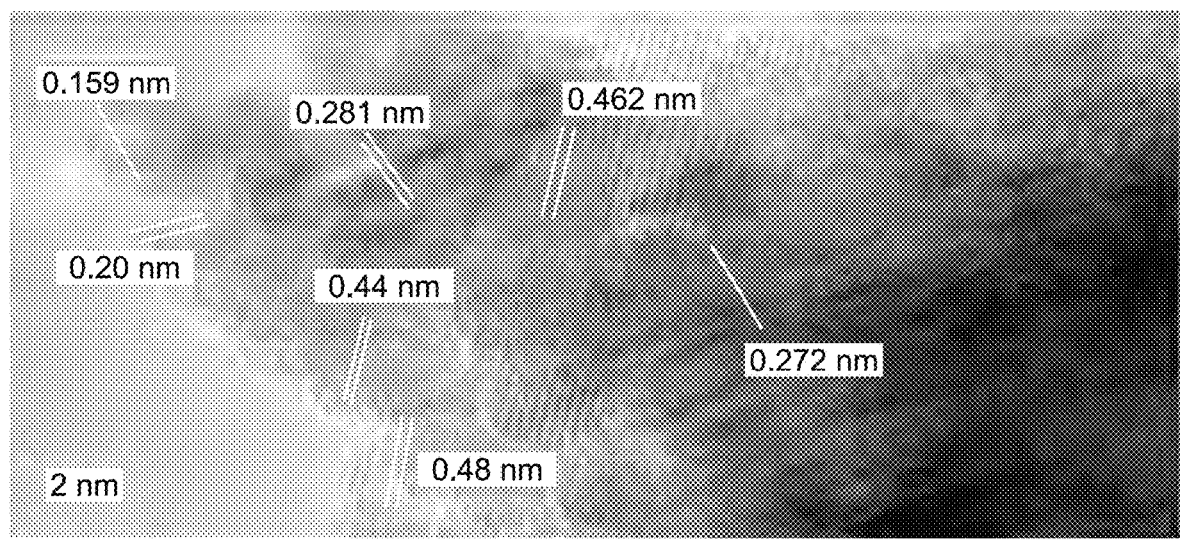
FIG. 5E shows a SAED profile of 80 AgW/Mn, according to certain embodiments.
Figure 6A:
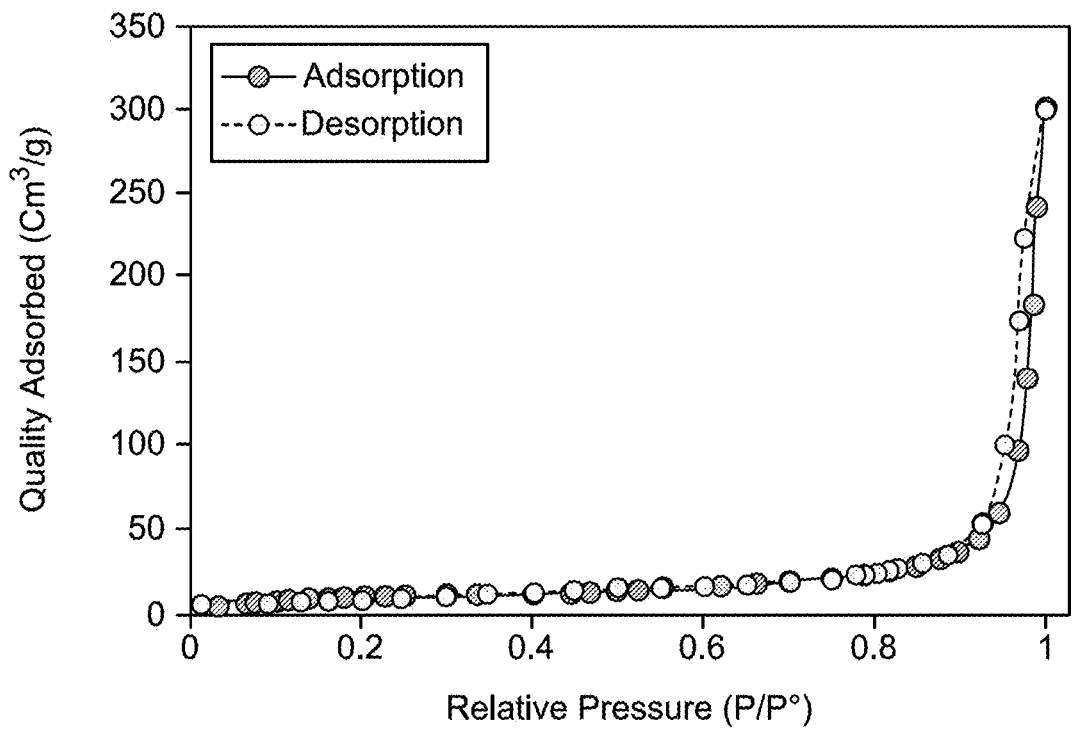
FIG. 6A depicts a graph of Brunauer-Emmett-Teller (BET) $N_2$ isotherms of pure $Mn_3O_4$, according to certain embodiments.
Figure 6B:
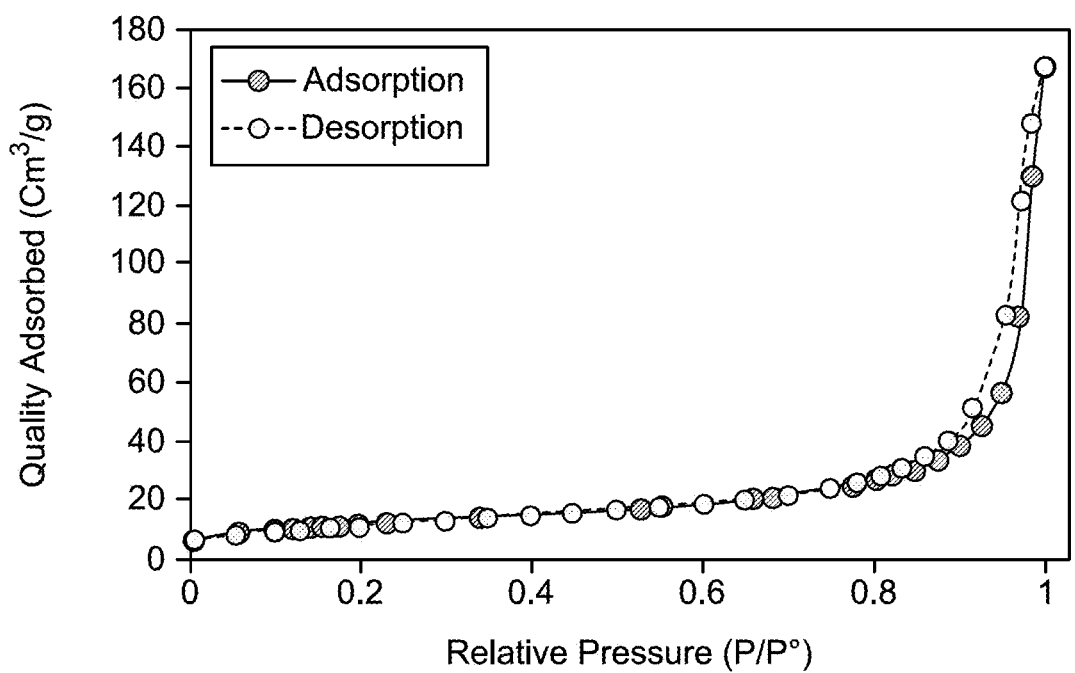
FIG. 6B depicts a graph of BET $N_2$ isotherms of 20AgW/Mn, according to certain embodiments.
Figure 6C:
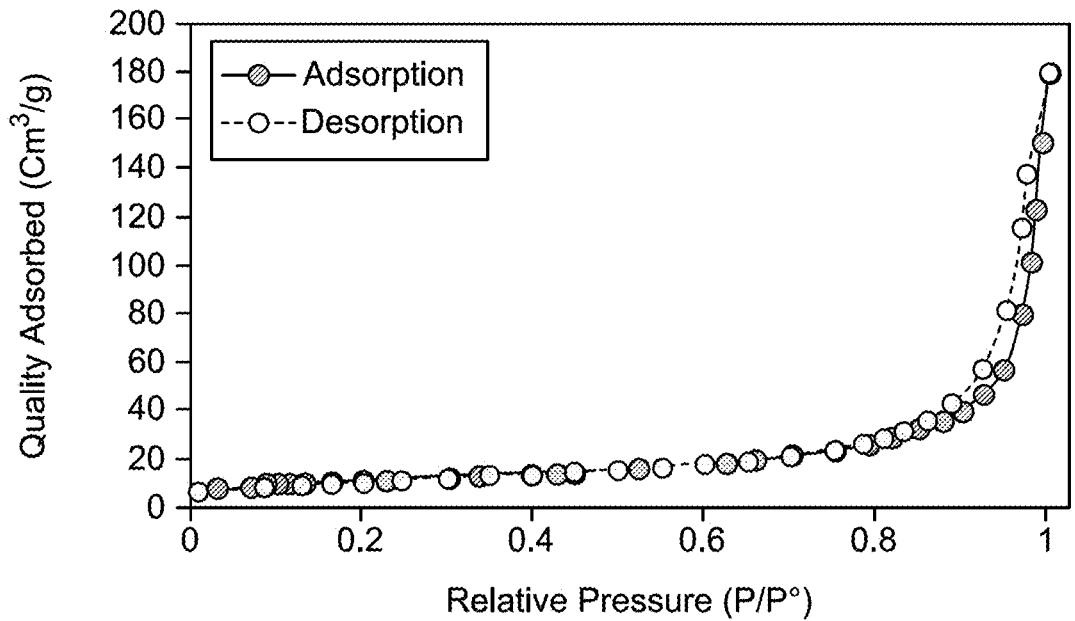
FIG. 6C depicts a graph of BET $N_2$ isotherms of 60AgW/Mn, according to certain embodiments.
Figure 6D:
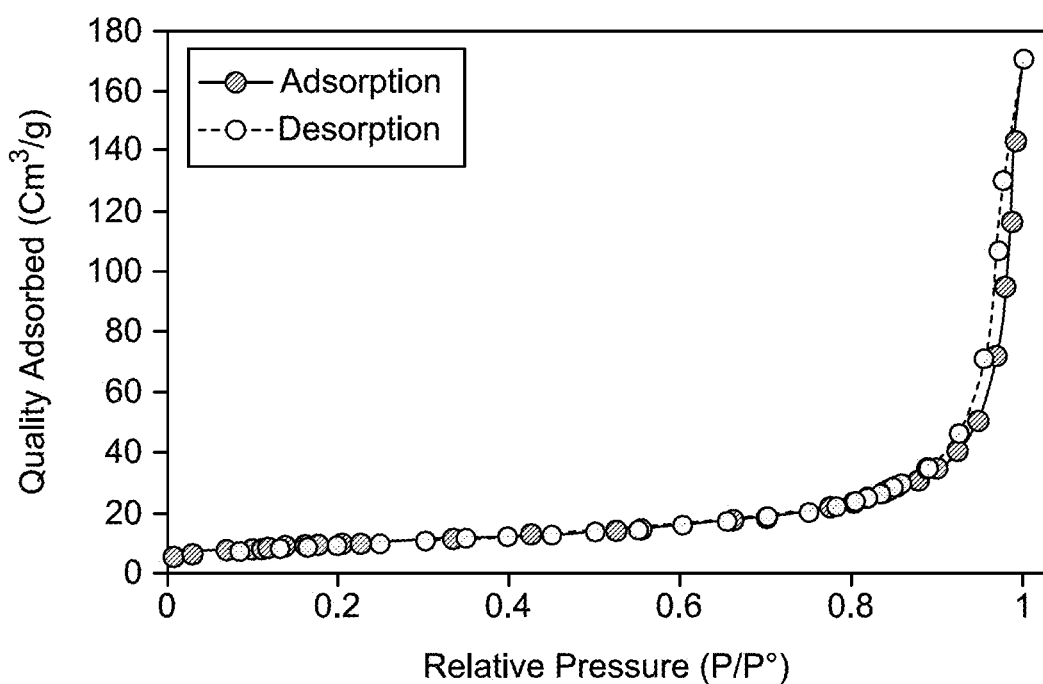
FIG. 6D depicts a graph of BET $N_2$ isotherms of 80AgW/Mn, according to certain embodiments.
Figure 6E:
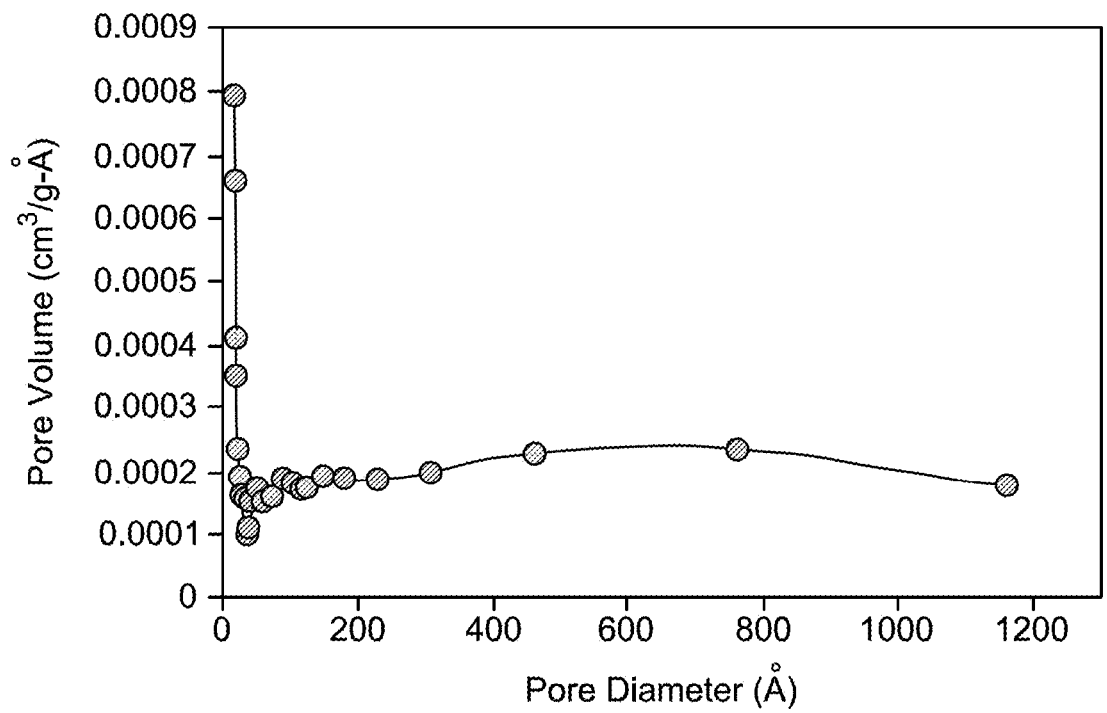
FIG. 6E depicts the pore size distribution of pure $Mn_3O_4$, according to certain embodiments.
Figure 6F:
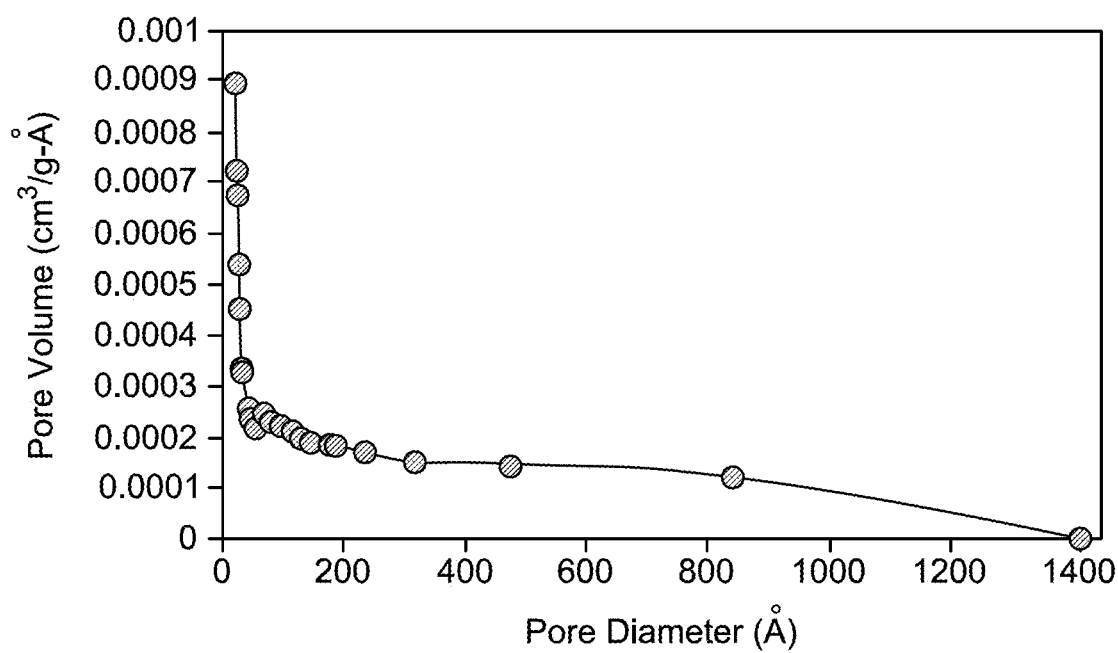
FIG. 6F depicts the pore size distribution of 20 AgW/Mn, according to certain embodiments.
Figure 6G:
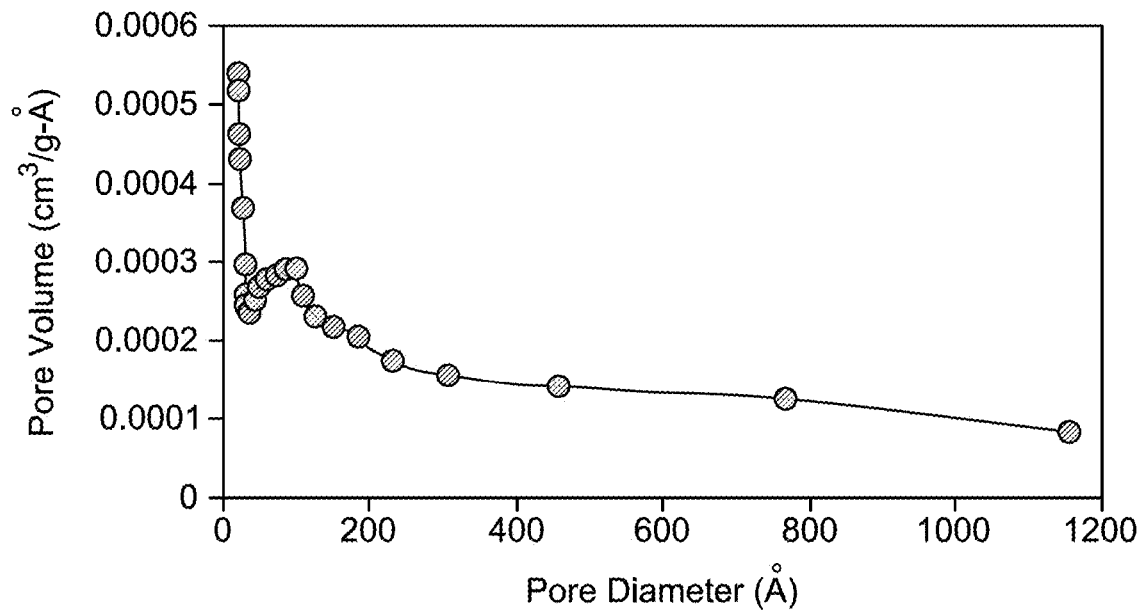
FIG. 6G depicts the pore size distribution of 60 AgW/Mn, according to certain embodiments.
Figure 6H:
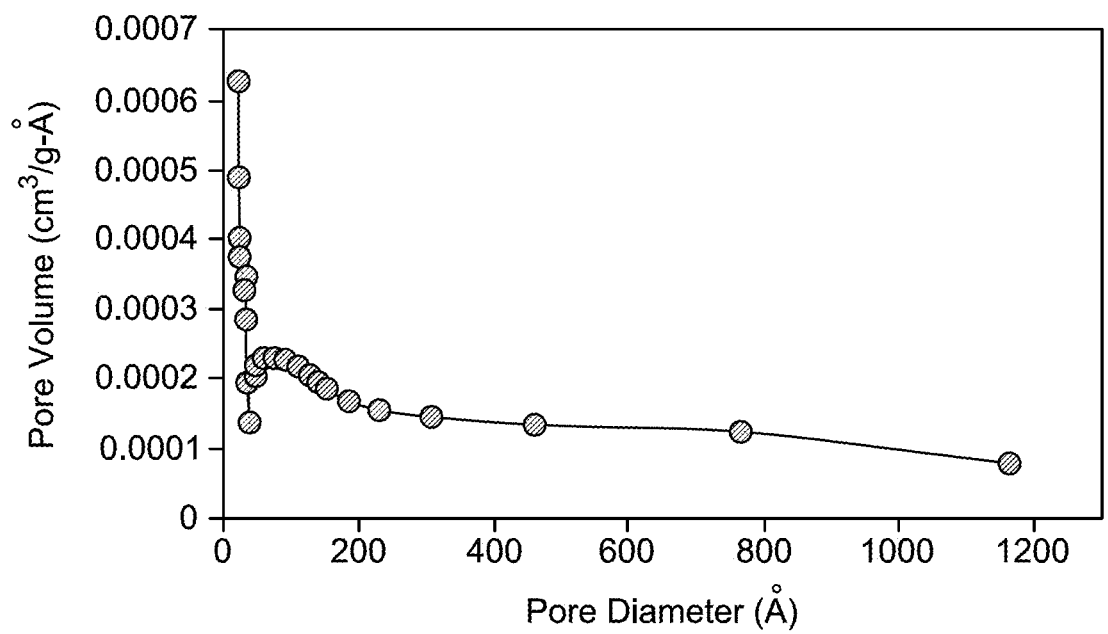
FIG. 6H depicts the pore size distribution of 80 AgW/Mn, according to certain embodiments.

TEM, HRTEM, and SAED observations are shown in FIGS. 3A-3I for TEM images, FIGS. 4A-4E for SAED, and FIGS. 5A-5E for HR-TEM images. The morphological structure of $\alpha$-$Mn_3O_4$ included nano-plates with a width of 60 nm and nano-rods with sizes of 45 nm and lengths equal to 70 nm, as shown in FIG. 3A. In accordance with the XRD findings, the HRTEM and the SAED pattern displayed the presence of various fringes with varying planes (103), (224), (004), (213), and (112) of $\alpha$-$Mn_3O_4$ in addition to the plane (002) for $MnO_2$ (FIG. 4A and FIG. 5A). Furthermore, in the $Ag_2WO_4$ image, as shown in FIG. 3A and FIGS. 3B-3C, mixed rod and spherical-like nanoparticles of 20 nm in size, are visible. By exposing the planes (231), (400), (402), (214), and (633), fringes with varied spacings in the inset rings (SAED) reveal the existence of $\alpha$-$Ag_2WO_4$, as shown in FIG. 4B and FIG. 5B. Furthermore, the TEM images of the 20 AgW/Mn composite, as shown in FIGS. 3D-3F displayed a distinctive structure, indicating that Mn and AgW have a considerable bond which exhibited a platelet structure of Mn covered with a nanoparticle array of AgW and instead displayed SAED planes (200-$MnO_2$), (213-$\alpha$-$Mn_3O_4$), (402-$\alpha$-$Ag_2WO_4$), (361-$\alpha$-$Ag_2WO_4$), (224-$\alpha$-$Ag_2WO_4$), (002-$\alpha$-$Ag_2WO_4$), and (112-$\alpha$-$Ag_2WO_4$), as shown in FIG. 4C and FIG. 5C. The lattice planes and lattice fringes complemented each other, providing evidence of strong interaction between $MnO_2$ and $\alpha$-$Mn_3O_4$. In addition, the emergence of $\alpha$-$Ag_2WO_4$ from the intersection of interfaces further supports the formation of a hybrid structure. Similarly, the 60 AgW/Mn catalyst, as shown in FIG. 4D and FIG. 5D, exhibits planes of crystal connected to [(200)-$MnO_2$], [(103)-$\alpha$-$Mn_3O_4$], [(004)-$\alpha$-$Mn_3O_4$], [(361)-$\alpha$-$Ag_2WO_4$], [(224)-$\alpha$-$Ag_2WO_4$], [(214)-$\alpha$-$Ag_2WO_4$], and [(633)-$\alpha$-$Ag_2WO_4$], further having the same morphological structure, as shown in FIG. 4D and FIG. 5D. New lattice planes that weren't visible with the 20 AgW/Mn catalyst appear to be revealed by the 60 AgW/Mn catalyst, with the persistence of the (200) $MnO_2$ plane.

Evaluations showed the fractional disintegration of the rod structure of $Ag_2WO_4$, which yields, in addition to the plate-like structures linked to $Mn_3O_4$ species, a spherical form arranged in an array around expanded pores. Compared to 20 AgW/Mn (FIGS. 3D-3F), the images of 60 AgW/Mn exhibited a different structure (FIGS. 3G-3H). As before, the SAED revealed that the composite exposure planes at (200), (112), and (004) for $\alpha$-$Mn_3O_4$ and (400), (361), (224), (214), and (633) for $\alpha$-$Ag_2WO_4$. Changing the morphology of the composite from an individual correspondent confirmed the robust linkage between the two structures and illustrated the construction of the $Mn_3O_4$/$Ag_2WO_4$ composite. The exposure of new planes for $\alpha$-$Mn_3O_4$ (112) as well as (400) in $\alpha$-$Ag_2WO_4$ further indicates the existence of additional active sites on the 60 AgW/Mn catalyst. When the AgW ratio is increased to 80 wt. %, as shown in FIG. 3I, additional planes emerged in addition to those seen in the 60 wt. % sample, including (112), (400), and (402), all of which are ascribed to AgW moieties, implying AgW coverage on Mn material. The shape of this catalyst revealed that AgW in rod-like form is converted to spherical ones deposited on the framework of a hardly detectable Mn platelet. Apart from those specified, no further phases, such as $Ag_2MnO_4$ and $AgMnO_4$, were detected.

Further examinations of elemental composition via EDX revealed strong peaks for Mn and O elements that coincide in the low energy margin at 0.5 KeV. Other Mn peaks at 6.0 and 6.8 eV were exposed. The existence of O, W, and Ag elements in AgW was verified by EDX analysis, which revealed the presence of Ag@Ag$_2$WO$_4$ with a silver weight percentage of 20 wt. %. The composite samples Ag$_2$WO$_4$ (20 wt. % to 80 wt. %)/Mn$_3$O$_4$ showed minor differences. However, these composites also included O, Mn, W, and Ag elements. The composites combine to generate Ag@α-Ag$_2$WO$_4$@α-Mn$_3$O$_4$, with an ability to produce more MnO$_2$ as the AgW ratio rises, for example, for the 80 wt. % AgW/Mn sample, the tendency approaches 25 wt. %. In addition, when the AgW loading increases, the percentage of Ag nanoparticles rises in order, reaching 50 wt. % in 80 wt. % AgW/Mn. The use of PVP and SDS throughout the manufacturing process is connected to the carbon found throughout the EDX spectrum. Evaluations on the composition of XPS at the outer surface of 10 nm are conducted to provide more precise and complementary quantitative results.

Example 9: Porosity Characterization

The N$_2$ isotherms to investigate the pore and surface area structures of the materials are presented in FIGS. 6A-6D. The distribution of pore size is provided in FIGS. 6E-6H. The composites include a type III isotherm, with hysteresis loops of size H1 indicating open-ended cylinder type pores. Table 1 lists the measured pore radius, pore volume, and average surface area data. The 20 AgW/Mn catalyst had the highest specific surface area (SBET) value, followed by the 60 AgW/Mn and Mn$_3$O$_4$ samples. Similarly, the pore volume of the 20 AgW/Mn exceeded that of the 60 AgW/Mn, except for the Mn$_3$O$_4$. Given that the pore radius of 60 AgW/Mn was the smallest of all the catalysts, positioning AgW on the pore entrance to be narrow may be possible. The pore size distribution curves depict two different types of pores, which include consistent pore size across all curves at 0.55 nm and variable pore size at 10 nm. The variable pore was observed in the 60 AgW/Mn and 80 AgW/Mn catalysts, indicating their mesoporous nature. The mesoporosity was confirmed via HRTEM, by forming a cluster enclosing wide pores.

TABLE 1

Surface area, pore radius, pore volume, and external surface area of studied samples.

| Samples | Surface area (m$^2$/g) | Pore volume (cc/g) | Pore radius (Å) | Micropore (cc/g) | External surface area (m$^2$/g) |
|---|---|---|---|---|---|
| 20 AgW/Mn | 44.06 | 0.261 | 241.98 | 0.00048 | |
| 60 AgW/Mn | 39.54 | 0.234 | 229.27 | 0.00017 | 38.96 |
| 80 AgW/Mn | 34.98 | 0.224 | 249.35 | 0.000303 | 35.23 |
| Mn$_3$O$_4$ | 37.59 | 0.375 | 359.91 | 0.0058 | 47.48 |

Example 10: X-Ray Photoelectron Spectroscopy Results

Figure 7A:
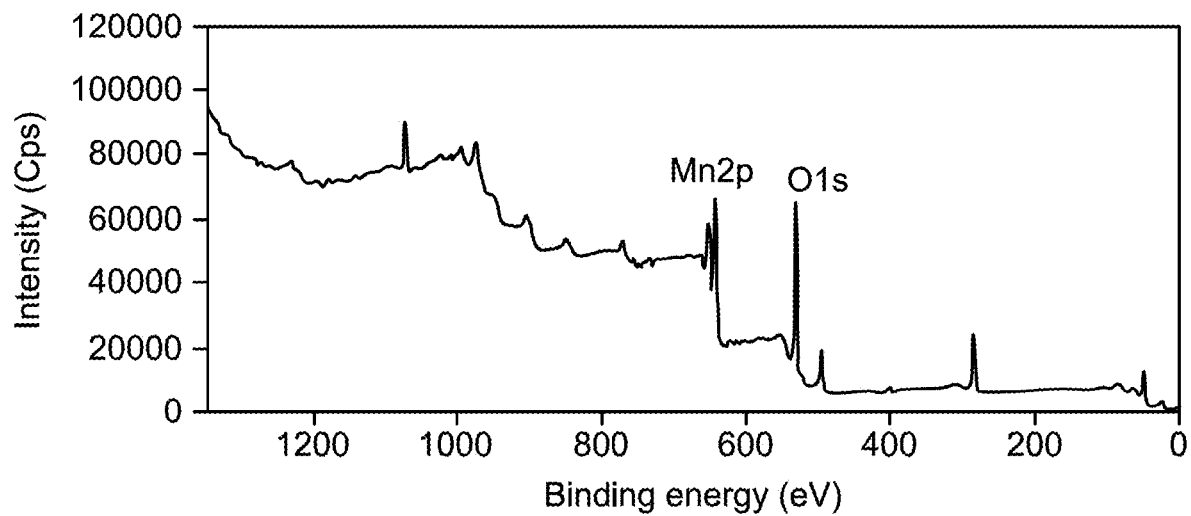
FIG. 7A is a high-resolution X-ray photoelectron spectroscopy (XPS) for full survey spectrum of pure $Mn_3O_4$, according to certain embodiments.
Figure 7B:
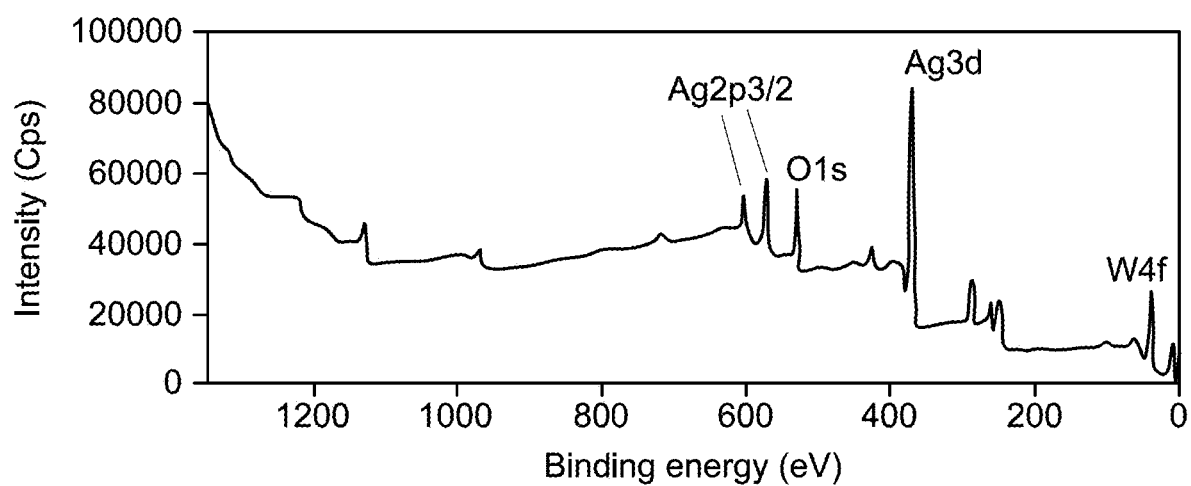
FIG. 7B is a XPS for full survey spectrum of AgW, according to certain embodiments.
Figure 7C:
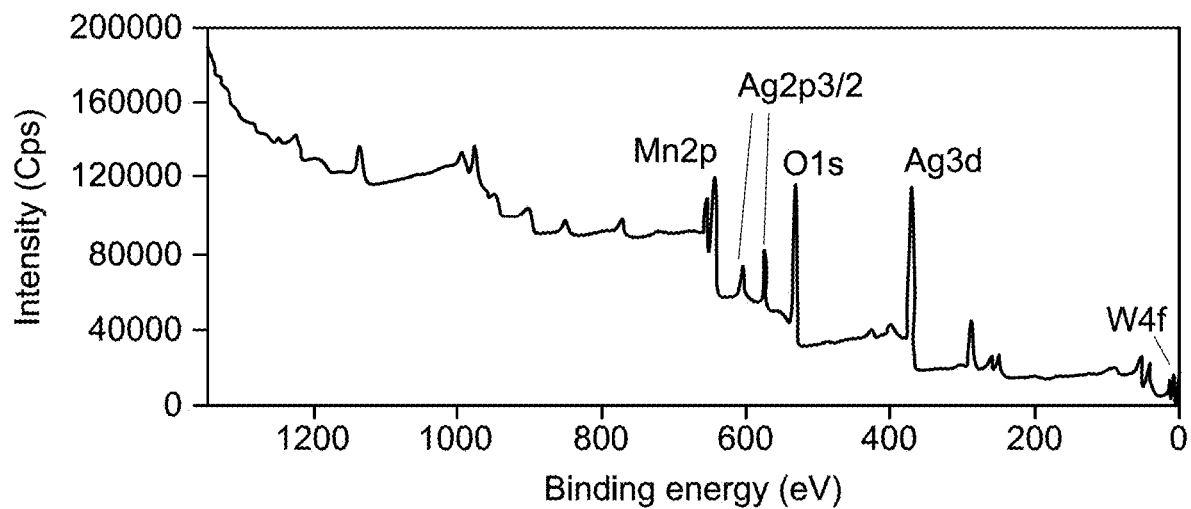
FIG. 7C is a XPS for full survey spectrum of 60 AgW/Mn, according to certain embodiments.
Figure 7D:
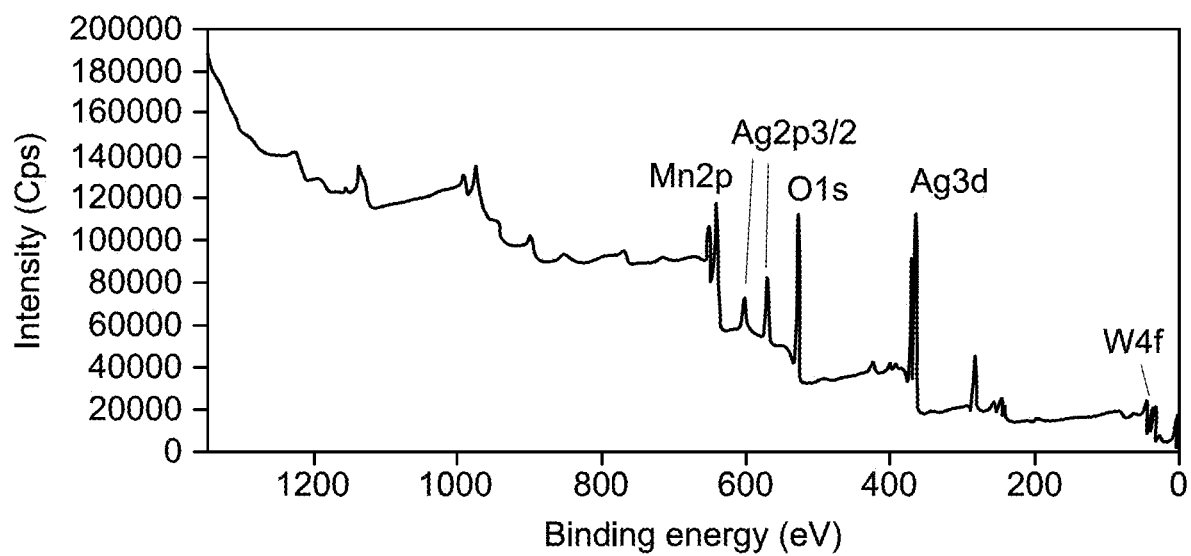
FIG. 7D is a XPS for full survey spectrum of 80 AgW/Mn, according to certain embodiments.
Figure 8A:
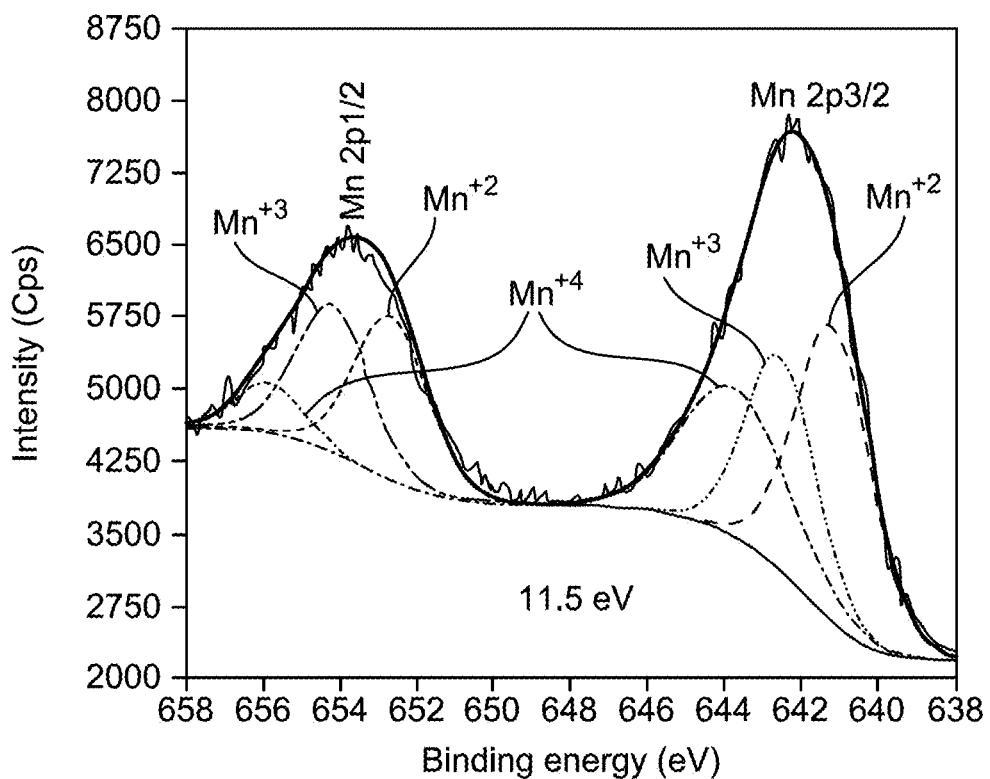
FIG. 8A is a high-resolution XPS spectrum of Mn 2P of $Mn_3O_4$, according to certain embodiments.
Figure 8B:
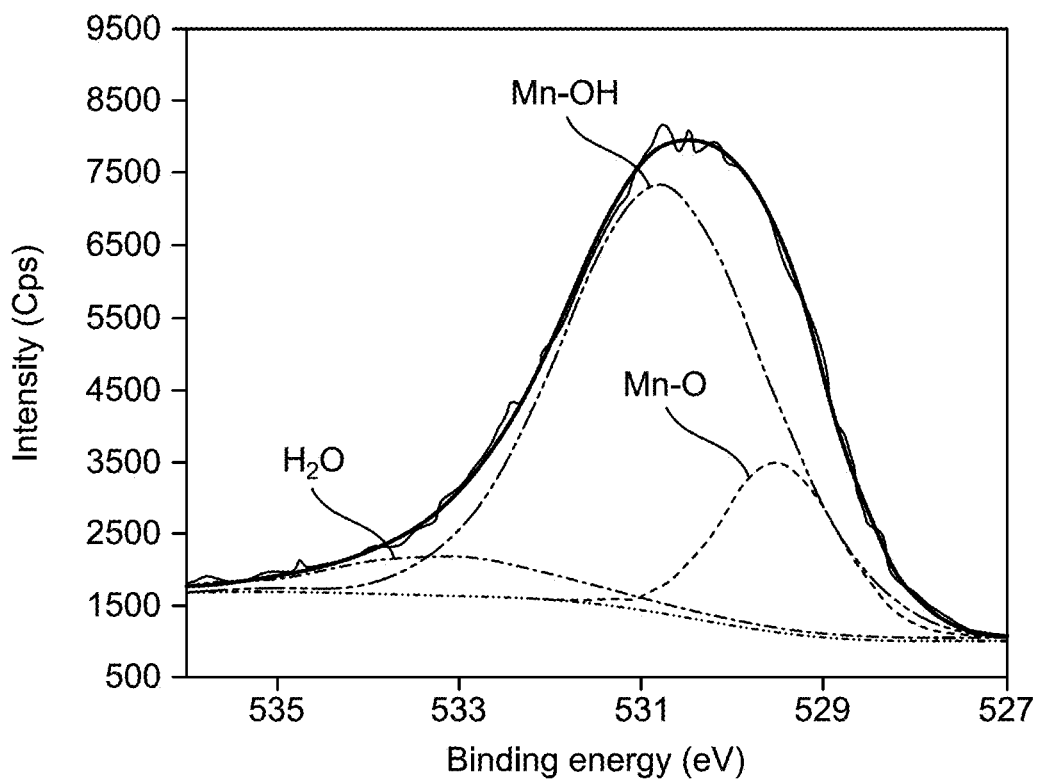
FIG. 8B is a XPS spectrum of O 1S of $Mn_3O_4$, according to certain embodiments.
Figure 8C:
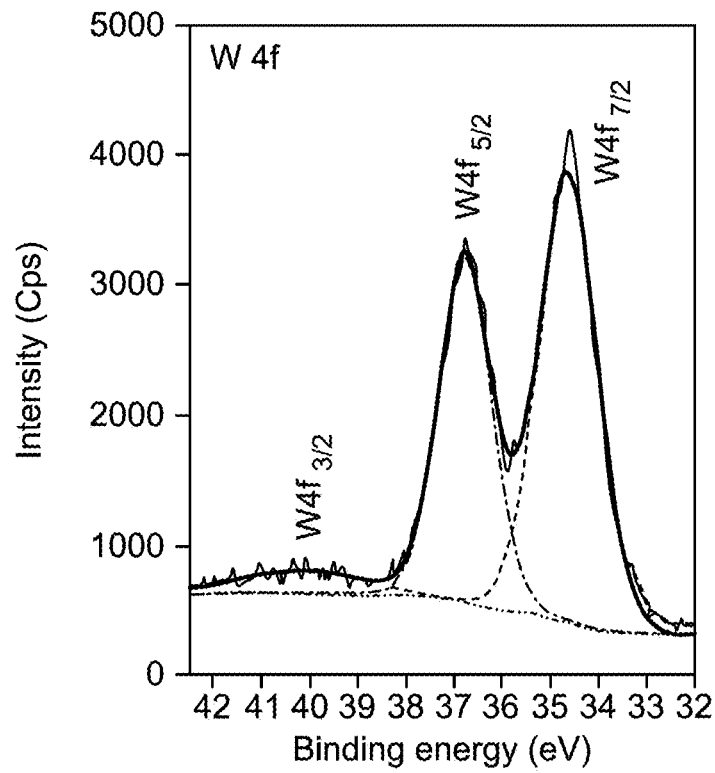
FIG. 8C is a XPS spectrum of W 4f of AgW, according to certain embodiments.
Figure 8D:
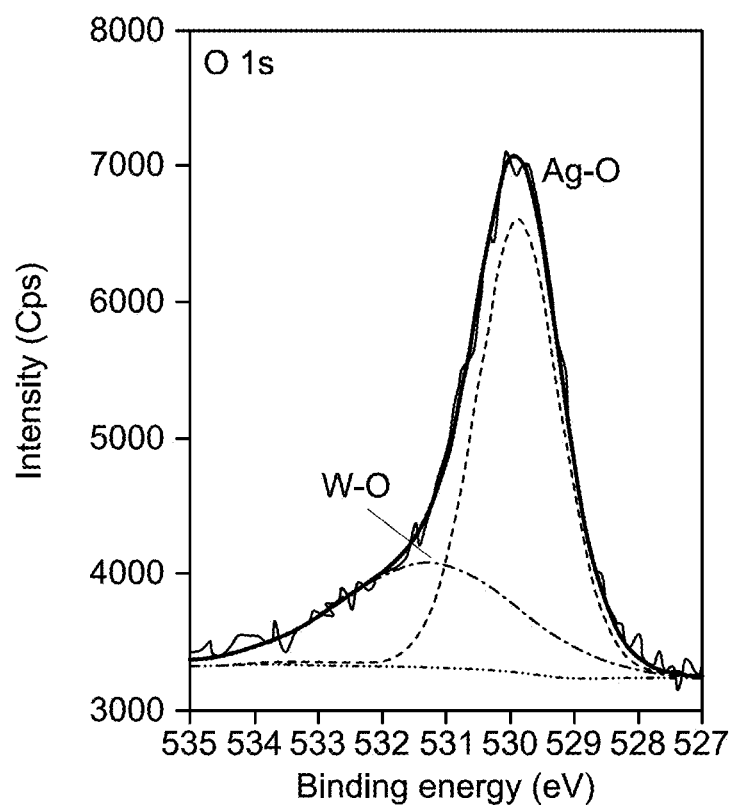
FIG. 8D is a XPS spectrum of O 1S of AgW, according to certain embodiments.
Figure 8E:
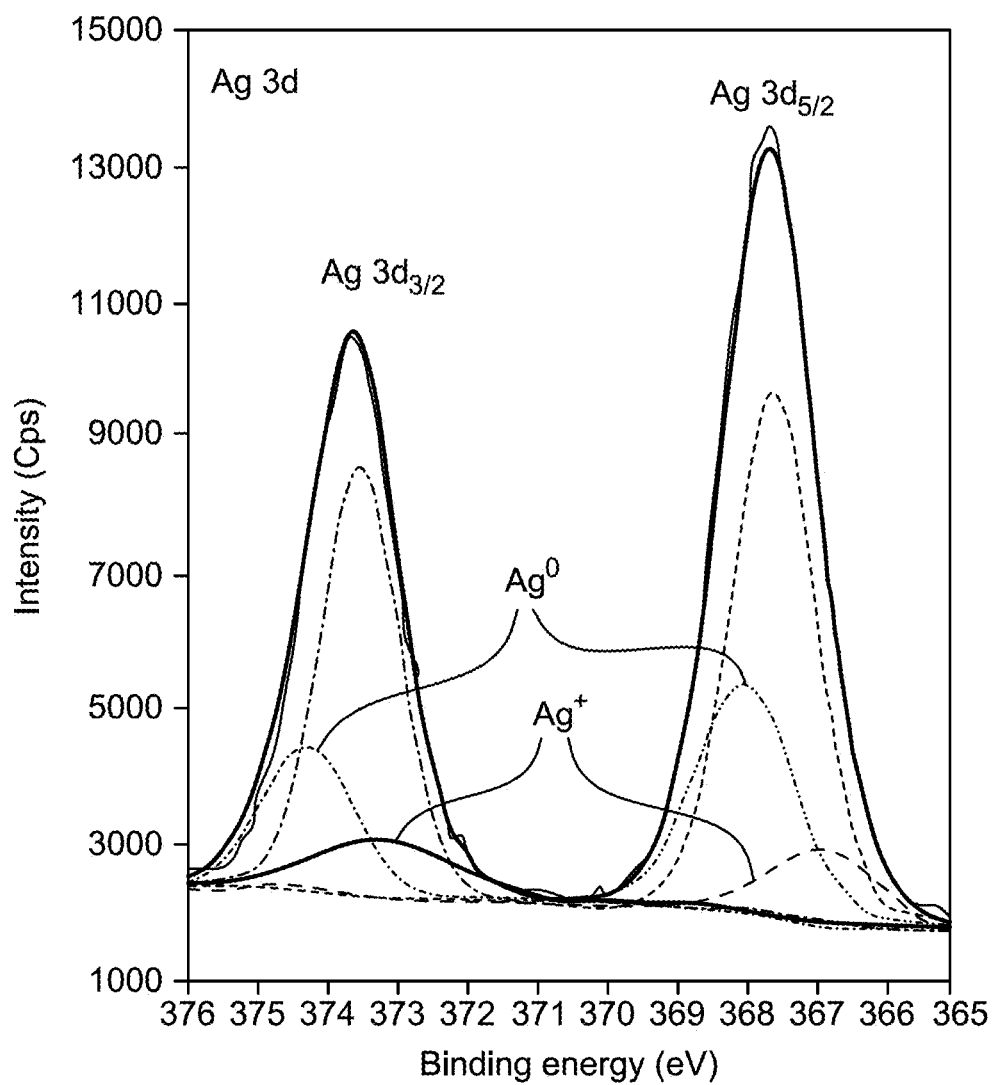
FIG. 8E is a XPS spectrum of Ag 3d of AgW, according to certain embodiments.
Figure 9A:
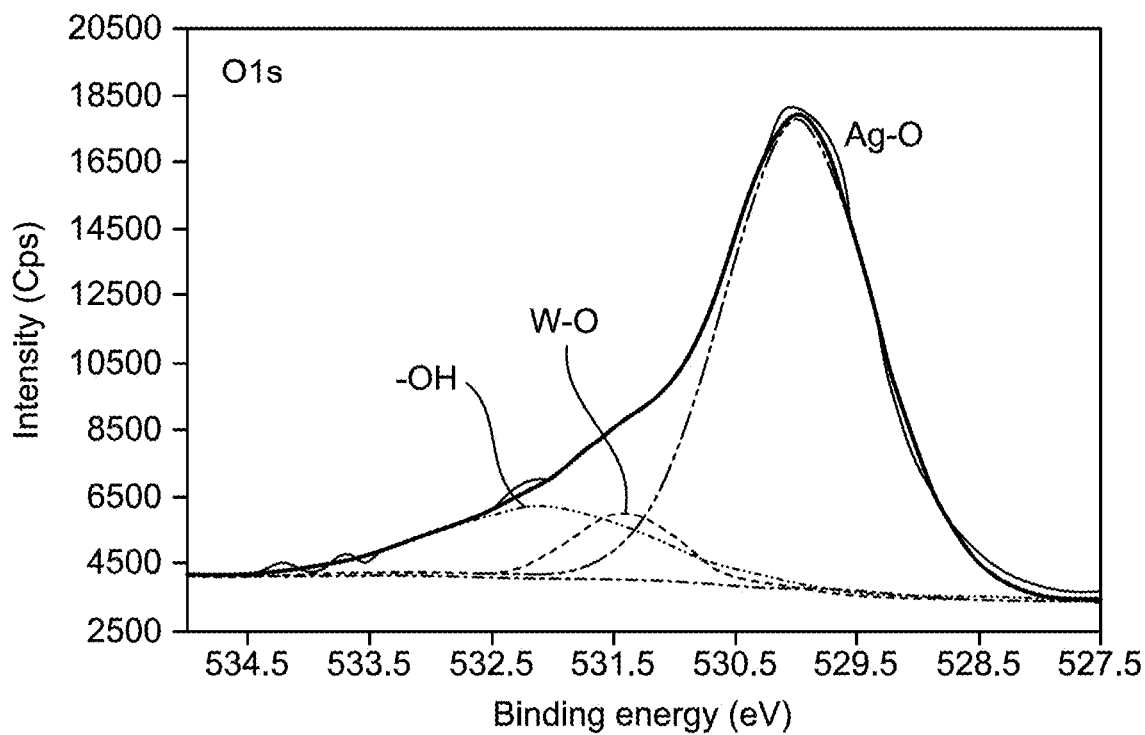
FIG. 9A shows a deconvoluted high-resolution XPS spectra of O 1S of 60 AgW/Mn, according to certain embodiments.
Figure 9B:
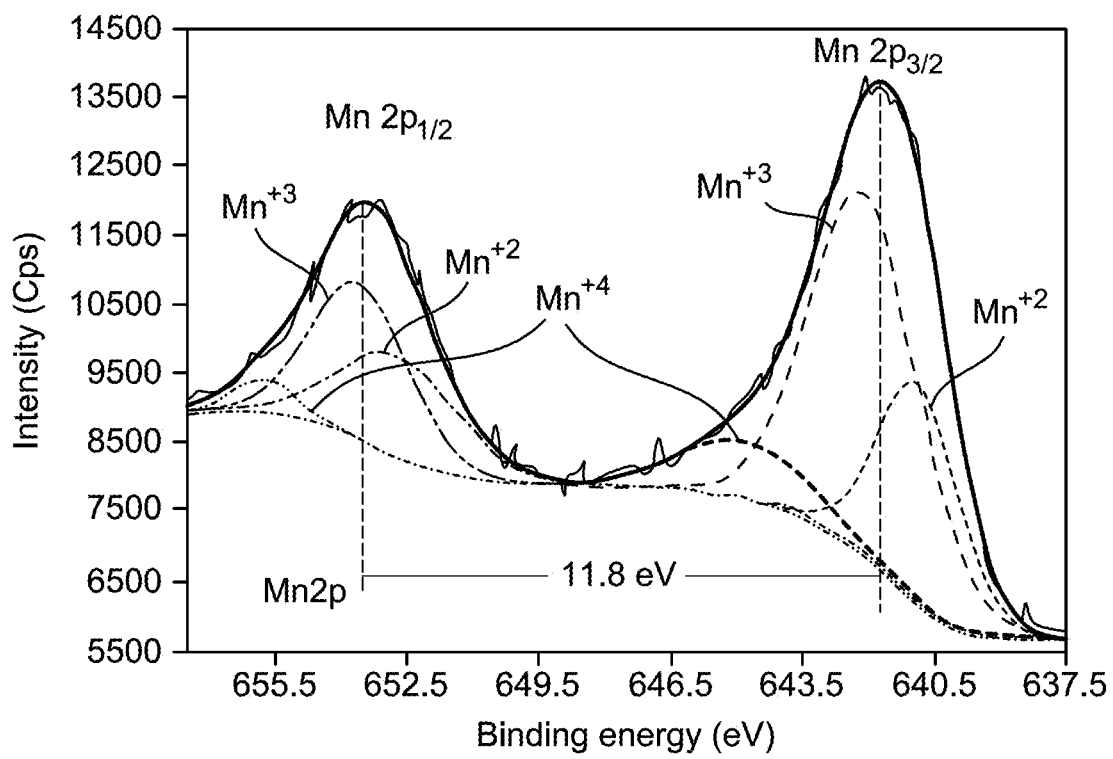
FIG. 9B shows a deconvoluted XPS spectra of Mn 2P of 60 AgW/Mn, according to certain embodiments.
Figure 9C:
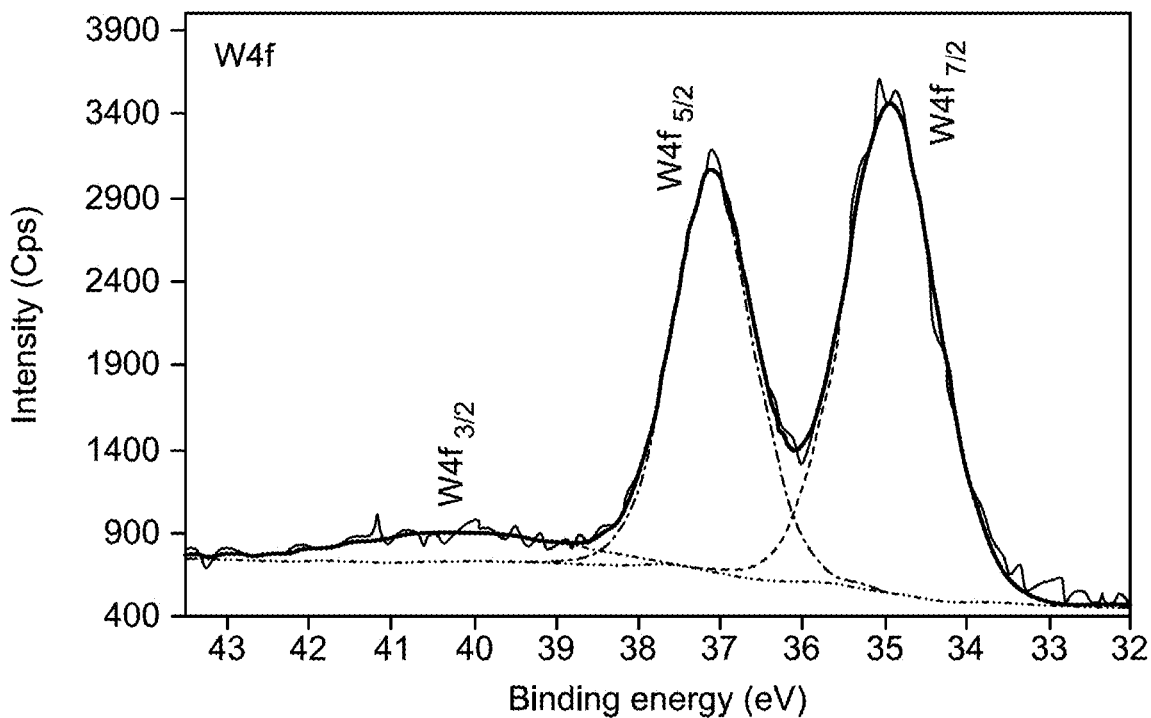
FIG. 9C shows a deconvoluted XPS spectra of W 4f of 60 AgW/Mn, according to certain embodiments.
Figure 9D:
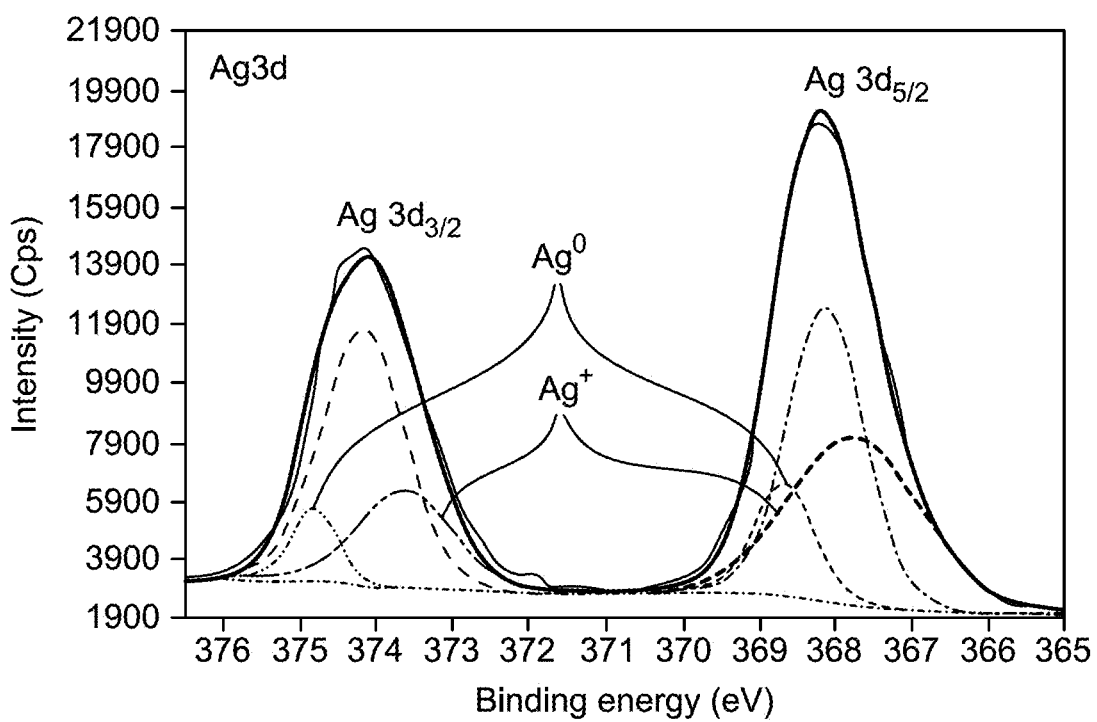
FIG. 9D shows a deconvoluted XPS spectra of Ag 3d of 60 AgW/Mn, according to certain embodiments.
Figure 9E:
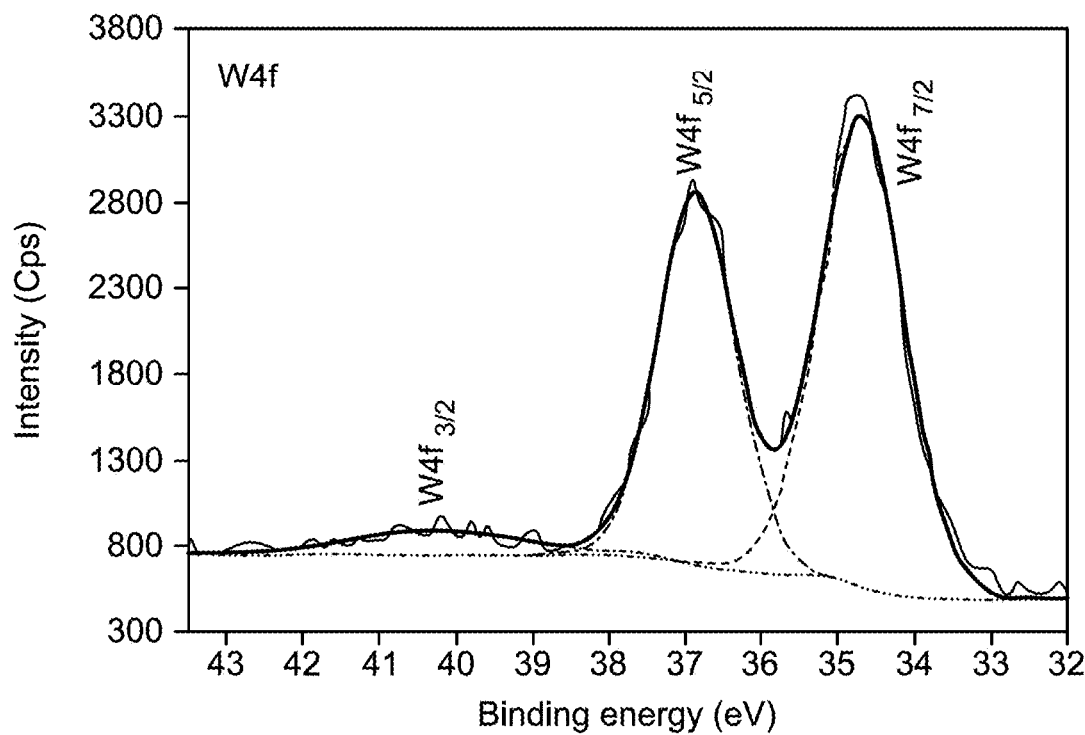
FIG. 9E shows a deconvoluted XPS spectra of O 1s of 80 AgW/Mn, according to certain embodiments.
Figure 9F:
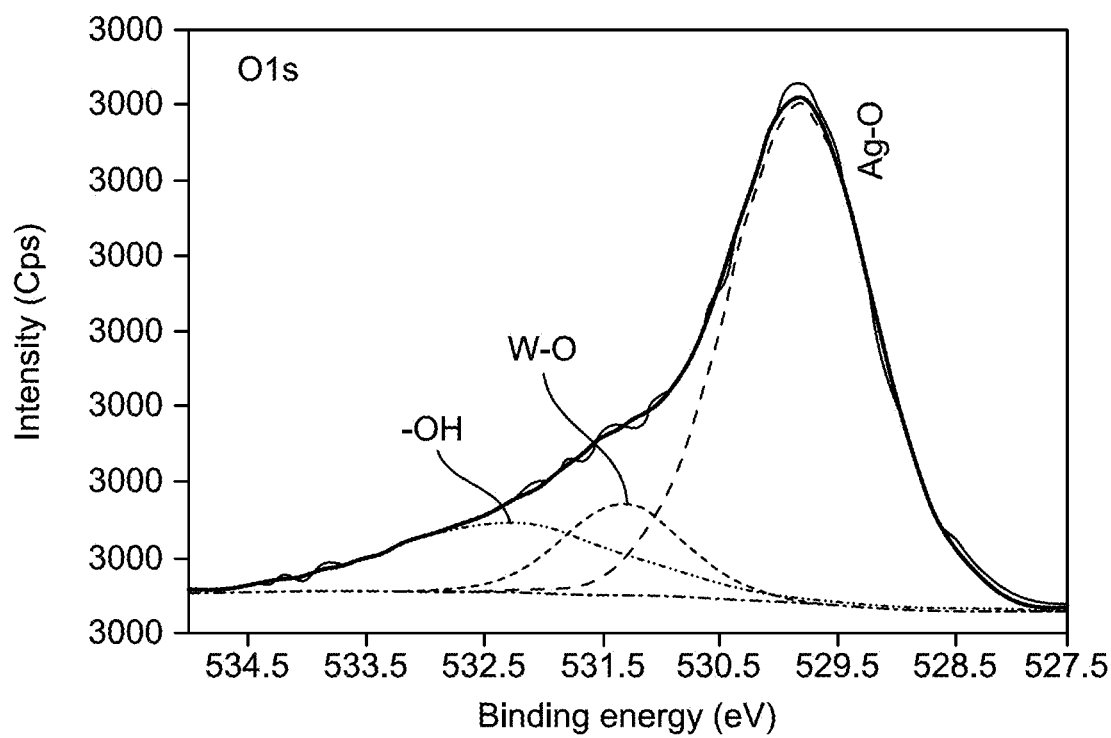
FIG. 9F shows a deconvoluted XPS spectra of Mn 2P of 80 AgW/Mn, according to certain embodiments.
Figure 9G:
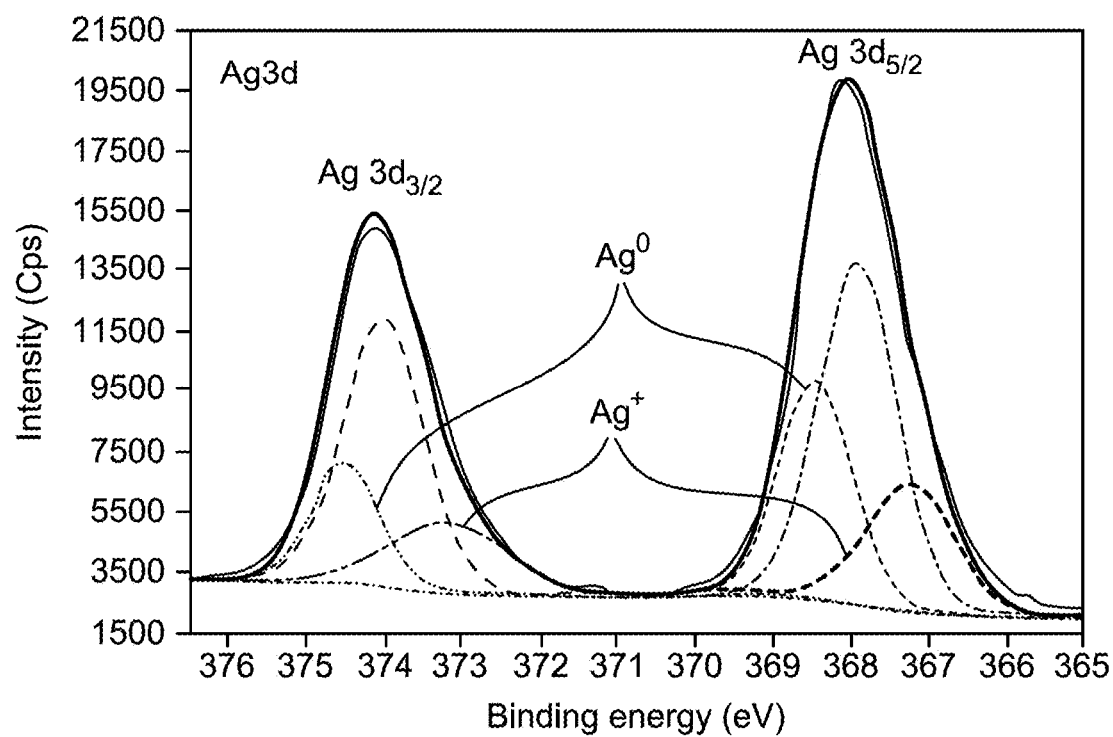
FIG. 9G shows a deconvoluted XPS spectra of W 4f of 80 AgW/Mn, according to certain embodiments.
Figure 9H:
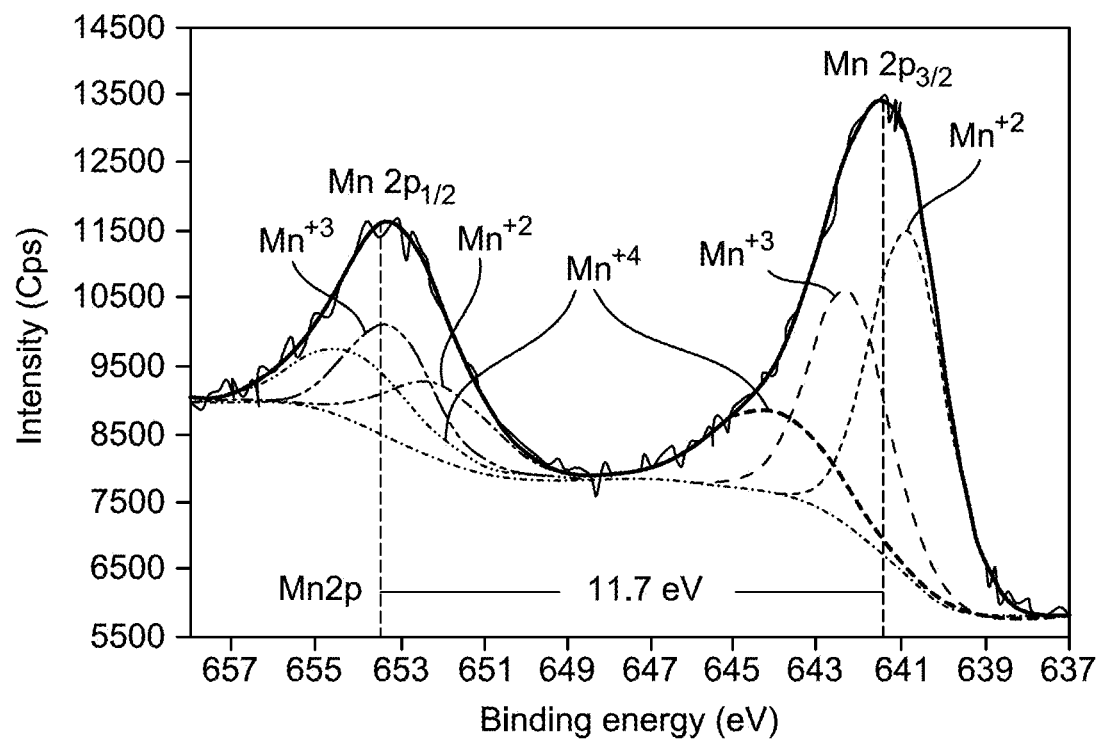
FIG. 9H shows a deconvoluted XPS spectra of Ag 3d of 80 AgW/Mn, according to certain embodiments.

FIGS. 7A-7D show the XPS survey spectrum of all samples, including Mn$_3$O$_4$, shown in FIG. 7A, AgW shown in FIG. 7B, 60 AgW/Mn shown in FIG. 7C, and 80 AgW/Mn shown in FIG. 7D. Further, FIG. 7A shows the surface constituents and chemical state of Mn$_3$O$_4$. The full spectrum detection of the Mn and O elements is shown in FIG. 7A and was strongly in agreement with the EDX results. Further, the complete spectrum of every catalyst found, every element that constitutes the catalyst, is shown in FIGS. 7B-7D. These results were also consistent with the EDX findings. The spectra of Mn 2p are shown in FIGS. 8A-8B. The presence of Mn$_3$O$_4$ was exposed by the two significant peaks, which are associated with Mn 2p$_{3/2}$ and Mn 2p$_{1/2}$ and are placed at 642.9 eV and 654.3 eV, respectively. The main constituents of the Mn 2p$_{1/2}$ peak are clarified at binding energies of 652.4 eV, 653.8 eV, and 656.1 eV that corresponded to Mn$^{2+}$, Mn$^{3+}$, and Mn$^{4+}$ with intensities of 23.01 wt. %, 27.17 wt. %, and 49.82 wt. %, respectively. The species above has the same sequence; Mn 2p$_{3/2}$ has three peaks at 641.3 eV, 642.5 eV, and 644 eV. Given that multiple MnO$_2$ and MnO phases are available and present an equivalent amount of 72.83 wt. % to Mn$_3$O$_4$, this indicates that Mn$_3$O$_4$ is not pure. The O 1s broad spectrum peak is shown in FIG. 8D, positioned at 530.2 eV, is split into three main peaks at 533 eV, 531.27 eV, and 529.88 eV, indicating the existence of Mn—H2O, Mn—OH, and Mn—O species. As can be seen in FIGS. 8C-8E, the XPS analysis of α-Ag$_2$WO$_4$ corroborates the existence of the O, W, and Ag peaks. Peaks at 40.2 eV, 36.8 eV, and 34.8 eV associated with W4f$_{3/2}$, W4f$_{5/2}$, and W4f$_{7/2}$, correspondingly, are visible in the high-resolution W 4f XPS spectra of the as-synthesized sample and are well-matched with the W6+ moieties.

Further, the dual peaks at 530.0 eV and 531.3 eV in the deconvoluted XPS spectrum of the O 1s region were attributed to O 1s formed from W—O and Ag—O contacts, as shown in FIG. 8C-8E. Twofold peaks in the Ag 3d spectra at 373.5 eV and 367.7 eV caused by Ag 3d$_{3/2}$ and Ag 3d$_{5/2}$ are used to detect the existence of Ag$^+$. Deconvolution of yielded peaks demonstrate the presence of AgO nanoparticles at concentrations of 31.1 wt. % of Ag$^+$ at 368.0 eV and 374.3 eV.

FIGS. 9A-9D show the XPS results for the 60 AgW/Mn composite, consistent with the EDX results. The results include photoelectron peaks for the elements Ag, W, Mn, and O. The production of a robust heterojunction between AgW and Mn is demonstrated by the Ag 3d, which exhibits two peaks at 374.53 eV and 368.07 eV due to Ag$^+$ species that are comparable to those seen in AgW but at higher binding energies. The percentage of Ag nanoparticles, signified by the two peaks at 374.1 eV and 367.89 eV, is higher than that of Ag$^+$ and is made up of 54.35 wt. %. The outcome mentioned above aligns with the EDX analysis and XRD results, which appear to peak at 2θ=64.5°, confirming the Ag synthesis. Peaks associated with W$^{6+}$ at 34.62 eV, 36.76 eV, and 40.14 eV are found at larger binding energies than W in AgW, indicating the creation of an interface between AgW and Mn. By matching the Mn sample, the amounts of Mn$_{3+}$ (43.52 wt. %) increase more than Mn$^{4+}$ (8.53 wt. %), which is similar to the Mn$^{2+}$ (47.95 wt. %) species. The broad O 1s spectrum is split into three peaks at greater binding energies compared to its AgW equivalent via peaks at 532.1 eV, 531.4 eV, and 529.97 eV, attributed respectively to Mn—OH, W—O, and Mn—O moieties. Provided that Ag and Mn have comparable bond length values, AgW/Mn has a greater atomic percent of Ag—O (75.15 wt. %) than AgW (66.51 wt. %), whereas W—O decreases in the latter. The above observation may indicate that Ag and Mn metals are elaborate. FIGS. 9E-9H show the spectra of Mn 2p of the 80 AgW/Mn catalyst. The energy gap of the two main peaks, which are connected to Mn 2p3/2 and Mn 2p1/2, is around 11.18 eV, less than 60 AgW/Mn. According to the proportions of the various Mn moieties, the Mn$^{3+}$ species at 55.49 wt. % have shown lesser binding energies than 60 AgW/Mn, surpassing both the Mn$^{4+}$ at 22.25 wt. % and Mn$^{2+}$ at 22.26 wt. %, fragments. The evaluation indicates the efficient creation of connection interfaces and robust electrical interaction between the constituent parts of the catalyst. The peaks corresponding to W⁶⁺ are comparable in appearance at lower binding energies to those seen for 60 AgW/Mn ($W_{4f3}/2$; 40.18 eV, W $4f_{5/2}$; 36.85 eV, and W $4f_{7/2}$; 34.69 eV), indicating that it is less stable in comparison. The O1s spectra are further separated into three peaks at 532.3 eV, 531.32 eV, and 529.82 eV by the —OH bonds, W—O, and Ag—O, respectively. The peaks show lesser binding energies than their analogues in 60 AgW/Mn, indicating the presence of more Ag—O bonds. The twin peaks of Ag 3d3/2 and Ag 3d5/2 in Ag+, have an energy variance of 6.03 eV and are located at 374.25 eV and 368.22 eV. It displays a lower percentage of Ag than the corresponding 60 AgW/Mn sample which was 41.27 wt. % vs. 54.35 wt. %.

Example 11: Electrochemical Characterization

Figure 10A:
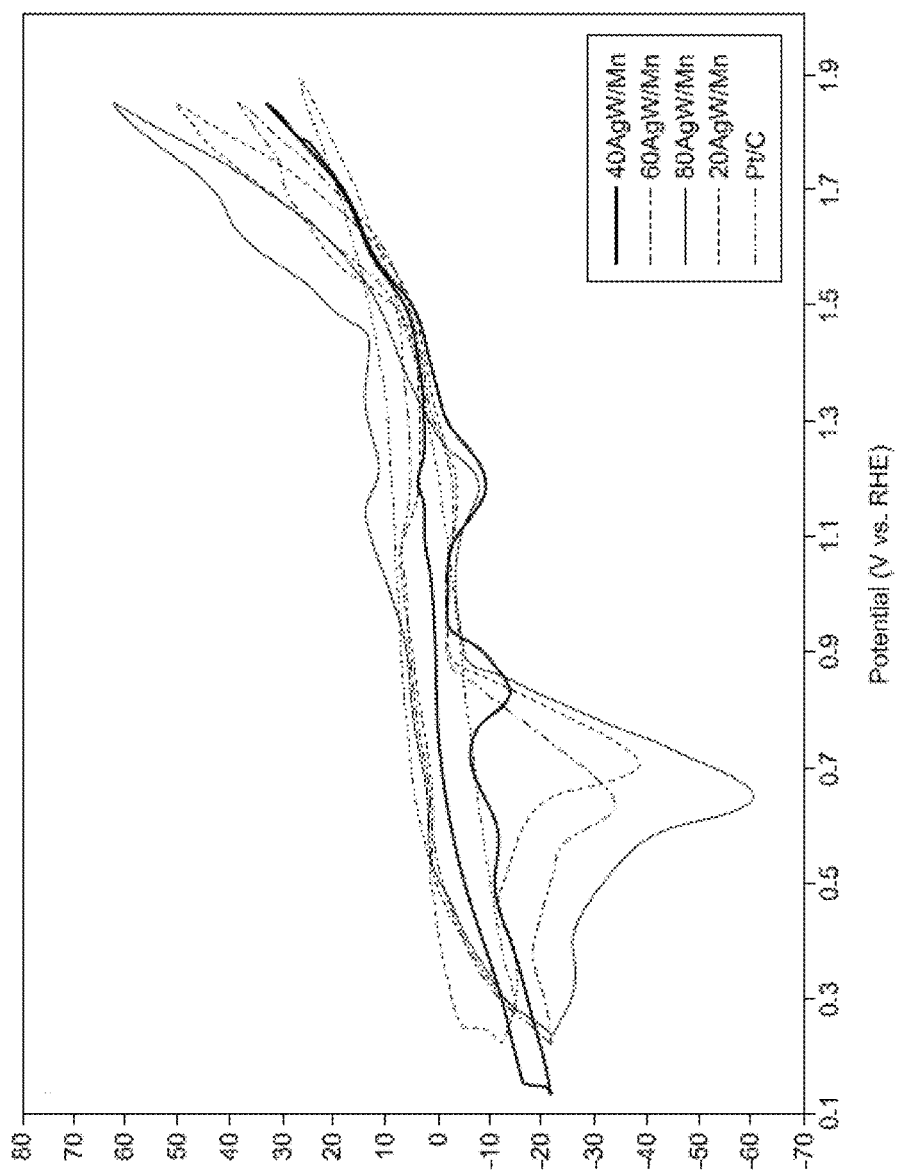
FIGS. 10A-10B shows cyclic voltammogram (CV) curves of various electrodes including 20 AgW/Mn, 40 AgW/Mn, 60 AgW/Mn, and 80 AgW/Mn, with a reference electrode (Pt/C) at a sweeping rate of 10 millivolts per second (mV/s) in 1.0 M KOH solution, according to certain embodiments.
Figure 10B:
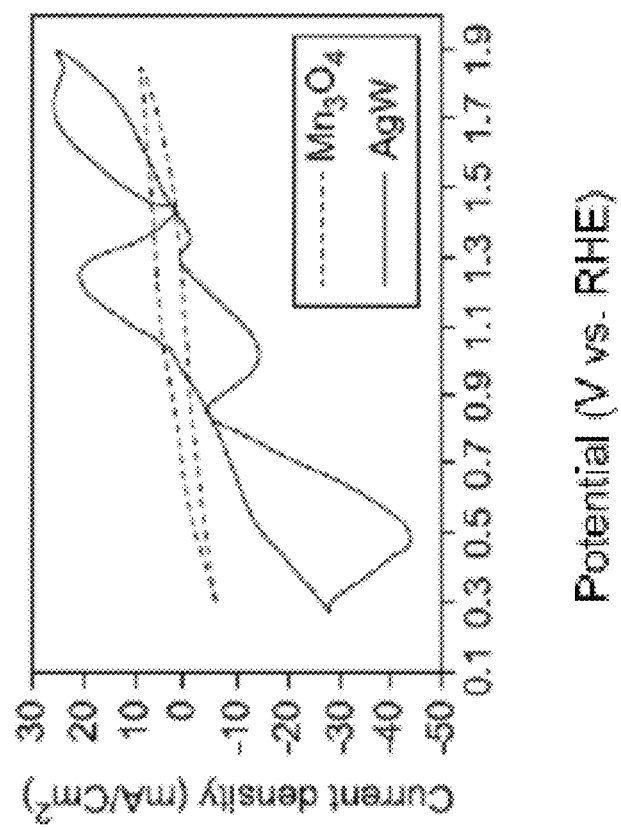

FIG. 10A shows the CV performances of $Mn_3O_4$, AgW, 20 AgW/Mn, 40 AgW/Mn, 60 AgW/Mn, and 80 AgW/Mn manufactured electrodes, at a test rate of 10 mV/s in a 1.0 M KOH solution. The CV curve of $Mn_3O_4$ (FIG. 10B) shows no redox peaks, whereas that of AgW indicates two oxidation and reduction peaks, demonstrating the pseudocapacitive character of the electrode assumed to be related to the redox reaction between Ag and $Ag_2O$ according to following reaction (6):

$$2Ag + 2OH^- \leftrightarrow Ag_2O + H_2O + 2e^- \quad (6)$$

The incorporation of $Mn_3O_4$ with AgW produced changes in both area and potential compared to the behavior of the AgW electrode, illustrating a strong interaction between $Mn_3O_4$ and AgW. For example, the 20 AgW/Mn electrode showed anodic peaks at lower potentials, namely 1.58 eV and 1.01 V, against 1.6 V and 1.22 V for AgW, reflecting the ease of oxidation of the composite compared to the latter electrode. Conversely, the former electrode shows cathodic peaks at 1.19 V and 0.70 V against 1.03 V and 0.47 V for AgW, indicating composite reduction difficulty compared to the Mn-free AgW electrode. This facilitates the complete oxidation of the 20 AgW/Mn composite to 50.1 mA cm² at 1.84 against 24.8 mA cm² at 1.9 V for AgW. Similarly, the 60 AgW/Mn electrode revealed reduction peaks at 0.42 V, 0.62 V, and 1.18 V and oxidation peaks at 0.8 V and 1.08 V compared to AgW with reduction at 0.5 V, 1.05 V, and oxidation at 1.24 V, 1.64 V. The dominant lower shift of the former electrode, which is seen for some oxidation and reduction peaks, depicts the availability of the electrode for achieving OER and HER at lower overpotentials.

Example 12: Oxygen Evolution Reaction

Figure 11A:
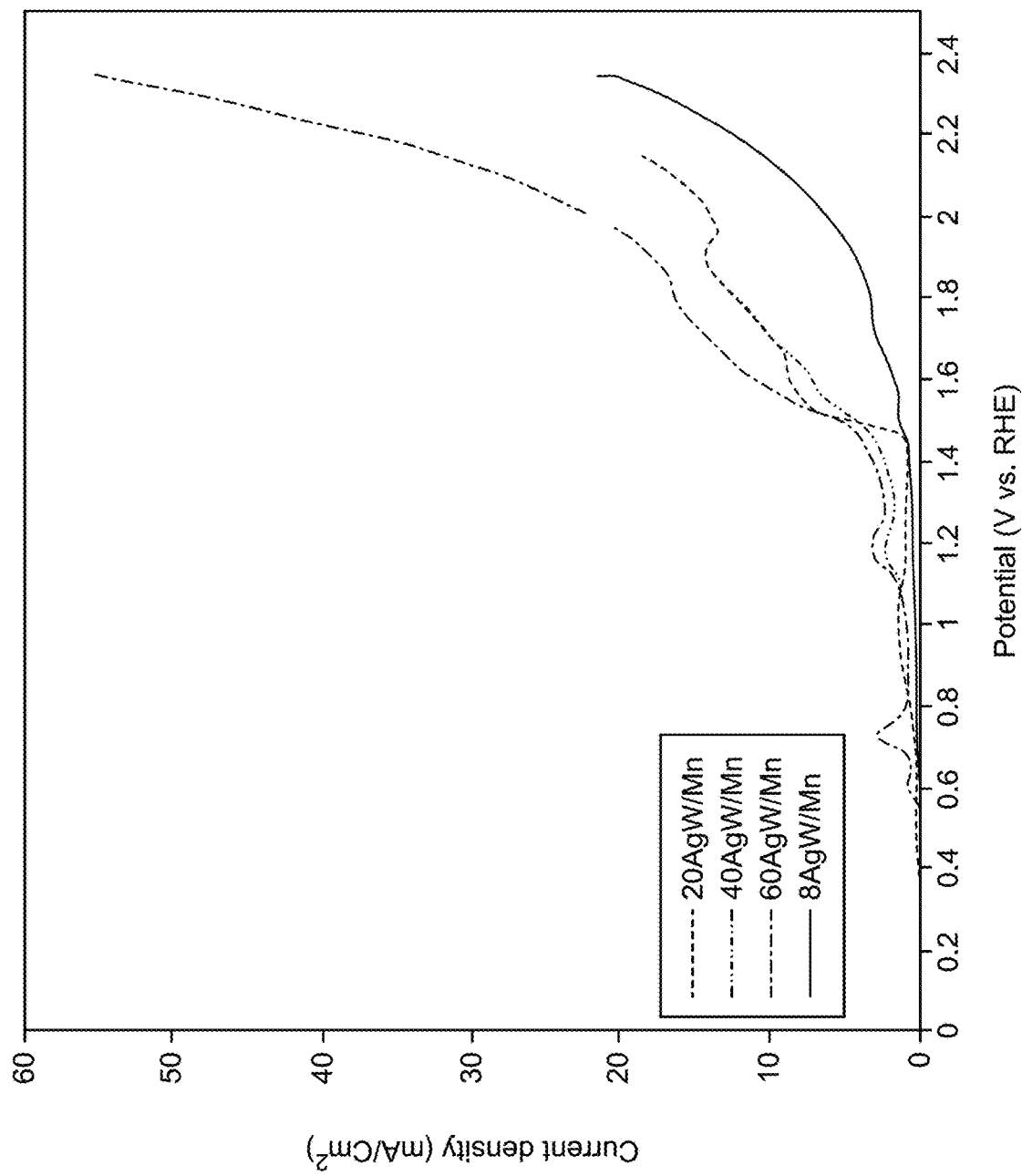
FIGS. 11A-11B. show polarization curves for oxygen evolution reaction (OER) in 1.0 M KOH solution measured with a sweep rate of 10 mV/s for AgW, $Mn_3O_4$, 20 AgW/Mn, 40 AgW/Mn, 60 AgW/Mn, and 80 AgW/Mn electrocatalysts, according to certain embodiments.
Figure 11B:
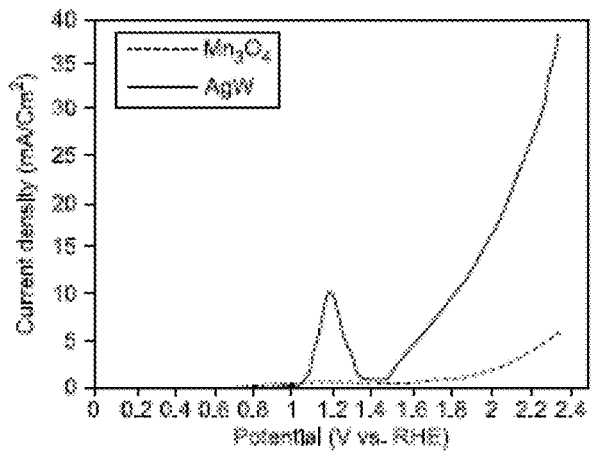
Figure 11C:
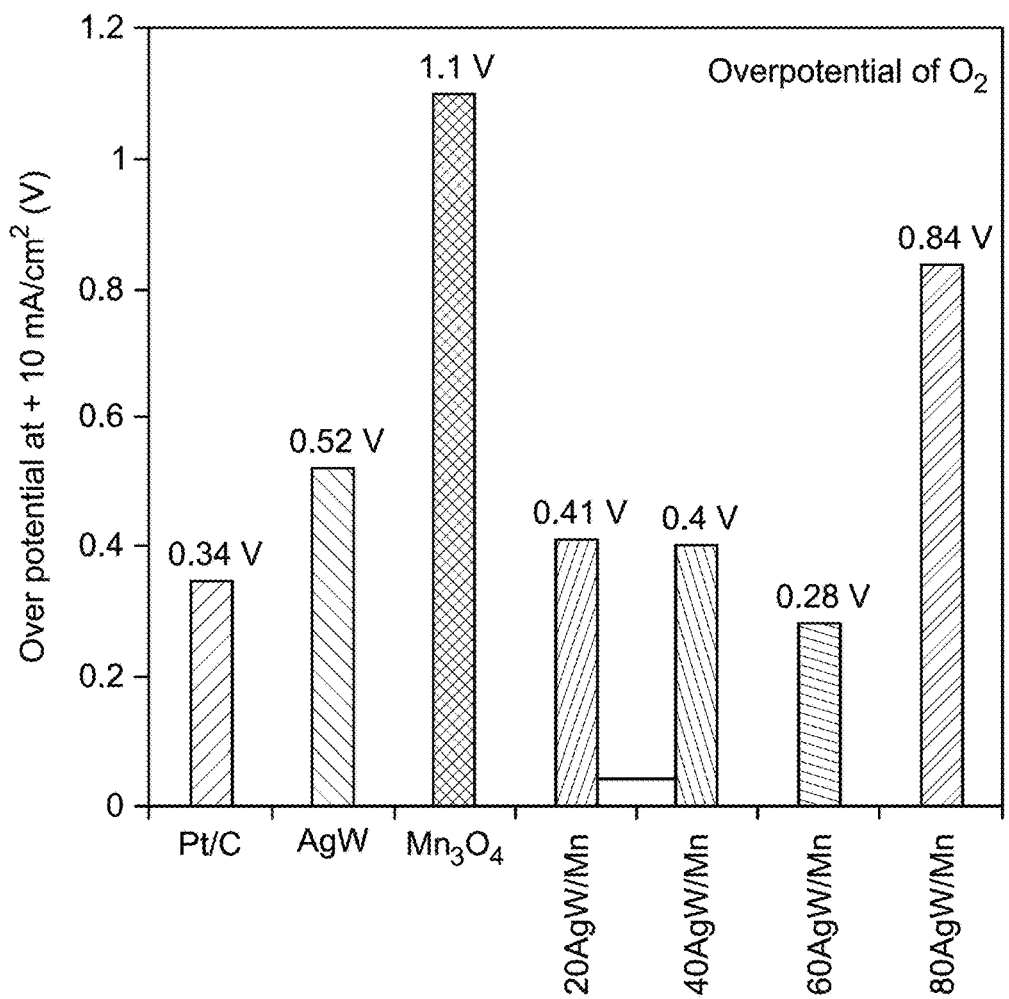
FIG. 11C is a graph for evaluating overpotential of $O_2$ at 10 mA $cm^2$ for Pt/C, AgW, $Mn_3O_4$, 20 AgW/Mn, 40 AgW/Mn, 60 AgW/Mn, and 80 AgW/Mn electrocatalysts, according to certain embodiments.
Figure 11D:
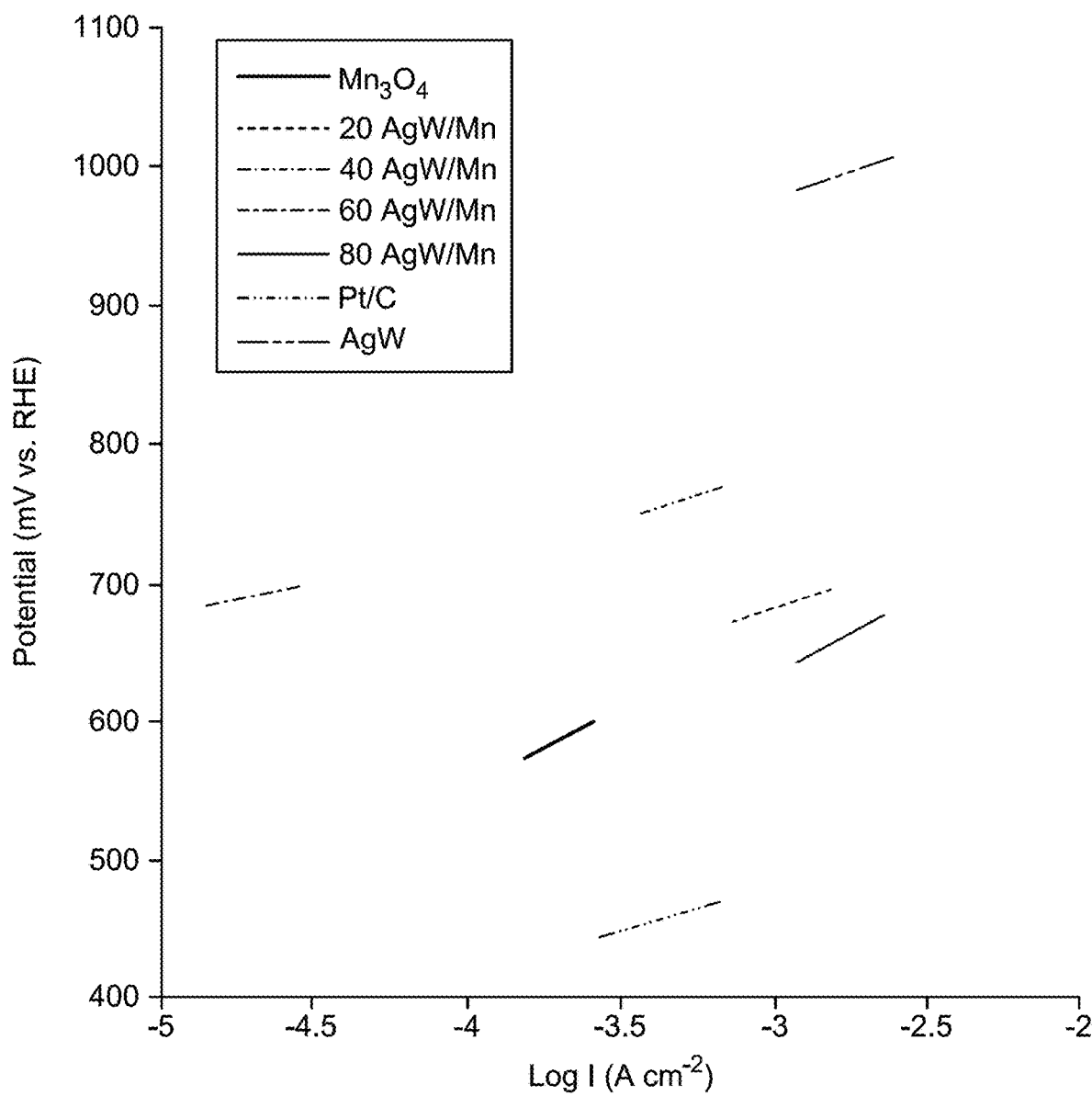
FIG. 11D depicts Tafel plots for Pt/C, AgW, $Mn_3O_4$, 20 AgW/Mn, 40 AgW/Mn, 60 AgW/Mn, and 80 AgW/Mn electrocatalysts, according to certain embodiments.

The OER electrocatalytic performances of $Mn_3O_4$, AgW, 20 AgW/Mn, 40 AgW/Mn, 60 AgW/Mn, and 80 AgW/Mn in 1.0 M KOH were measured to determine the half-cell of the overall water splitting. FIGS. 11A-11B show the LSV recorded in the 0 V to 2.4 V margin vs. RHE at a scan rate of 10.0 mV/s. The iR-modified LSV results indicate overpotentials (η10) at 1.1 V, 0.52 V, 0.41 V, 0.40 V, 0.28 V and 0.84 V for $Mn_3O_4$, AgW, 20 AgW/Mn, 40 AgW/Mn, 60 AgW/Mn, 80 AgW/Mn catalysts, respectively, at a current density of 10 mA cm², as shown in FIG. 11B. The 60 AgW/Mn catalyst exhibited the lowest overpotential of about 0.28 V, followed by the 40 AgW/Mn at 0.4 V, compared with Pt/C, which has an overpotential of about 0.36 V. Moreover, the 60 AgW/Mn catalyst displayed an overpotential of 1.07 V at a current density of 50 mA cm². The evolution of crests at 1.2 V for AgW and at 0.73 V for 60 AgW/Mn in their LSV curves is indicative of the oxidation peak of AgW, and the shift into lower potential in 60 AgW/Mn reflects the interaction committed between the AgW components and Mn moieties. The peaks were seen in the CV curves. In conformity with the polarization results, the Tafel slope value of 60 AgW/Mn was about 50.75 mV dec⁻¹, as shown in FIG. 11C, when compared to $Mn_3O_4$ at about 126.46 mV dec⁻¹, AgW at about 94.24 mV dec⁻¹, 20 AgW/Mn at about 80.54 mV dec⁻¹, 40 AgW/Mn at about 69.76 mV dec⁻¹, and 80 AgW/Mn at about 114.31 mV dec⁻¹. This indicates that the 60 AgW/Mn catalyst has the highest electron transfer paths during the OER process when compared to the other nanocomposites. High electrical conductivity and specific surface area of 60 AgW/Mn may explain the increased catalytic kinetics. Exposing more Ag nanoparticles (54.5%) on the 60% AgW/Mn surface than on either the 80% AgW/Mn surface (41.2%) or the mother AgW (31.1%) can boost the charge density on the former. Furthermore, according to the p-n junction established between the components forming the former composites, uninterrupted electron transfer in one direction may occur and thus facilitates rapid reaction kinetics. Further, decreasing the particle diameter of 60 wt. % AgW/Mn and boosting the number of active sites due to increasing the ECSA value facilitates the electron transfer processes. The Mott-Schottky (M-S) plots were measured at a frequency of 1000 Hz to determine operational parameters of the synthesized semiconductors, which are specifically either p-type or n-type. The DC potential was kept from 0 V to 1.8 V vs. RHE for $Mn_3O_4$ and $Ag_2WO_4$. The M-S curve of $Mn_3O_4$ reveals a negative slope, signifying that $Mn_3O_4$ is a typical P-type semiconductor. For $Ag_2WO_4$, the positive slope of the M-S plot indicated that $Ag_2WO_4$ is a typical n-type semiconductor. The results confirmed the formation of n-p heterostructures with increased electron density. A comparison of the onset potential of the catalyst indicates that 60 AgW/Mn has the lowest onset potential of about 0.97 V. 0.97V was the lowest when compared with the rest of the catalysts [$Mn_3O_4$ (1.74 V), AgW (1.47 V), 20 AgW/Mn (1.44 V), 40 AgW/Mn (1.29 V), 80 AgW/Mn (1.45 V)]. The specific surface area of the catalyst may be related to this onset reduction. To confirm the role of both the electrical conductivity and surface area, the resistivity and ECSA experiments were performed. The resistivity evaluations are listed in Table 2, and the ECSA experiment results are provided in FIG. 11D. The 60 AgW/Mn catalyst indicated the lowest resistivity of about 0.61×10⁷Ω, better than other catalysts, reflecting the ease of electron transfer. The ECSA results obtained for the 60 AgW/Mn catalyst indicated the highest ECSA, explaining the high number of active sites at the electrode surface that are amenable to efficient electrochemical reaction.

Figure 11E:
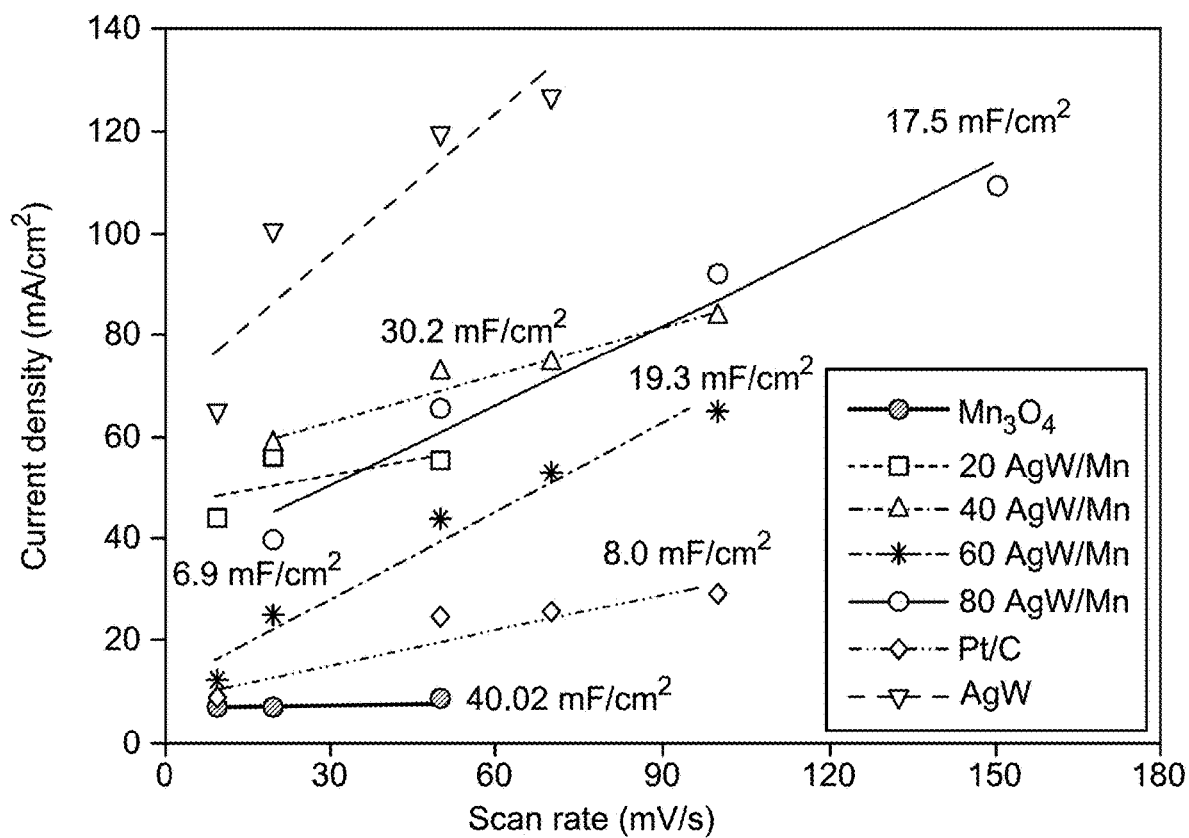
FIG. 11E shows differences in current density ($\Delta J=Ja-Jc$) plotted against scan rates for for Pt/C, AgW, $Mn_3O_4$, 20 AgW/Mn, 40 AgW/Mn, 60 AgW/Mn, and 80 AgW/Mn electrocatalysts, according to certain embodiments.
Figure 11F:
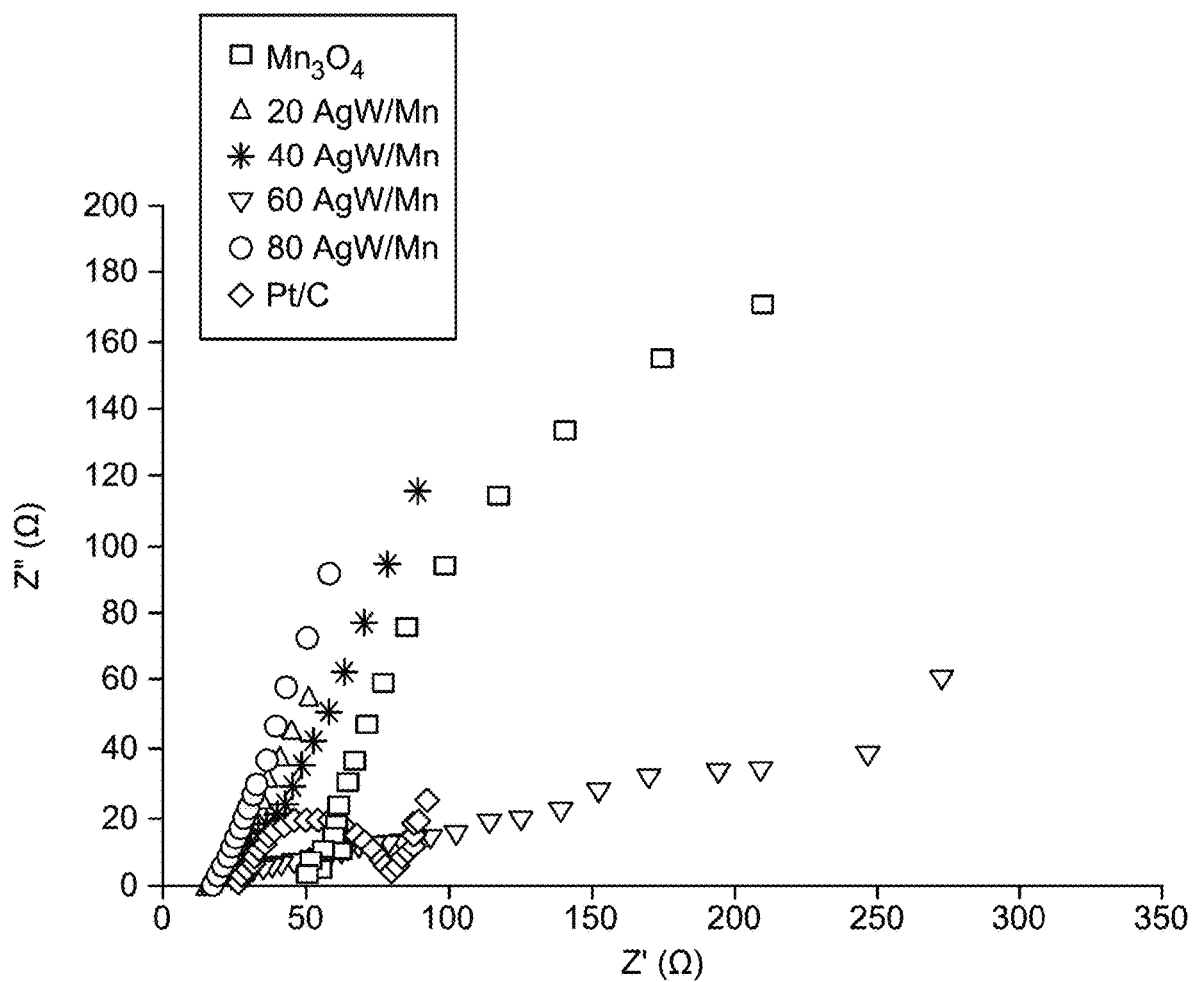
FIGS. 11F-11G are Nyquist plots of the Pt/C, $Mn_3O_4$, 20 AgW/Mn, 40 AgW/Mn, 60 AgW/Mn, and 80 AgW/Mn electrodes, according to certain embodiments.
Figure 11G:
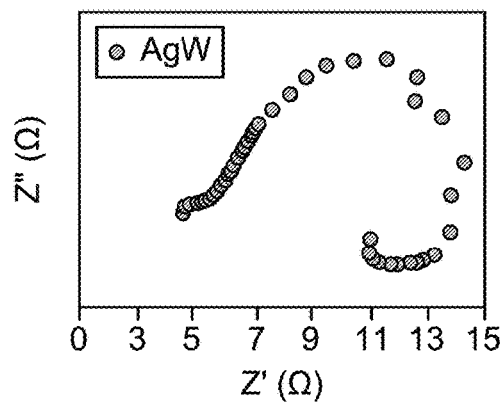
Figure 11H:
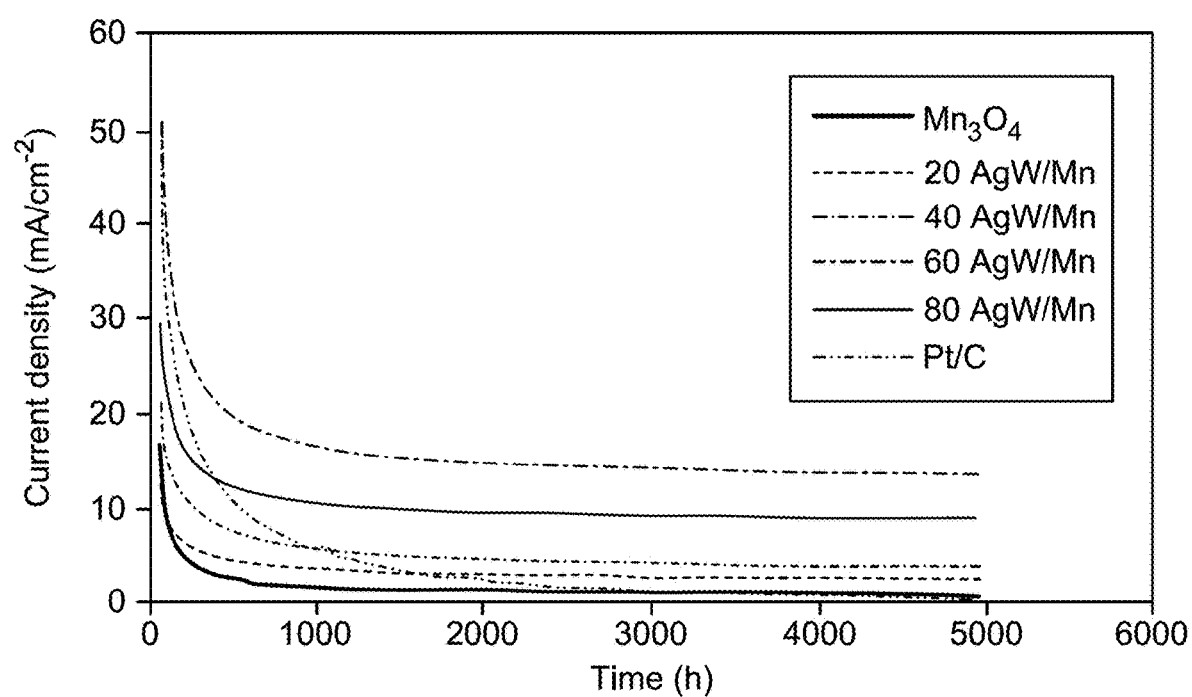
FIG. 11H shows a chronoamperometric curves of Pt/C, $Mn_3O_4$, 20 AgW/Mn, 40 AgW/Mn, 60 AgW/Mn, and 80 AgW/Mn electrodes at 10 mA $cm^2$ related to ORE, according to certain embodiments, according to certain embodiments.

Further, Nyquist plots of the catalysts are shown in FIG. 11E. The 60 AgW/Mn catalyst has the lowest charge transfer resistance, at about 340Ω of all the catalysts and was only exceeded by the Pt/C catalyst, which is at about 85Ω. Hence, it may have the lowest RESR of 22.0. However, it only outperforms the 80 AgW/Mn catalyst, as listed in Table 2. This demonstrates that the 60 AgW/Mn catalyst has a desirable electron transfer capacity and simple OER kinetics. Interestingly, the 60 wt. % AgW/Mn electrode indicates a current density of 55 mA cm⁻² at 2.25 V for OER, while it measures 40 mA cm⁻² at 0.13 V for HER. The sample stability is shown in FIGS. 11F-11G, the OER performance indicated a higher OER activity for the 60 AgW/Mn electrode, which showed a minor drop, followed in sequence by the 80 AgW/Mn, 40 AgW/Mn, and 20 AgW/Mn, respectively. This indicates that the former electrode may resist poisoning.

Faradaic efficiency was calculated using the $QO_2/Q_{tot}$ ratio. For 60 and 80 catalysts, the experimental $O_2$ quantification and integrated currents with $QO_2$ and $Q_{tot}$ and their associated results were determined to be 90 wt. % and 88 wt. %, respectively, implying that the oxidation current is primarily due to a four-electron route OER process and relatively stabilized the improved performance as a result of the combination between Mn and AgW. Gas chromatography (GC) was utilized to confirm and quantify the amount of $O_2$ gas produced during the water splitting reaction. The amount of generated $O_2$ gas for 80 AgW/Mn, 60 AgW/Mn, 40 AgW/Mn, 20 AgW/Mn, AgW, and $Mn_3O_4$ has been calculated to be 114.7 mmol $g^{-1}$, 211.5 mmol $g^{-1}$, 156.1 mmol $g^{-1}$, 154.7 mmol $g^{-1}$, 141.3 mmol $g^{-1}$, and 25.1 mmol $g^{-1}$, respectively.

Turnover frequency (TOF) was calculated to gain further insights into the catalytic activity of the catalysts included herein. The TOF values provide a measure of the efficiency of the catalysts in terms of the number of reaction events per active site per unit time. TOF is a useful parameter to describe the reaction rate in terms of the catalytic sites, which is the intrinsic catalytic activity of the electrocatalyst. It was found that the TOF for OER at overpotential 1.0 V for 80 AgW/Mn, 60 AgW/Mn, 40 AgW/Mn, 20 AgW/Mn, AgW, and $Mn_3O_4$ was calculated to be 0.945 $s^{-1}$, 1.173 $s^{-1}$, 0.647 $s^{-1}$, 0.320 $s^{-1}$, 0.520 $s^{-1}$, and 0.059 $s^{-1}$, respectively. The obtained results revealed that the 60AgW/Mn catalyst has the highest TOF value of about 1.173 $s^{-1}$ and, in some cases, exceeds some comparable materials, indicating its high intrinsic activity. The order of decreasing the TOF values was in the following sequence, 60 AgW/Mn>80 AgW/Mn>40 AgW/Mn>20 AgW/Mn>AgW>Mn3O4.

In order to examine the consequences of electrocatalysts after performing OER, bulk, and morphology (XRD and TEM-HRTEM) characteristics were measured. The distinctive peaks of the 60 AgW/Mn catalyst, as shown in FIG. 2, linked to $Mn_3O_4$, $MnO_2$, and $Ag_2WO_4$ are unaffected, indicating that the active sites are maintained with only a slight increase in crystallite size. TEM was used to characterize the morphological structure change for 60 AgW/Mn and 80 AgW/Mn electrodes before and after performing OER. The original morphology of the 60 AgW/Mn catalyst is shown in FIGS. 3G-3H and exhibits rods and a platelet structure of Mn covered with a nanoparticle array of AgW. After OER, spherical particles are dispersed on the plate-like particles of Mn. However, in 80 AgW/Mn, particle agglomeration with narrow spaces between them is attained after OER, resulting in some deterioration in the structure. After OER, there was no marked change in the structure or morphology of the electrocatalysts apart from that mention since both exhibit nearly identical line spacing in HRTEM images. However, the spacing lengths of some facets decreased, which explains the increase in particle size, as detected from XRD results.

These results support the maximum activity of the 60 AgW/Mn electrocatalyst. The increased activity of the 60 AgW/Mn catalyst may be due to an increase in the $Mn^{2+}$ ratio, nearly double that of the 80 AgW/Mn catalyst, as well as an increase in the $Mn^{3+/4+}$ ratio that makes the difference. Preserving some lattice planes as (200-$MnO_2$) in 60 wt. % AgW/Mn endorses the presence of more active sites. In addition, exposing more Ag nanoparticles (54.5%) on the 60 wt. % AgW/Mn surface than on either the 80 wt. % AgW/Mn surface (41.2 wt. %) or the original AgW (31.1 wt. %) enhances the electron capacity and behaves as a selective co-catalyst for water reduction into $H_2$. TEM results concluded that the rod-like nanostructure of Mn moieties covered with disordered nanoparticles of AgW had a higher number of vacancies and a higher degree of misregistration than individual analogs. The particle diameter of the 60 wt. % samples is one of the smallest. Between the composite catalysts, 60 AgW/Mn catalyst has the largest electrochemical surface area and ease of electron transport.

Example 13: Hydrogen Evolution Reaction

Figure 12A:
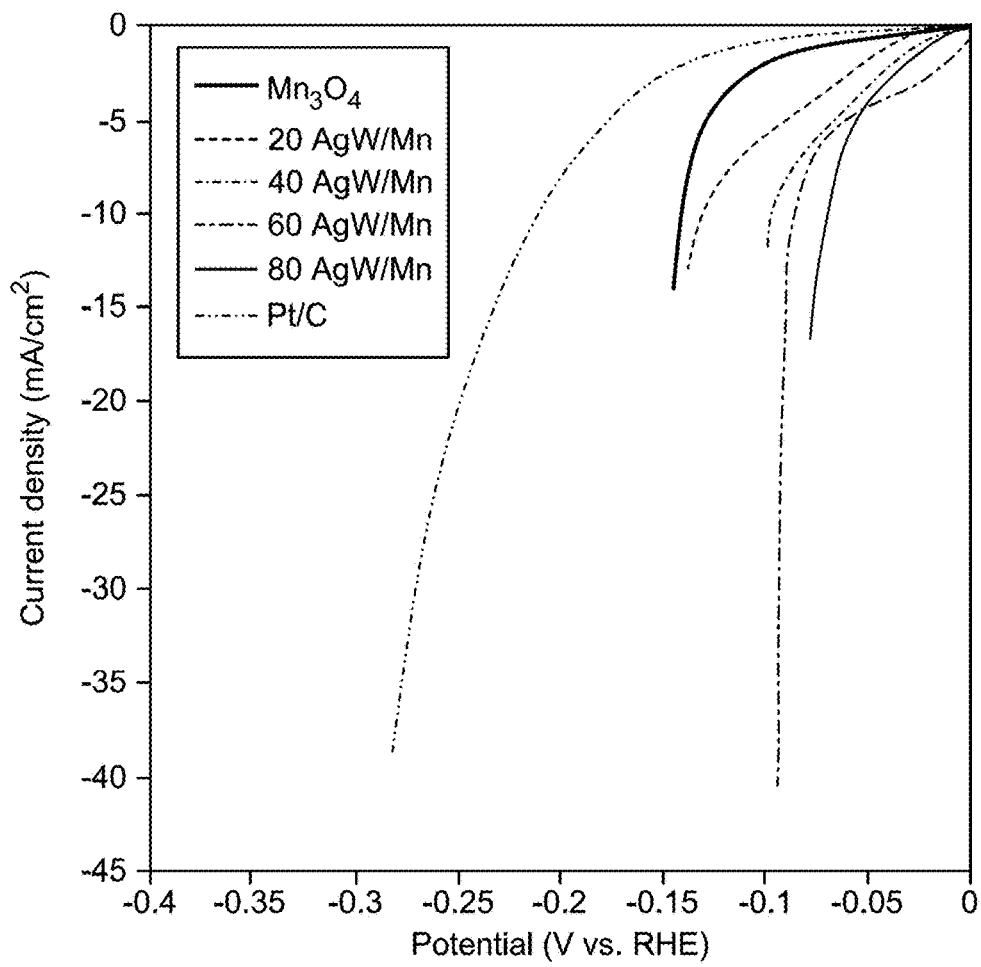
FIGS. 12A-12B show polarization curves of HER in 1.0 M KOH for electrocatalysts Pt/C, $Mn_3O_4$, AgW, 20 AgW/Mn, 40 AgW/Mn, 60 AgW/Mn, 80 AgW/Mn electrocatalysts, measured with a scan rate of 10 mV/s, according to certain embodiments.
Figure 12B:
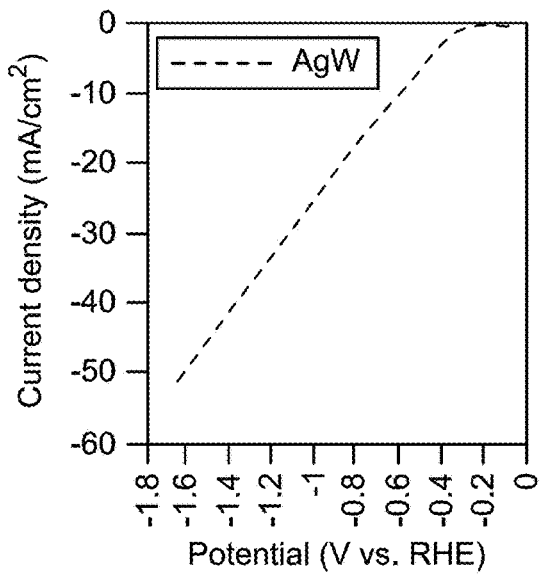
Figure 12C:
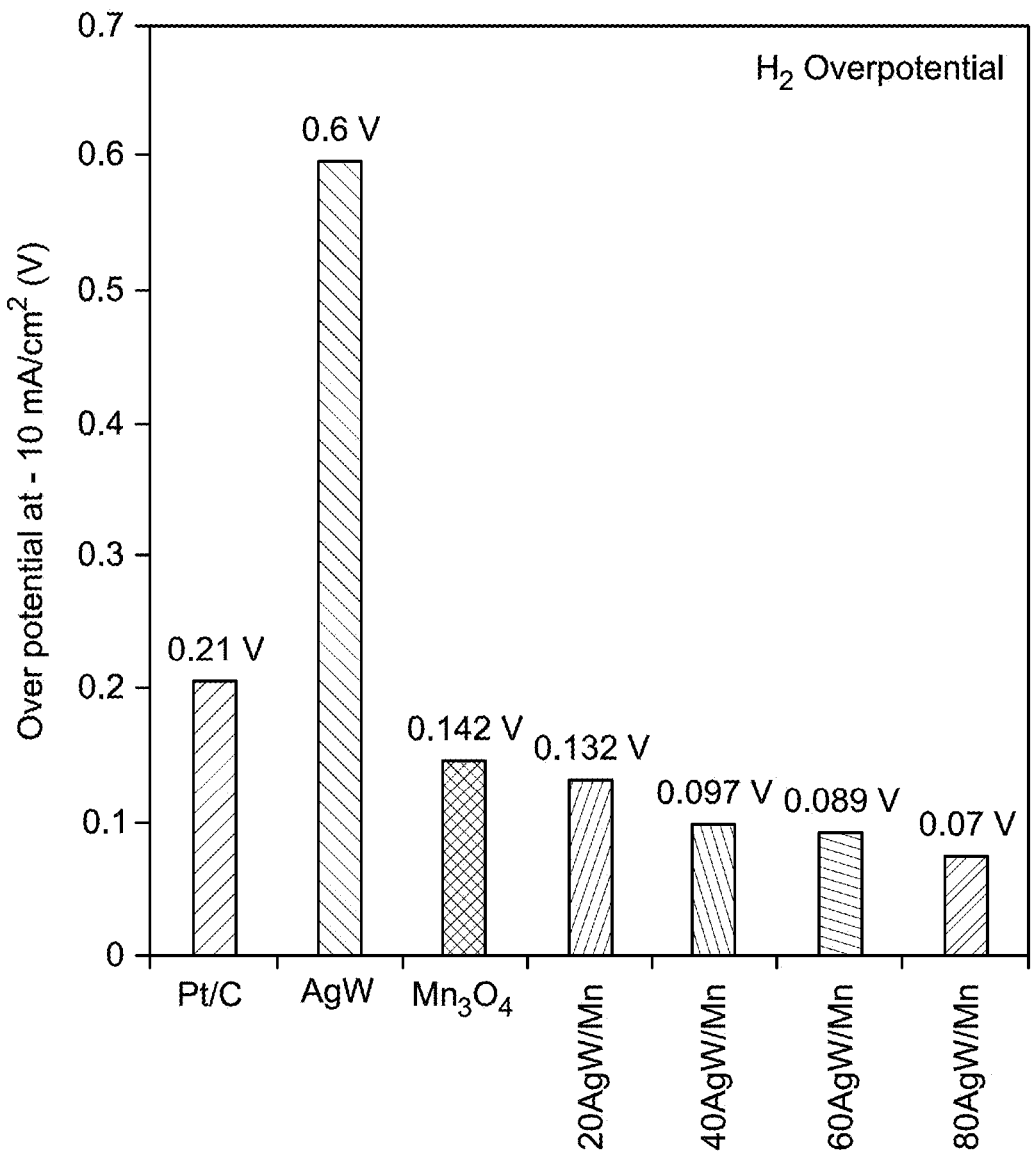
FIG. 12C is an overpotential curve obtained at 10 mA $cm^2$ from FIG. 12A for electrocatalysts Pt/C, $Mn_3O_4$, AgW, 20 AgW/Mn, 40 AgW/Mn, 60 AgW/Mn, 80 AgW/Mn, according to certain embodiments.
Figure 12D:
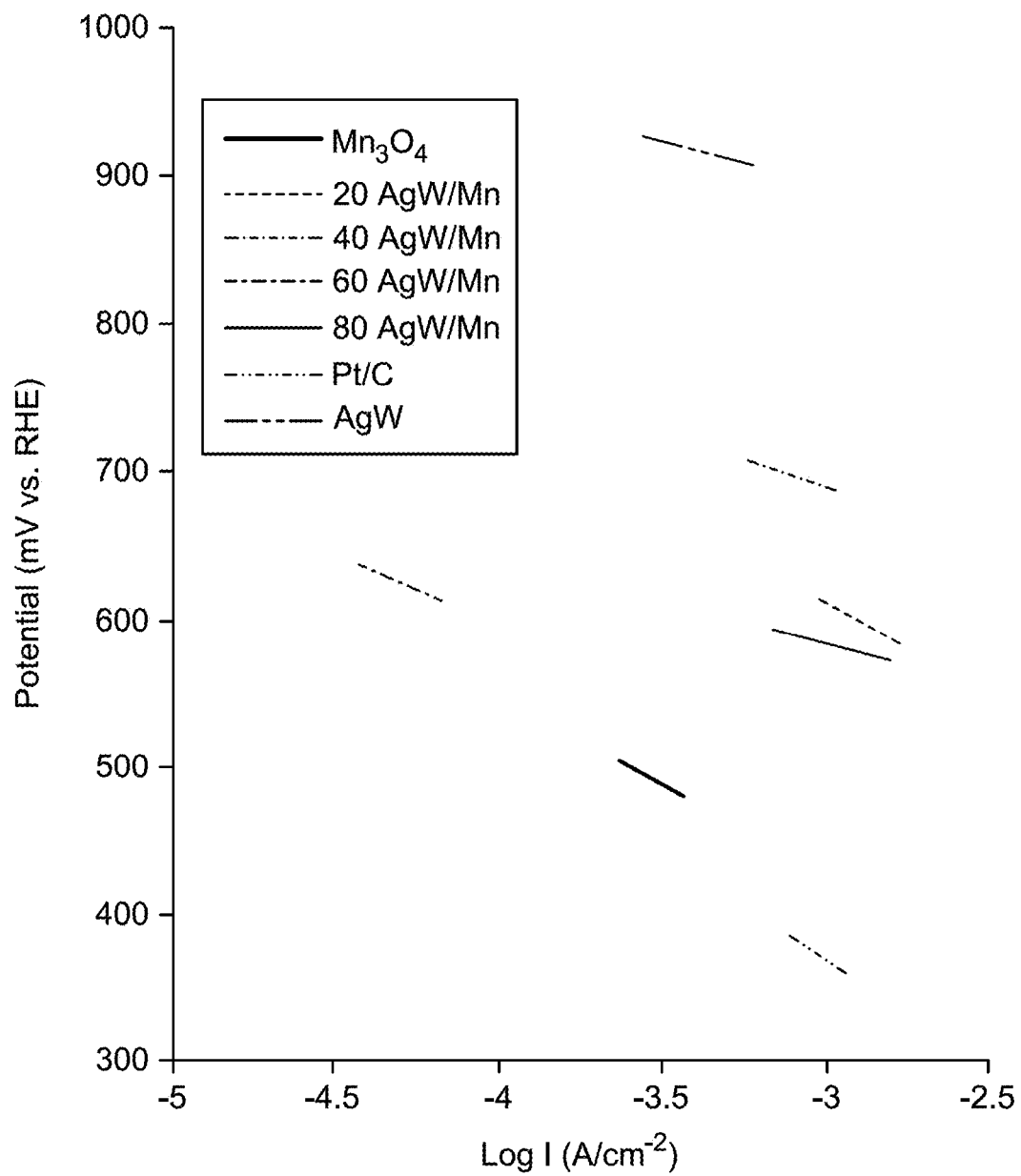
FIG. 12D depicts Tafel plots of Pt/C, AgW, $Mn_3O_4$, AgW, 20 AgW/Mn, 40 AgW/Mn, 60 AgW/Mn, 80 AgW/Mn electrocatalysts, according to certain embodiments.

A three-electrode approach was used to investigate the HER activity of the $Mn_3O_4$, AgW, 20 AgW/Mn, 40 AgW/Mn, 60 AgW/Mn, and 80 AgW/Mn electrodes in 1.0 M KOH in comparison to Pt/C. The 60 AgW/Mn and 80 AgW/Mn electrodes have the most activity, according to the iR corrected polarization curves illustrated in FIGS. 12A-12B, they outperformed Pt/C on HER by having very low overpotentials at $\eta 10$ of 0.089 V and 0.071 V, respectively, even surpassing Pt/C, $\eta_{10}$=0.21 V. The $\eta_{10}$ for 20 AgW/Mn and 40 AgW/Mn were as high as 0.131 V and 0.097 V, respectively, as shown in FIG. 12C. Increasing the AgW ratio may cause an overpotential drop, even though AgW-free $Mn_3O_4$ has a very high overpotential at 0.6 V. The $Mn_3O_4$ electrode, on the other hand, has a 0.21 V overpotential. This provides evidence for the conclusion that the committed interaction between AgW and $Mn_3O_4$ improves HER activity. Comparable Tafel plots of the electrodes are shown in FIG. 12D, which indicate that the 80 AgW/Mn electrode has the lowest value of 61.6 mV $dec^{-1}$ compared to the rest of the electrodes including $Mn_3O_4$ (113.09 mV $dec^{-1}$), AgW (54.74 mV $dec^{-1}$), 20 AgW/Mn (117.61 mV $dec^{-1}$), 40 AgW/Mn (99.11 mV $dec^{-1}$), and 60 AgW/Mn (73.35 mV $dec^{-1}$). These observations illustrate the rapid kinetics of the 80 AgW/Mn and 60 AgW/Mn electrodes even when compared with the Pt/C (127.21 mV $dec^{-1}$). Further, the onset potentials of 20 AgW/Mn (0.403 V) and 60 AgW/Mn (0.581 V) electrodes were the lowest compared to the rest of the electrodes, except that of Pt/C (0.071 V). The 60 AgW/Mn electrode, in agreement with previous results, indicated the highest HER mass activity (1364.4 mA $g^{-1}$) at a potential equal to 1.5 V vs. NHE, exceeding Pt/C (1328.4 mA $g^{-1}$), 80 AgW/Mn (1297 mA $g^{-1}$), 20 AgW/Mn (877.7 mA $g^{-1}$), $Mn_3O_4$ (683 mA $g^{-1}$), 40 AgW/Mn (669 mA $g^{-1}$) and AgW (292 mA $g^{-1}$). The fact that 60 AgW/Mn had a higher value (j) than Pt/C and other nanocomposites demonstrated the intrinsic enhancement of active site locations on its heterointerfaces. The ECSA results, as mentioned above, indicated that 60 AgW/Mn had a higher double layer capacitance value of about 19.3 mF $cm^{-2}$ than 80 AgW/Mn at about 17.5 mF $cm^{-2}$, Pt/C at about 8.0 mF $cm^{-2}$, and 20 AgW/Mn at about 6.9 mF $cm^{-2}$, however, it was inferior to 40 AgW/Mn at about 30.2 mF $cm^{-2}$, $Mn_3O_4$ at about 40 mF $cm^{-2}$ and AgW at about 30.2 mF $cm^{-2}$. This indicates that the composites 60 AgW/Mn and 40 AgW/Mn attained intense active sites in conformity with the determined SBET of the samples. To confirm the activity of the examined electrocatalysts, the amount of $H_2$ evolved from the water-splitting reaction was measured using GC. The obtained results show that the 60 AgW/Mn electrode indicates the highest amount of $H_2$ at about 429.4 mmol $g^{-1}$, exceeding 80 AgW/Mn at about 337.7 mmol $g^{-1}$, 40 AgW/Mn at about 309.8 mmol $g^{-1}$, 20 AgW/Mn at about 229.4 mmol $g^{-1}$, $Mn_3O_4$ at about 211.6 mmol $g^{-1}$, Pt/C at about 143.1 mmol $g^{-1}$, and AgW at about 50.1 mmol $g^{-1}$.

TABLE 2

Electrical resistivity, dielectric constant and eElectrochemical parameters provided from EIS of all catalysts.

| Catalyst | Electrical resistivity ($R_{DC}$) ohm ($\Omega$) × $10^7$ | Dielectric constant ($\epsilon$') | RESR ($\Omega$) | RCT ($\Omega$) |
|---|---|---|---|---|
| Pt/C | — | — | 29 | 85 |
| AgW | 38 | 11.1 | 33.84 | 127 |
| $Mn_3O_4$ | 6.6 | 15.2 | 40.02 | 480 |
| 20 AgW/Mn | 5.9 | 10.3 | 16.29 | 403 |
| 40 AgW/Mn | 4 | 11.8 | 25.36 | 387 |
| 60 AgW/Mn | 0.61 | 9.8 | 22.01 | 340 |
| 80 AgW/Mn | 0.95 | 22.1 | 18.63 | 430 |

The calculated TOF values for HER at an overpotential 0.08 V for 80 AgW/Mn, 60 AgW/Mn, 40 AgW/Mn, 20 AgW/Mn, AgW, and $Mn_3O_4$ were found to be 11.439 $s^{-1}$, 1.597 $s^{-1}$, 0.374 $s^{-1}$, 0.066 $s^{-1}$, 0.020 $s^{-1}$, and 0.028 $s^{-1}$, respectively. The results showed that the 60AgW/Mn catalyst has the largest TOF value of about 1.597 $s^{-1}$, compared to other catalysts, and exceeds that of Pt/C, which was about 0.09 $s^{-1}$. The order of decreasing the TOF values is as follows: 60 AgW/Mn>80 AgW/Mn>40 AgW/Mn>20 AgW/Mn>$Mn_3O_4$>AgW.

The EIS results are shown in FIGS. 12E-12F and indicate that the 60 AgW/Mn electrode acquired the least charge transfer opposition, which was about $R_{CT}$=340$\Omega$, among all nanocomposites. However, it was lower than Pt/C, which was about 85$\Omega$, implying the rapid electron transport of the heterogeneous 60 AgW/Mn nanostructures. On the other hand, the electrode employed the smallest solution resistance of about 22.0$\Omega$, of all nanocomposite electrodes except 20 AgW/Mn, which was about 16.29$\Omega$, and 80 AgW/Mn, which was at 18.6$\Omega$.

Figure 13A:
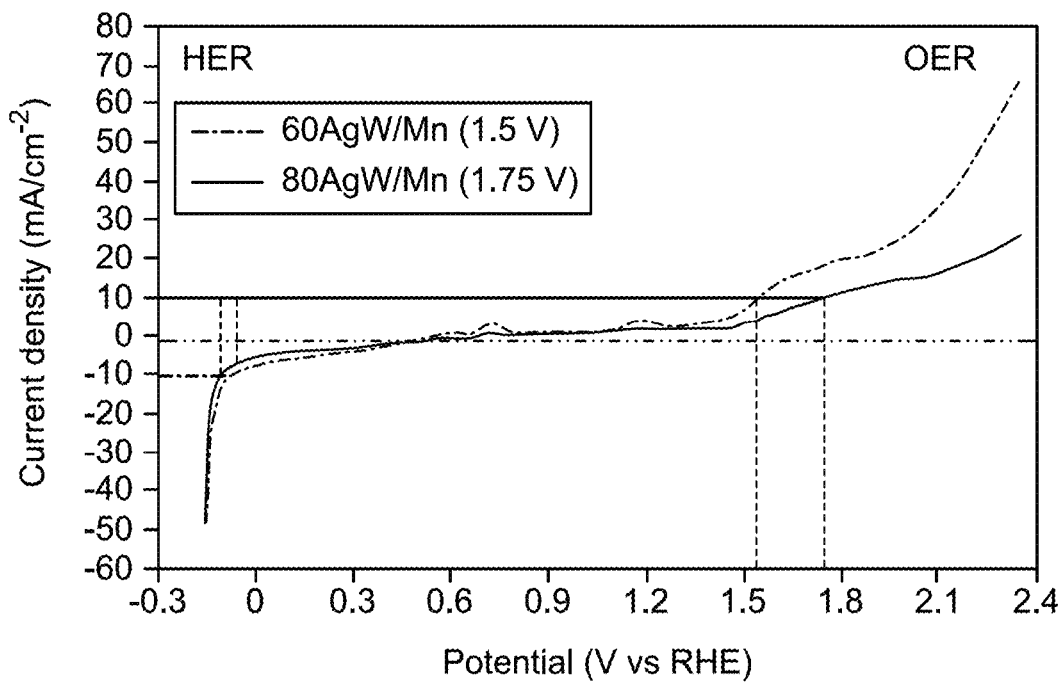
FIG. 13A shows linear sweep voltammetry (LSV) curves for showing the HER and OER processes for 60AgW/Mn and 80AgW/Mn electrocatalysts in 1.0 M KOH, measured with a scan rate of 10 mV/s, according to certain embodiments.

The 80 AgW/Mn and 60 AgW/Mn nanocomposites may serve as bifunctional electrocatalysts to accomplish overall water-splitting experiments due to the high activity of the OER and HER processes simultaneously. In a two-electrode electrolyzer, the synthesized materials were used as both anode and cathode catalysts. A cell voltage of 1.75 V and 1.54 V, respectively, is required to initiate an electrocatalytic current density of 10 mA $cm^{-2}$, as shown in FIG. 13A. The catalytic performance of the 60 AgW/Mn/60 AgW/Mn system may be superior to many previously reported bifunctional catalysts as listed in Table 3 and similar to $RuO_2$/Pt/C (1.68 V), indicating a significant increase in activity.

TABLE 3

Comparison of OER and HER performances of 60 AgW/Mn and 80 AgW/Mn electrocatalysts in comparison with other reported composites.

| Electrocatalyst | Electrolyte (KOH) | HER $\eta_{10}$ (V) | HER Tafel slope (mV $dec^{-1}$) | OER $\eta_{10}$ (V) | OER Tafel slope (mV $dec^{-1}$) | Overall potential (V) | Ref. (disclosed below table) |
|---|---|---|---|---|---|---|---|
| $Mn_3O_4$@$SnO_2$/$Co_3O$ | 1.0M | | | 0.42 | 70.1 | | 1* |
| $Mn_3O_4$/CF | 1.0M | | | 0.432 | 158 | | 2* |
| $Mn_3O_4$@$Cu(OH)_2$ | 1.0M | | | 0.314 | 97 | | 2* |
| $MoS_2$—$NiS_2$/NGF | 1.0M | 0.172 | 70 | 0.37 | | 1.64 | 3* |
| $Mn_3O_4$/$CoSe_2$ | 1.0M | | | 0.45 | 49 | | 4* |
| $MnMoO_4$/PANI-5 | 1.0M | 0.155 | | 0.411 | | 1.65 | 5* |
| $Mn1.5Co1.5(PO4)_2$ | 1.0M | 0.121 | | 0.254 | | 1.54 | 6* |
| 5 at % Ni—$Mn_3O_4$ | 1.0M | | | 0.458 | 74.9 | | 7* |
| $CoMnO_2$ | 1.0M | | | 0.39 | 95 | | 8* |
| ZnO/$Mn_3O_4$ NPs | 1.0M | 0.137 | 541 | 0.42 | 96 | | 9* |
| NiO@NF | 1.0M | 0.494 | | | 317 | | 10* |
| Standard $RuO_2$ | 1.0M | | | | 128 | | 11* |
| Ag@Ni0.33Co0.67P | 1.0M | 0.121 | 102.88 | 0.259 | 89.55 | 1.64 | 12* |
| $Mn_3O_4$/$CoSe_2$ | 1.0M | | | 0.45 | | | 13* |
| CoO/hi-$Mn_3O_4$ | 1.0M | | | 0.378 | | | 13* |
| MnOx/Au—$Si_3N_4$ | 1.0M | | | 0.53 | | | 13* |
| $\alpha$-$MnO_2$/AuNP-4.4 | 1.0M | | | 0.39 | | | 14* |
| $Mn_2O_3$:2.64% Mo | 1.0M | | | 0.49 | | | 15* |
| Ag@NiFe LDH | 30% | | | 0.246 | | | 16* |
| 60 AgW/Mn | 1.0M | 0.086 | 73.35 | 0.28 | 50.75 | 1.54 | Present |
| 80 AgW/Mn | 1.0M | 0.07 | 61.6 | 0.84 | 114.31 | 1.75 | Present |

1. Song, Y., et. al., Int. J. Hydrogen Energy, 2020, 45, 4501-10;
2. Ge, Z., et. al., J. Power Sources, 2020, 476, 228731;
3. Kuang, P., et. al., Appl. Catal. B Environ., 2019, 254, 15-25;
4. Gao, M. R., et. al., J. Am. Chem. Soc., 2012, 134, 2930-33;
5. Tamboli, M. S., et. al., Dalton Trans., 2022, 51, 6027-35;
6. Chinnadurai, D., et. al., Appl. Catal. B Environ., 2021, 292, 120202;
7. Hong, J. S., et. al., Small Methods, 2020, 4, 1900733;
8. Li, D., et. al., J. Am. Chem. Soc., 2016, 138, 12, 4006-9;
9. Zahra, T., et. al., RSC Adv., 2020, 10, 9854-67;
10. Wang, J., et. al., Adv. Mater., 2017, 29, 1605838;

11. Han, H., et. al., ACS Catal., 2018, 8, 5, 4091-102;
12. Wang, F., et. al., Nanomaterials, 2022, 12, 1205;
13. Sunghak, P., et. al., Energy Environ. Sci., 2020, 13, 2310-40;
14. Chung-Hao, K., et. al., Angew. Chem. Int. Ed., 2015, 54, 2345-50;
15. Balaghi, S. E., et. al., ACS Catal., 2020, 10, 2074-87;
16. Lingling, W., et. al., Chem. Eng. J., 2022, 442, 136168, each of which is incorporated herein by reference in its entirety.

Example 14: Stability Tests

Figure 13B:
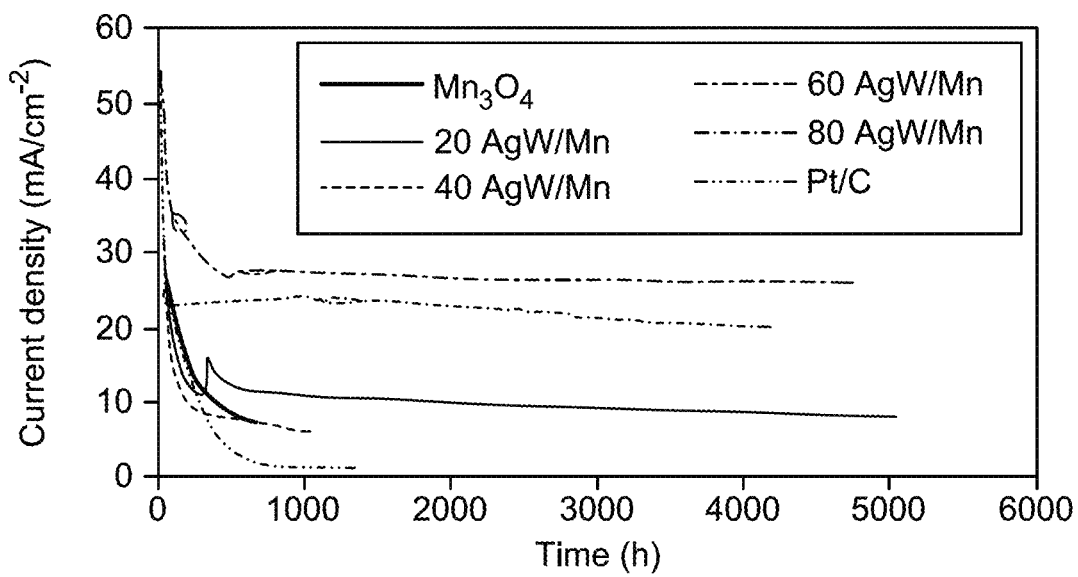
FIG. 13B shows a chronoamperometric curves for electrocatalysts Pt/C, $Mn_3O_4$, 20 AgW/Mn, 40 AgW/Mn, 60 AgW/Mn, 80 AgW/Mn at 10 mA $cm^2$ related to HER, according to certain embodiments.
Figure 13C:
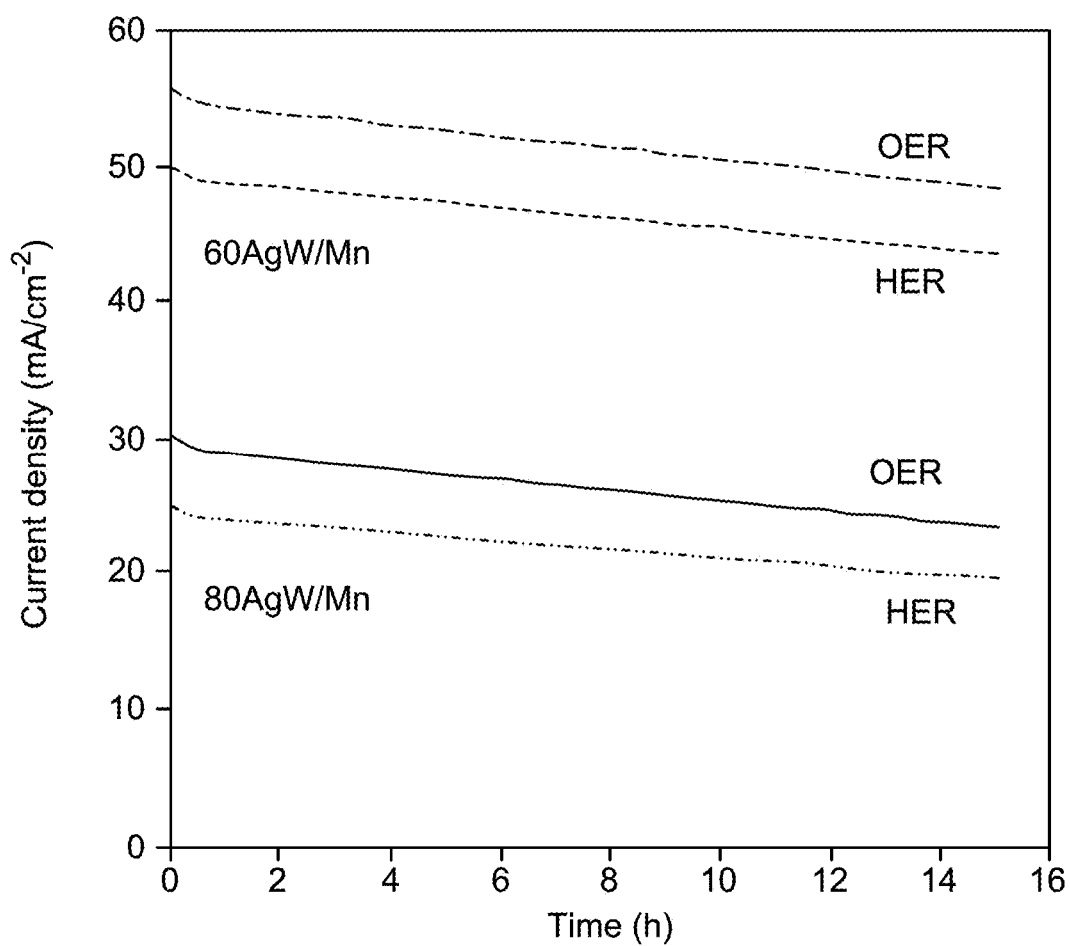
FIG. 13C depicts I-T curves measured for the 60AgW/Mn and 80AgW/Mn electrocatalysts during 15 hours of operation, recorded at 0.3 V for the OER and −0.09 V for the HER, according to certain embodiments.

The long-term stability test of all electrodes was done in 1.0 M KOH with commercial Pt/C as the reference since catalytic stability was another important criterion for catalytic practicability. As shown in FIG. 13B, the Pt/C had a higher initial HER activity but had low electrocatalytic endurance. This may be due to the susceptibility to poisoning of the Pt/C catalyst. After a time of circulation, the 60 AgW/Mn catalyst showed a minor drop in current density, followed by the 80 AgW/Mn catalyst. The slight increase in activity of the 80 AgW/Mn, despite the stability of 60 AgW/Mn, might be attributed to the birnessite $Mn^{3+}/^{4+}$ moiety ratio (2.5). The excess $Mn^{3+}$ ratio compared to the 60 wt. % ratio may make water reduction stability on the 80 AgW/Mn catalyst surface difficult due to its poor conductivity. Furthermore, an increase in crystallite diameter may help to compensate for the poor stability of the 80 wt. % catalysts compared to the 60 wt. % catalysts. The higher the percent ratio of Mn—O linkages in the 80 wt. % catalysts compared to the 60 wt. % catalysts, the lower the hybridization and the higher the Mn4+ ratio, which reduces water reduction activities. As shown in FIG. 13C after a 15-hour continuous run, there was no significant change in the current densities and only a slight decrease, indicating that the 60 AgW/Mn and 80 AgW/Mn electrocatalysts remained stable for both the OER and the HER.

Table 3 shows that incorporating $\alpha$-$Mn_3O_4$ moieties on various supports such as $SnO_2/Co_3O_4$, CF, $Cu(OH)_2$, $CoSe_2$, and ZnO or depositing a metal on $\alpha$-$Mn_3O_4$ such as 5% Ni/$\alpha$-$Mn_3O_4$ and/or employing highly expensive sophisticated synthesized techniques, such as in Ag NWS@Ni0.3Co0.67P, or $RuO_2$, $MoS_2$—$NiS_2$/NGF, indicate lower activity. Similarly, $CoMnO_2$, $MnMoO_4$/PANI, NiO@NF, and $Mn_{1.5}Co_{1.5}(PO_4)_2(H_2O)$ have lower overpotentials for both $H_2$ and $O_2$ evolution than the 60 wt. % and 80 wt. % AgW/Mn catalysts.

An electrocatalyst for boosting water oxidation-reduction was prepared and investigated. A method of producing hydrogen gas by HER and a method of producing oxygen gas by OER using the electrocatalysts was investigated. The electrocatalyst includes a Mn nanoplate including $Mn^{3+}$, $Mn^{4+}$, and $Mn^{2+}$ configurations decorated by uniformly distributed Ag@$\alpha$-$Ag_2WO_4$ nanoparticles. Increasing the birnessite ratio of $Mn^{3+}/Mn^{4+}$ may increase the transmission of charges during the oxidation of water and the exposure of more active sites, resulting in enhanced OER activity (0.28 V at η10) compared to both individual analogues and the 80 AgW/Mn electrocatalyst. Increasing the loading of AgW over 60 wt. % affected the $Mn^{3+}/Mn^{4+}$ ratio to be lower than that of the 60 wt. % catalyst. This caused increased activity towards water reduction that is substantiated by the 80 wt. % catalyst (0.071 V at η10). However, it suffers from instability due to enhancing the $Mn^{3+}$ concentration. The overall splitting of the 60 wt. % catalyst showed a potential of 1.54 V at $η_{10}$, indicating its suitability on a large scale since it may be economically sustainable and has desirable stability. Further, several parameters, including the $Mn^{2+}$ ratio, Ag nanoparticles, particle sizes, and the Mn—O connection, had an impact, but not as pronounced as the birnessite ratio.

Numerous modifications and variations of the present disclosure are possible in light of the above teachings. It is, therefore, to be understood that within the scope of the appended claims, the invention may be practiced otherwise than as specifically described herein.

The invention claimed is:

1. A method of producing hydrogen gas by a hydrogen evolution reaction, the method comprising:
contacting an electrocatalyst with an aqueous electrolyte solution comprising a hydroxide base;
applying a potential of −300 to −1 mV vs RHE to the electrocatalyst and a counter electrode immersed in the aqueous electrolyte solution, wherein
the electrocatalyst comprises
manganese oxide nanoparticles, and
silver-containing nanoparticles disposed on the manganese oxide nanoparticles, the silver-containing nanoparticles include a shell of $Ag_2WO_4$ disposed on a core of Ag; and
the electrocatalyst has
an electrical resistivity of $0.50 \times 10^7$ to $6.0 \times 10^7 \Omega$,
a charge transfer resistance of 325 to 450Ω,
a Tafel slope of 55 to 125 mV/dec, and
an overpotential at 10 mA/$cm^2$ of 0.05 to 200 mV.

2. The method of claim 1, wherein the electrocatalyst includes
50 to 70 wt. % silver-containing nanoparticles; and
30 to 50 wt. % manganese oxide nanoparticles, based on a total weight of the electrocatalyst.

3. The method of claim 1, wherein the manganese oxide nanoparticles comprise $Mn_3O_4$ and $MnO_2$ by PXRD.

4. The method of claim 1, wherein the electrocatalyst includes
39 to 57.0 at. % $Mn^{2+}$;
38.0 to 49.0 at. % $Mn^{3+}$; and
5.0 to 12.0 at. % $Mn^{4+}$, each based on a total amount of manganese present in the electrocatalyst.

5. The method of claim 1, wherein the electrocatalyst has a ratio of Ag to Mn of 0.1:1 to 1:1.

6. The method of claim 1, wherein the electrocatalyst includes 25 to 75 at. % $Ag^0$ based on a total number of atoms of Ag present in the electrocatalyst.

7. The method of claim 1, wherein the $Ag_2WO_4$ is crystalline $\alpha$-$Ag^2WO^4$ by PXRD.

8. The method of claim 1, wherein the electrocatalyst has
a surface area of 32.5 to 50 $m^2$/g;
a pore volume of 2.10 to 4.00 $cm^3$/g; and
a mean pore radius of 200 to 400 Å.

9. The method of claim 1, wherein the electrocatalyst has a mass activity of 1335 to 1390 mA/g.

10. The method of claim 1, wherein the method has a turnover frequency at an overpotential of 1.0 V vs RHE of 0.600 to 2.250 $s^{-1}$.

11. A method of producing oxygen gas by an oxygen evolution reaction, the method comprising:
contacting an electrocatalyst with an aqueous electrolyte solution comprising a hydroxide base;

applying a potential of 1000 to 2200 mV vs RHE to the electrocatalyst and a counter electrode immersed in the aqueous electrolyte solution, wherein the electrocatalyst comprises manganese oxide nanoparticles; and silver-containing nanoparticles disposed on the manganese oxide nanoparticles, the silver-containing nanoparticles include a shell of $Ag_2WO_4$ disposed on a core of Ag; and the electrocatalyst has an electrical resistivity of $0.50 \times 10^7$ to $6.0 \times 10^7 \Omega$, a charge transfer resistance of 325 to 450 $\Omega$, a Tafel slope of 45 to 125 mV/dec, and an overpotential at 10 mA/cm$^2$ of 0.05 to 200 mV.

12. The method of claim 11, wherein the electrocatalyst includes 50 to 70 wt. % silver-containing nanoparticles; and 30 to 50 wt. % manganese oxide nanoparticles, based on a total weight of the electrocatalyst.

13. The method of claim 11, wherein the manganese oxide nanoparticles comprise $Mn_3O_4$ and $MnO_2$ by PXRD.

14. The method of claim 11, wherein the electrocatalyst includes 39 to 57.0 at. % $Mn^{2+}$;

38.0 to 49.0 at. % $Mn^{3+}$; and 5.0 to 12.0 at. % $Mn^{4+}$, each based on a total amount of manganese present in the electrocatalyst.

15. The method of claim 11, wherein the electrocatalyst has a ratio of Ag to Mn of 0.1:1 to 1:1.

16. The method of claim 11, wherein the electrocatalyst includes 25 to 75 at. % $Ag^0$ based on a total number of atoms of Ag present in the electrocatalyst.

17. The method of claim 11, wherein the $Ag_2WO_4$ is crystalline $\alpha$-$Ag^2WO^4$ by PXRD.

18. The method of claim 11, wherein the electrocatalyst has a surface area of 32.5 to 50 m$^2$/g;

a pore volume of 2.10 to 4.00 cm$^3$/g; and a mean pore radius of 200 to 400 Å.

19. The method of claim 11, wherein the method has a Faradic efficiency of at least 85 wt. %.

20. The method of claim 11, wherein the method has a turnover frequency at an overpotential of 1.0 V vs RHE of 0.300 to 1.250 s$^{-1}$.

* * * * *